US008040704B2

(12) United States Patent
Cuk

(10) Patent No.: US 8,040,704 B2
(45) Date of Patent: Oct. 18, 2011

(54) INTEGRATED MAGNETICS SWITCHING CONVERTER WITH ZERO INDUCTOR AND OUTPUT RIPPLE CURRENTS AND LOSSLESS SWITCHING

(75) Inventor: Slobodan Cuk, Laguna Niguel, CA (US)

(73) Assignee: Cuks, LLC, Irvine, CA (US)

( * ) Notice: Subject to any disclaimer, the term of this patent is extended or adjusted under 35 U.S.C. 154(b) by 778 days.

(21) Appl. No.: 12/215,536

(22) Filed: Jun. 27, 2008

(65) Prior Publication Data

US 2009/0185398 A1     Jul. 23, 2009

Related U.S. Application Data

(60) Provisional application No. 61/011,512, filed on Jan. 18, 2008, provisional application No. 60/937,906, filed on Jun. 30, 2007.

(51) Int. Cl.
    *H02M 3/24*        (2006.01)
    *H02H 7/122*     (2006.01)
    *H02M 3/335*    (2006.01)

(52) U.S. Cl. ............................ 363/95; 363/17; 363/56.02

(58) Field of Classification Search ..................... 363/15, 363/17, 55, 56.01, 56.02, 95, 131
See application file for complete search history.

(56) References Cited

U.S. PATENT DOCUMENTS

| | | | |
|---|---|---|---|
| 4,184,197 A | 1/1980 | Cuk et al. | |
| 4,257,087 A | 3/1981 | Cuk | |
| 4,959,764 A | 9/1990 | Bassett | |
| 5,066,900 A | 11/1991 | Bassett | |
| 5,291,382 A | 3/1994 | Cohen | |
| 6,188,586 B1 * | 2/2001 | Farrington et al. | 363/17 |
| 6,304,460 B1 * | 10/2001 | Cuk | 363/16 |
| 6,388,896 B1 | 5/2002 | Cuk | |
| 6,400,579 B2 | 6/2002 | Cuk | |
| 6,462,962 B1 * | 10/2002 | Cuk | 363/16 |
| 6,496,396 B2 * | 12/2002 | Davila et al. | 363/98 |
| 2005/0047175 A1 | 3/2005 | Kawasaki et al. | |
| 2007/0047275 A1 * | 3/2007 | Hesterman et al. | 363/95 |

OTHER PUBLICATIONS

U.S. Appl. No. 61/011,512, filed Jan. 18, 2008, Slobodan Cuk.
U.S. Appl. No. 60/937,906, filed Jun. 30, 2007, Slobodan Cuk.

* cited by examiner

*Primary Examiner* — Adolf Berhane
*Assistant Examiner* — Jeffrey Gblende

(57) ABSTRACT

Switching Converter with a novel two-loop Integrated magnetic structure integrates transformer and two output inductors and eliminates large circulating current in the transformer secondary side resulting in ultra high efficiency and zero ripple output current as well as zero ripple currents in both output inductors simultaneously. The novel lossless switching method eliminates the primary side switching losses to result in switching converter with highest efficiency, compact size and additional performance advantages, such as ultra low output ripple voltage, low EMI noise and improved reliability with additional benefits when operated with a front-end Power Factor Converter for computer server applications.

10 Claims, 44 Drawing Sheets

INTEGRATED MAGNETICS SWITCHING CONVERTER WITH ZERO INDUCTOR AND OUTPUT RIPPLE CURRENTS AND LOSSLESS SWITCHING

CROSS-REFERENCE TO RELATED APPLICATIONS

Provisional U.S. Patent Application No. 61/011,512
Filed on Jan. 18, 2008
Applicant: Slobodan Cuk
Title: Switching Converter with New Integrated Magnetics and Zero Ripple Currents
Confirmation Number: 5365
Provisional U.S. Patent Application No. 60/937,906
Filed on Jun. 30, 2007
Applicant: Slobodan Cuk
Title: Integrated Magnetics Zero-ripple Switching Converter
Confirmation Number: 2501

FIELD OF THE INVENTION

This invention relates to the field of switching DC-to-DC power conversion and in particular to the class of isolated switching converters capable of obtaining zero ripple output current at 50% duty ratio and consisting of switches, an isolation transformer and two output filtering inductors. This invention also extends the operation at zero ripple output currents to duty ratios other than 50% heretofore not available in other switching DC-to-DC converters while preserving efficiency and compact size of the converter. This feature is shown to be especially beneficial when DC-to-DC converter of present invention is used as a part of an AC-to-DC converter with front-end Power Factor Correction (PFC) converter resulting in very low output ripple voltage for nominal operation. This invention also belongs to the class of the switching converters employing integration of magnetic component for size reduction and efficiency improvements. Conversion efficiency is further increased by use of either soft-switching with additional resonant inductor or more effective unique lossless switching control method which eliminates switching losses without the need for introduction of additional resonant inductors.

PRIOR ART

In the field of isolated switching power converters, there are a number of standard switching converter topologies, which had been in existence and well known almost from the inception of the field, which have some desirable characteristics and some undesirable characteristics. For example, the converter illustrated in FIG. 1a is a well-known flyback converter, which consists of a single magnetic component (isolation transformer) and is therefore a preferred solution for low cost applications. However, its main drawback is that the output current is pulsating as seen in FIG. 1b making this configuration unsuitable for the low voltage and high DC load currents, which would require a large output filtering capacitor. Furthermore, the flyback transformer stores all the input DC power requiring a large air-gap in magnetic circuit and correspondingly large magnetic core size. Finally, its DC conversion characteristic is that of step-up/step-down kind, which inherently leads to the larger voltage and current stresses on switching components when compared to the converters with step-down only DC gain characteristic.

The converter of FIG. 2a (also known as forward converter with voltage clamp) alleviates the problem of filtering large output ripple currents by including an additional output filtering inductor resulting in reduced output ripple current as shown in FIG. 2c. Another prior art converter with the same step-down DC gain characteristic of $DV_g$ is obtained by inverting the polarity of the transformer secondary windings and reversing the roles of the secondary side switches so that now $S_2$ is freewheeling switch and not $S'_2$. The forward converter of FIG. 2a transfers the power from input to output during the ON time of the main switch $S_1$ while converter of FIG. 2b transfers the power during the OFF time of the main switch $S_1$. Note that in both cases the large square-wave like ripple current of flyback converter is converted into a much more desirable triangular ripple current of smaller magnitude controlled by the output inductor as shown in FIG. 2c.

The outstanding feature of the converter in FIG. 2a is an isolation transformer with a single secondary and no DC-bias in transformer hence rather small transformer size due to minimum energy storage. The operation above 60% duty ratio is prohibited in this converter due to exponentially growing voltage stresses on primary side switches. Yet the operation below 60% duty ratio results in excessive demand on the size of the output inductor L as well as correspondingly relatively large ripple currents even at the nominal input voltage (defined as in the middle of the input DC voltage range). For example at 20% duty ratio the AC voltage on the inductor is 80% of the transformer voltage, but with added disadvantage of large DC current needed as well, which makes its size and ripple large. The converter of FIG. 2b has the same output filtering characteristics except its transformer does have a DC-bias. The problem of output ripple current filtering is now shifted to the separate output inductor, which similar to flyback transformer requires relatively large magnetic core for effective filtering. The desirable feature is that its DC gain characteristic is step-down only resulting in best switch utilization. On the negative size, two separate magnetic components are needed resulting in a larger size and more expensive design.

The converter of FIG. 3a is another well-known converter employing transformer with two secondary windings in a so-called center-tapped configuration and a separate output inductor. This configuration does provide a minimal size output inductor due to zero ripple current feature at 50% duty ratio as seen in FIG. 3c. Although, zero ripple current feature could be in principle provided for duty ratios other than 50% by using a different number of turns for secondary windings, such choice would result in increased size and reduced efficiency of the transformer. The isolation transformer has undesirable characteristics of substantial DC-bias and need for gapped core. This is in addition to the fact that the transformer with center-tap winding is not suitable for high frequency operation. The two transformer secondaries, which are alternately energized pose a series efficiency problems at high switching frequencies due to eddy current and proximity effect losses in them, which are not present in transformers with single secondary. Therefore, this center-tapped configuration is singled out as most undesirable for use at high switching frequencies due to inherent inefficiency (see Unitrode's "Magnetics Design Handbook").

The prior-art converter of FIG. 3b does eliminate the efficiency problem of the secondary center-tap windings of the transformer in the converter of FIG. 3a by employing a single transformer secondary and retains zero ripple current feature at 50% duty ratio as seen in FIG. 3c. This converter configuration is not capable of obtaining zero ripple current at duty ratios other than 50% useful for AC-to-DC power conversion described later, since it cannot use different secondary number of turns for such adjustment. This configuration does have even more serious disadvantage especially for low voltage output converters, such as 5V and 2.5V. As seen in FIG. 3b the full wave rectification on the secondary side consists of four rectifier diodes, with two of them in series for each switching interval. This results in two times higher output conduction losses when compared to the half-wave rectification of the converter in FIG. 3a with two rectifier switches.

All of the prior-art converters described above have separate magnetic components, transformers and inductors or a single transformer as flyback converter. Furthermore, operation of their switches is in a so called hard switching mode: the switches are turned ON with full blocking voltage across them resulting in substantial switching losses, which increase proportionally with switching frequency hence result in substantially reduced efficiency. Therefore, the substantial research efforts in last several decades resulted in development of new switching converter topologies, which are capable of reducing the size of the magnetic components through integration of magnetic components as well as reduce switching losses by use of so called soft switching extensions of basic and other converter topologies.

A number of switching converter topologies were proposed, which have addressed one or more performance characteristics of the switching converters needed in practical applications: simple configuration, reduction of the switching losses to increase efficiency, integration of magnetic components to reduce magnetic size and improve ripple current performance on the output. Two such converter topologies addressing one or more of the above performance objectives are covered by U.S. Pat. No. 5,066,900 and U.S. Pat. No. 5,291,382.

The converter of U.S. Pat. No. 5,066,900 follows the Integrated Magnetics method introduced in U.S. Pat. No. 4,184,197 and U.S. Pat. No. 4,257,087 and combines the separate output inductor with the isolation transformer into an Integrated Magnetics structure, which can be designed to obtain zero ripple output current at 50% duty ratio. This converter uses a resonant discharge to reduce the switching losses of the primary side high voltage switches. To accomplish this it utilizes the negative current of the voltage clamp switch on the primary side to initiate resonant discharge. Unfortunately, this negative current is small resulting in only limited reduction of switching losses for a narrow range of operating conditions. This soft-switching results also in lower noise converter performance than hard switching converters.

The converter of FIG. 4 (U.S. Pat. No. 5,291,382) combines the forward converter with the flyback converter in such a way as to eliminate the output inductor of the forward converter. The operation at 50% duty ratio also results in zero ripple output current. However, the heavy price is paid in comparison to the forward converter of FIG. 2a, since the two complex isolation transformers are needed to achieve two times ripple reduction of the comparable forward converter of FIG. 2a. This converter uses another well-known method to reduce the switching losses of the high voltage primary side switches. By making the transformer magnetizing inductance so large that the input switch SW will have a large peak-to-peak ripple current greater then two times reflected DC load current (thus making this switch current even negative) the primary side switching losses are eliminated without resorting to separate additional resonant inductor as the very low magnetizing inductance of the transformer is used for that purpose. However, such large transformer ripple current also leads to large secondary ripple currents as well and need for large output capacitor to compensate for that in order to obtain required 1% or lower voltage ripple on the output.

The Publication No. U.S. 2005/0047175 A1 is similar to U.S. Pat. No. 5,291,382 and is also based on combining the forward and flyback converters into one converter, but with only one transformer primary winding placed on the center leg of an EE core, while each of the single turn secondary windings are respectively on corresponding outer legs of EE core.

The converter shown in FIG. 5 and described in U.S. Pat. No. 6,388,896 has a continuous input current due to the presence of an input inductor, which is integral part of the converter operation as also in the converter in U.S. Pat. No. 4,257,087. In the converter of FIG. 5 all magnetics components are integrated into a single Integrated Magnetics structure with reduced DC-bias and using an EE core type or custom core equivalents and result in zero-ripple current at 50% duty ratio. In addition, in this converter a lossless switching was applied which eliminated switching losses without the need for external resonant inductor and is effective for all operating conditions.

While each of the above prior-art converters address some of the key performance characteristics, none of them provides all important advantages needed for modern switching power supplies.

SUMMARY OF THE INVENTION

The switching converter of the present invention is shown in FIG. 9a with its Integrated Magnetics structure, the corresponding hard-switching drive control in FIG. 9b, and one preferred Integrated Magnetics embodiment in FIG. 9c. This converter combines the best performance characteristics of the above described conventional converters. The Integrated Magnetics structure shown in FIG. 9c has a special property that the two output inductors are directly coupled to the isolation transformer but not coupled directly to each other. The special positioning of the two air-gaps in the center legs only leads to very low ripple currents in converters output side. The primary and secondary windings of isolation transformer are on the center leg of the magnetic core while the two output inductors are wound on two outer magnetic legs. Due to separate magnetic loops the two inductors are not directly coupled to each other but are coupled to the isolation transformer.

The unique converter topology of FIG. 9a makes possible implementation of a new type of lossless switching as illustrated in FIG. 28a and FIG. 28b, which eliminates the switching losses and substantially increases overall efficiency described in details in later section. Unlike prior-art soft switching methods requiring a separate and large size resonant inductor, the lossless switching is accomplished without need for such resonant inductor but instead relies only on proper switching timing of four switches.

Thus, the switching converter of the present invention of FIG. 9a and another variant in FIG. 21a and many of their Integrated Magnetics extensions along with its lossless switching operation combines therefore the desirable features of many of the prior-art converters such as:

1. Very simple configuration consisting of a single magnetic core comparable to flyback converter.
2. Lower ripple currents and more effective output filtering compared to forward converter resulting at zero ripple current at nominal input voltage.
3. Zero ripple current of the center-tap converter but with only one transformer secondary and without additional core for output inductor.

4. Lossless switching superior to any of the described prior-art converters with soft switching such as converters in FIG. 4.
5. Virtually complete elimination of the circulating current on the secondary side results in high efficiency and low ripple currents over wide input voltage operating range and wide range of load currents from no load to full load.

This present invention introduces the switching converter topology along with its new type of Integrated Magnetics structure, which addresses all of the above key five performance characteristics of switching converters. The main features of the present invention can be summarized as follows:
1. Switching converter structure with isolation transformer and two output inductors integrated into Integrated Magnetic structure using either two UU cores or single EE (or EI type) magnetic cores to achieve small size and high efficiency.
2. Elimination of the switching losses at all operating conditions using only the control means, hence leading to maximum improvement of the efficiency.
3. Lossless switching with its soft transition minimizes the noise, both conducted and radiated.
4. High conversion efficiency due to highly efficient magnetics operation and lossless switching.
5. Elimination of the large circulating current on the secondary side and further improvement of the efficiency.
6. Large reduction of the no load losses in one preferred Integrated Magnetics embodiment.
7. Small converter size due to small size of the Integrated Magnetics and the high efficiency minimizes or in many cases eliminates the need for additional heat-sinks, which increase the size, weight and cost.

The invention will be best understood from the following description when read in connection with the accompanying drawings.

BACKGROUND OF THE INVENTION

Definitions and Classifications

The following notation is consistently used throughout this text in order to facilitate easier delineation between various quantities:
1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta i_1$—The difference between instantaneous and DC components is designated with $\Delta$, hence $\Delta i_1$ designates the ripple component or AC component of current $i_1$;
6. $i_{CC}$—The composite current equal to sum of currents through the input switch $S_1$ and complementary input switch $S'_1$, that is $i_{CC}=i_{S1}+i_{S'1}$;
7. DC Ampere Turns—the DC current flowing into dot terminal of the winding will result in positive ampere turns and DC current flowing out of dotted terminal of the winding will be negative and result in negative DC ampere turns.

Present invention imposes also a need to introduce completely new terminology for the two major novelties, neither of which is present in prior-art switching converter terminology:
1. New Integrated Magnetics structure proposed imposes a need for a special symbol (describe in more details in later section), which will designate precisely the specific magnetic coupling among various windings, some of which are directly magnetically coupled and some of which are not, and are nevertheless part of the same Integrated Magnetics structure;
2. Novel method of controlling switching devices, which makes possible the complete elimination of switching losses (except for gate-drive losses) and thus result in the highest possible efficiency improvement.

Lossless Switching Methods require new definition of the switches, switching intervals and transition intervals they create as well as the respective duty ratio D as follows:
1. $S_1$, $S_2$, $S'_1$, $S'_2$—Switch designations respectively for input switch, output switch, complementary input switch, and complementary output switch and, at the same time, designate the switching states of the respective active, controllable switches as follows: high level indicates that active switch is turned-ON, low (zero) level that active switch is turned-OFF;
2. D—The duty ratio is defined as $D=t_{ON}/T_S$ where $t_{ON}$ is the ON time interval during which the input switch is closed (turned ON) and $T_S$ is the switching period defined as $T_S=1/f_S$ where $f_S$ is a switching frequency;
3. D'—The complementary duty ratio D' is defined as $D'=t_{OFF}/T_S$ where $t_{OFF}$ is the OFF time interval during which the input switch $S_1$ is open (turned OFF);
4. $\Delta t_{12}$—first transition interval
5. $\Delta t_{21}$—second transition interval
6. State-1 interval—The time interval during which input switch $S_1$ and output switch $S_2$ are turned-ON (closed), while complementary input switch $S'_1$ and complementary output switch $S'_2$ are both turned OFF (open);
7. State-2 interval—The time interval during which input switch $S_1$ and output switch $S_2$ are both turned OFF (open), while complementary input switch $S'_1$ and complementary output switch $S'_2$ are both turned ON (closed);
8. (1-2) transition interval—The time interval between State-1 and State-2 interval during which, in precisely defined sequence and timing, input switch $S_1$ and output switch $S_2$ reverse their state from ON to OFF while complementary input switch $S'_1$ and complementary output switch $S'_2$ reverse their state from OFF to ON;
9. (2-1) transition interval—The time interval between State-2 and State-1 interval during which, in precisely defined sequence and timing, input switch $S_1$ and output switch $S_2$ reverse their state from OFF to ON while complementary input switch $S'_1$ and complementary output switch $S'_2$ reverse their state from ON to OFF;
10. $CR_2$, $CR'_2$—Designation for the output switch and complementary output switch implemented as a current rectifier (CR) diodes and their corresponding switching time diagram. Since diode is a two-terminal passive switch, switching time diagram represents also the state of diode switch as follows: high level indicates that the diode is ON and low level that diode is OFF;
11. CBS—designates the Current Bi-directional Switch (CBS) as a three-terminal, controllable semiconductor-switching device, which can conduct the current in either direction when turned ON, but blocks the voltage of only one polarity when turned OFF. The region of operation of such switch is also marked CBS.

BRIEF DESCRIPTION OF THE DRAWINGS

FIG. 8b illustrates the two inductors with DC-bias needed for converter in FIG. 8a, and FIG. 8c illustrates the large ripple currents in inductors of converter of FIG. 8a.

FIG. 12b shows zero ripple current at 50% duty ratio for magnetic circuit of FIG. 12a.

FIG. 16d illustrates large 50 A ripple current of inductor $L_2$ at duty ratio D=0.5

FIG. 16d illustrates large 40 A ripple current of inductor $L_2$ at duty ratio D=0.4

FIG. 30b shows the characteristic waveforms of the converter in FIG. 30a.

FIG. 31b illustrates series resonant circuit for the converter of FIG. 31a.

FIG. 32a highlights the converter with large external resonant inductor $L_{EXT}$ and FIG. 32b illustrates the characteristic waveforms of the soft switching operation of converter in FIG. 32a.

BACKGROUND OF THE INVENTION

Figure 1A:
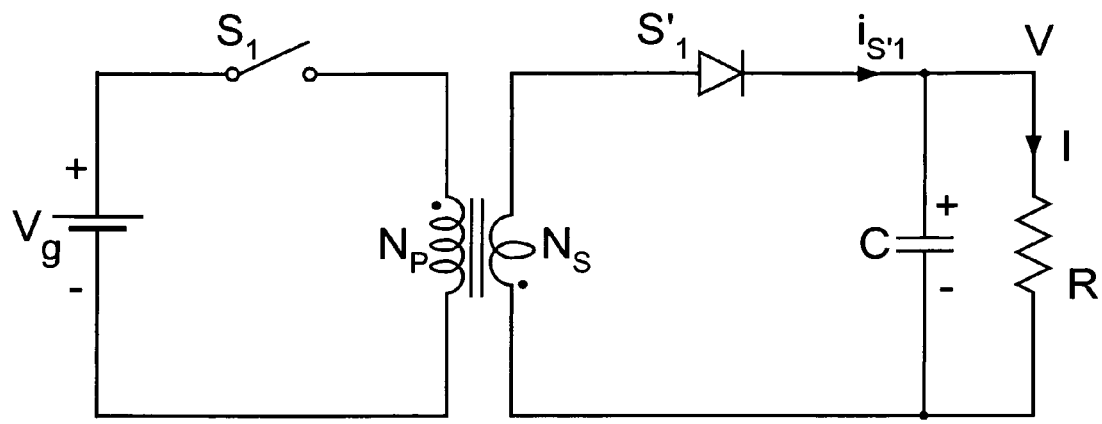
FIG. 1a illustrates the prior-art flyback converter and FIG. 1b illustrates the pulsating output current of the flyback converter.
Figure 1B:
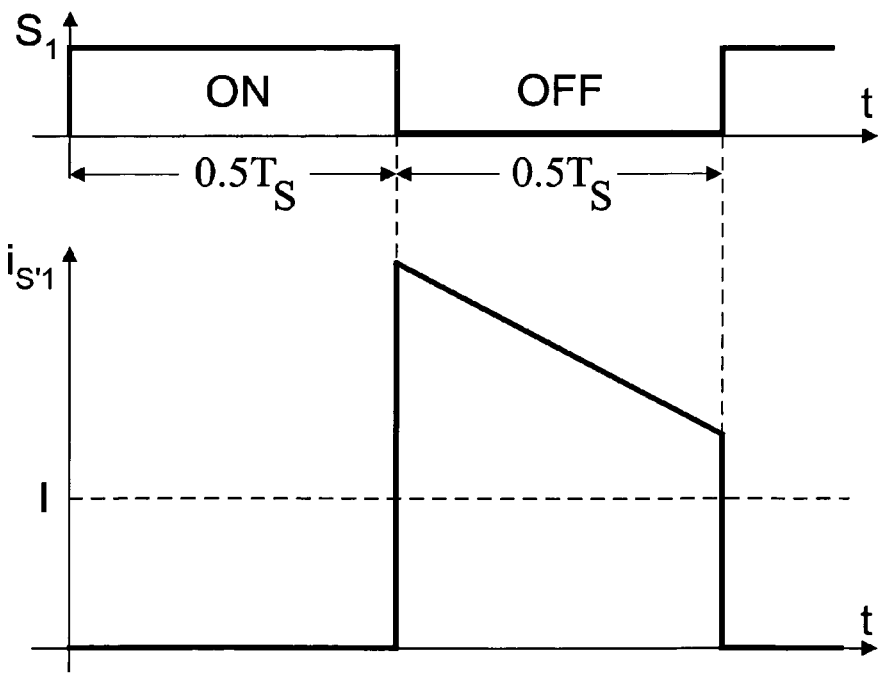
Figure 2A:
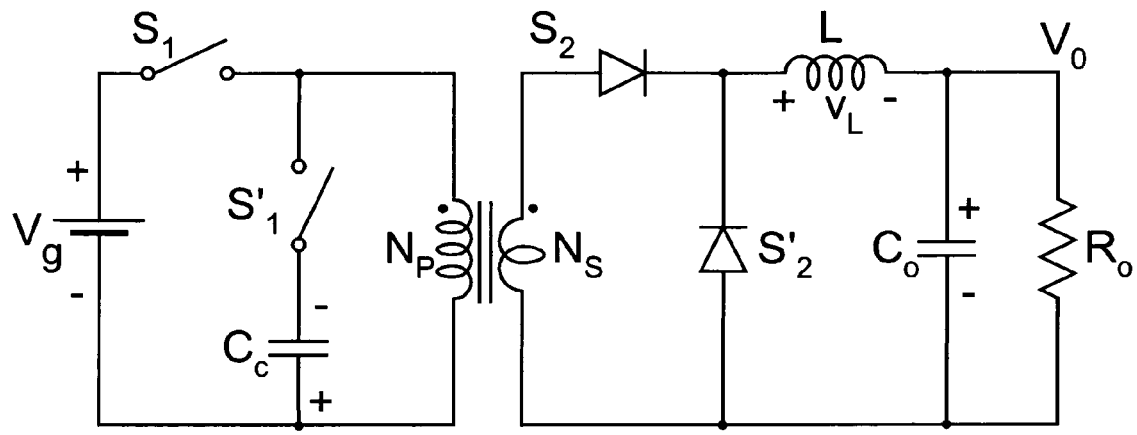
FIG. 2a illustrates the prior-art forward converter with voltage clamp.
Figure 2B:
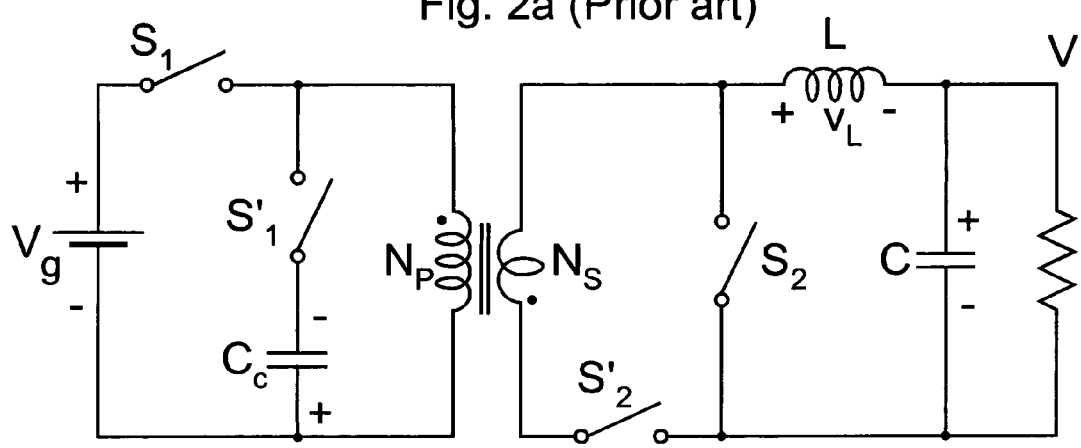
FIG. 2b illustrates prior art converter complementary to forward converter and FIG. 2c illustrates triangular ripple current of the forward converter.
Figure 2C:
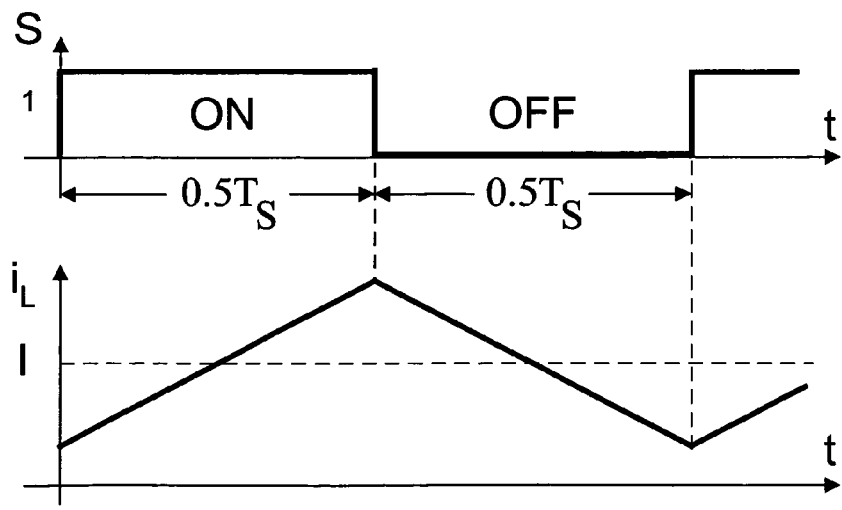
Figure 3A:
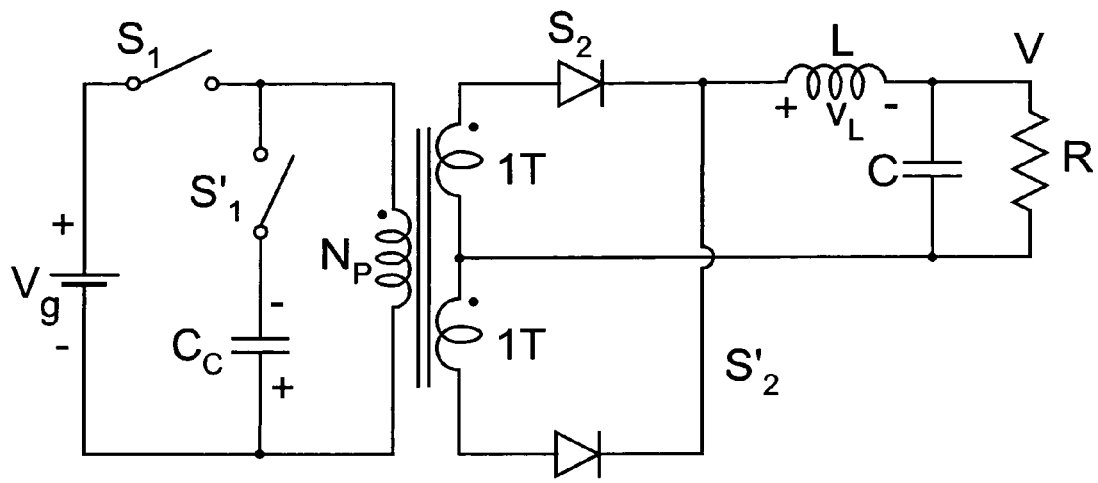
FIG. 3a illustrates the prior-art center-tap switching converter with isolation transformer with two secondaries.
Figure 3B:
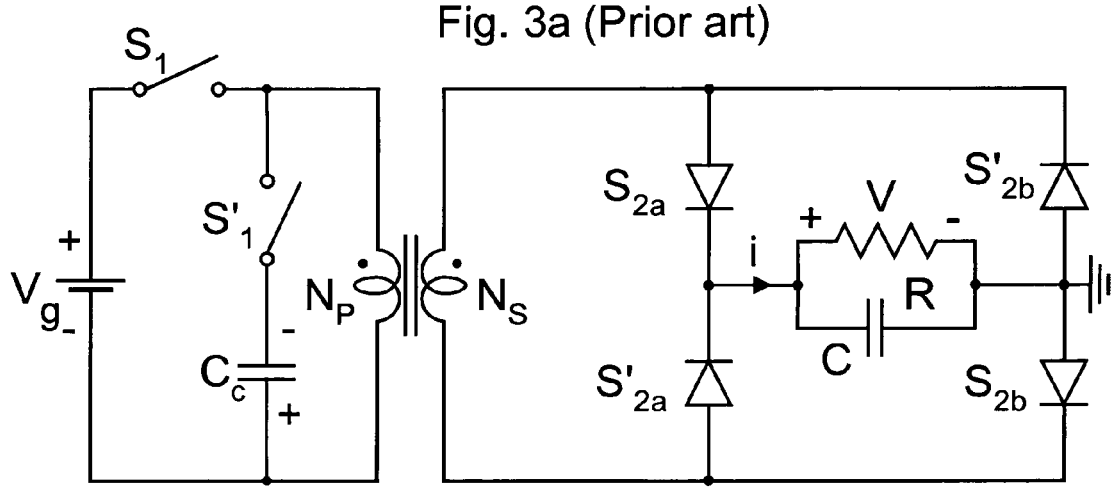
FIG. 3b illustrates the converter with full bridge rectification on the output.
Figure 3C:
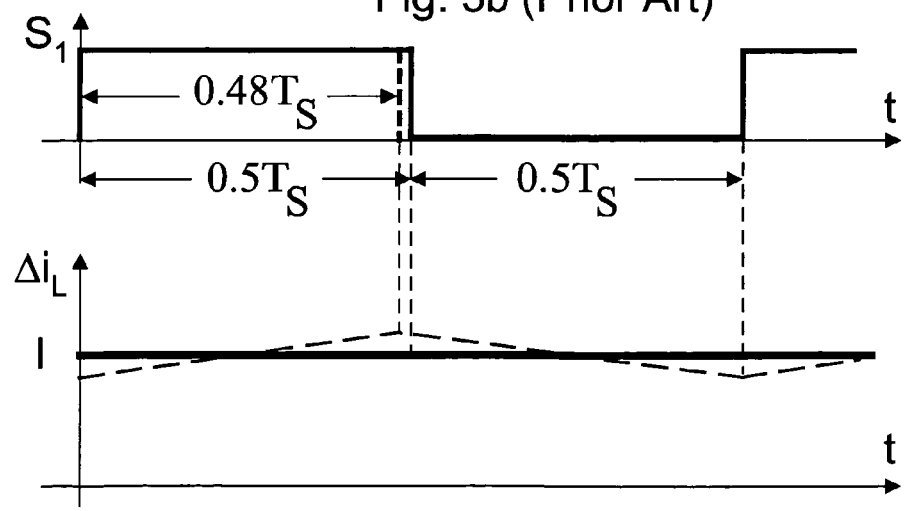
FIG. 3c illustrates zero ripple current at 50% duty ratio for converters of FIG. 3a and FIG. 3b.
Figure 4:
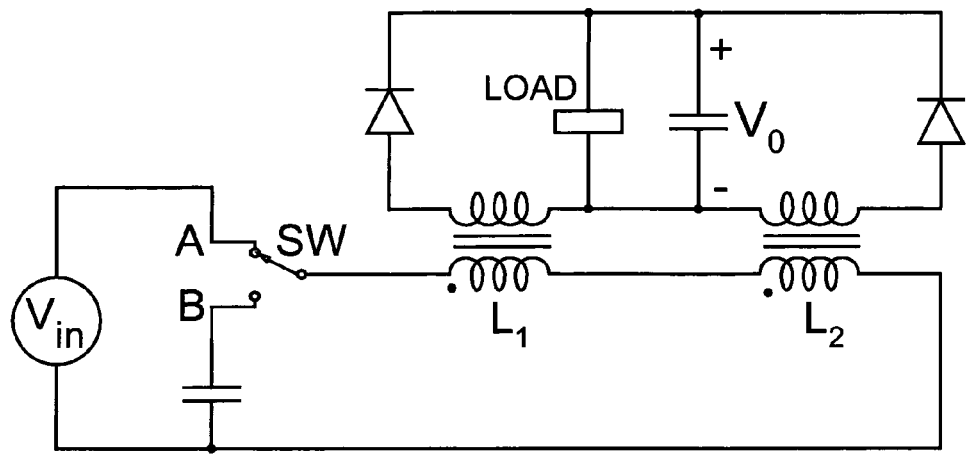
FIG. 4 illustrates the prior-art switching converter described in U.S. Pat. No. 5,066,900.
Figure 5:
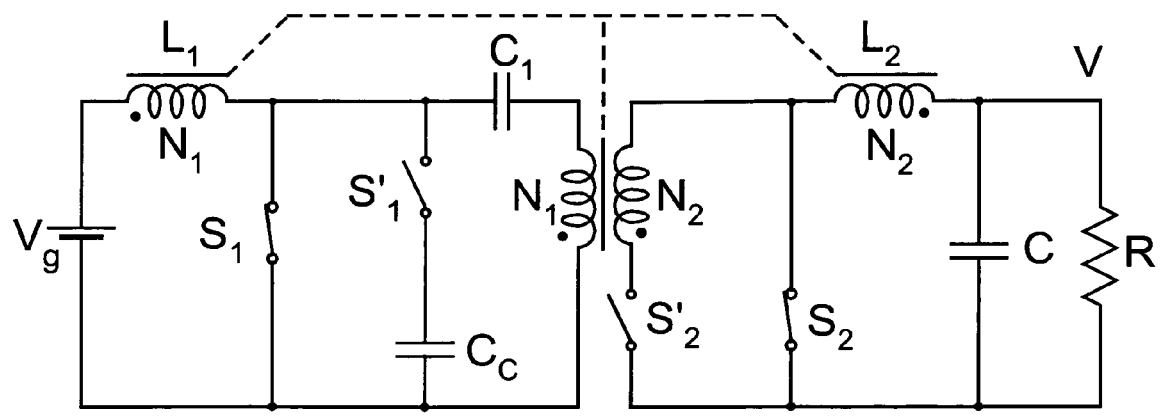
FIG. 5 illustrates the prior-art switching converter described in U.S. Pat. No. 5,291,382.

The forward converter shown in FIG. 2a transfers the power through the isolation transformer to the load during the interval $DT_S$ when the primary side switch $S_1$ is ON. The prior-art converter of FIG. 2b transfers the power during the complementary interval $D'T_S$ when switch $S'_2$ is ON. Note that the primary side switching is identical in both converters. The DC conversion gain of each converter is also same and equal to $DV_g$—where D is duty ratio of the main switch, except for the inverting polarity of the transformer secondary for the converter of FIG. 2b. Hence, another prior-art, two-output converter can be constructed, which has two secondaries, as in FIG. 6. One DC output is as in converter of FIG. 2a and another DC output has identical DC voltage as converter of FIG. 2b. Because of the common DC voltage gain, the two-output converter of FIG. 6 can be combined into a single output converter of FIG. 7 with substantial circuit simplification: the two secondary side transformer windings can be merged into just one secondary winding, which, in turn, makes possible merging of two $S_2$ rectifier switches into a single one, since the energy transfer interval for $S_2$ switch and inductance $L_1$ of first output is at the same time freewheeling interval for using the same $S_2$ switch for inductance $L_2$. The same is true for the other switch $S'_2$ thus resulting in a prior-art converter of FIG. 7 with only two switches, but now with two output inductors, which is often referred to as a Current-doubler converter.

Figure 6:
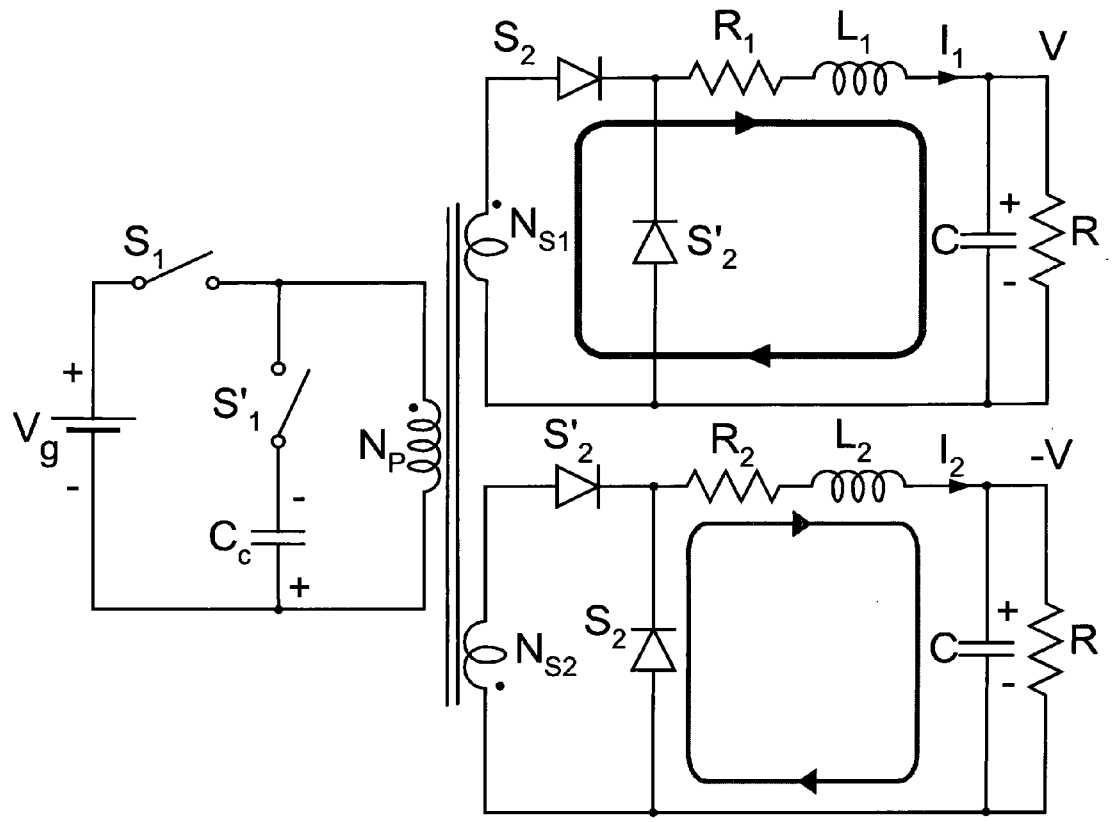
FIG. 6 illustrates the prior-art switching converter consisting of two secondaries.

If the two outputs of converter in FIG. 6 are connected, the DC load current will be split between two secondary sides based on two resistances $R_1$ and $R_2$. From the above derivation, one of the key characteristics of this converter is obtained: the DC load current of the converter of FIG. 7 will be split according to the DC impedances at the two output inductors, that is $R_1$ and $R_2$ resistances. In a special case when $R_1=R_2$ the DC load current is split equally between two outputs and $I_1=I_2=0.5I$. Therefore, the more appropriate name for the converter of FIG. 7 would be current divider as it divides the well-known quantity DC load current I into half, so that I/2 is flowing through each of the two separate inductors.

Figure 7:
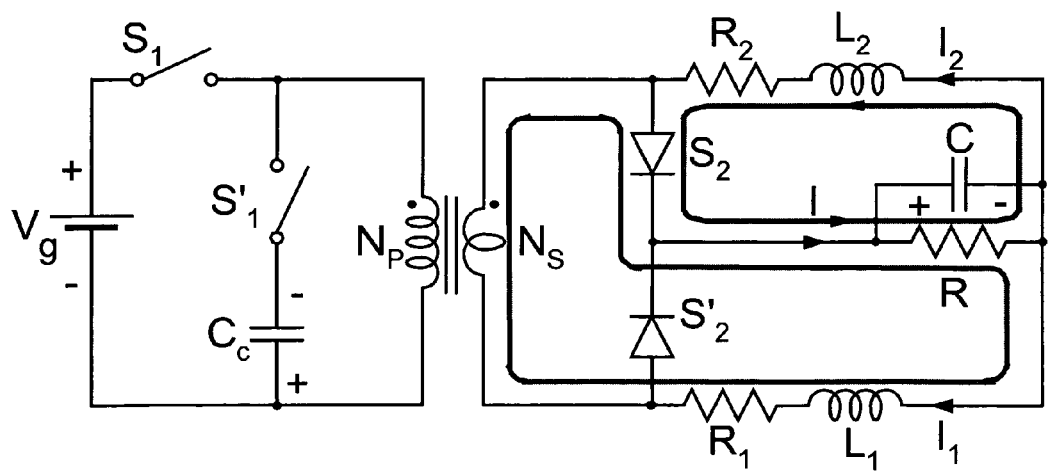
FIG. 7 illustrates the prior-art switching converter obtained by simplification of converter in FIG. 6.
Figure 8A:
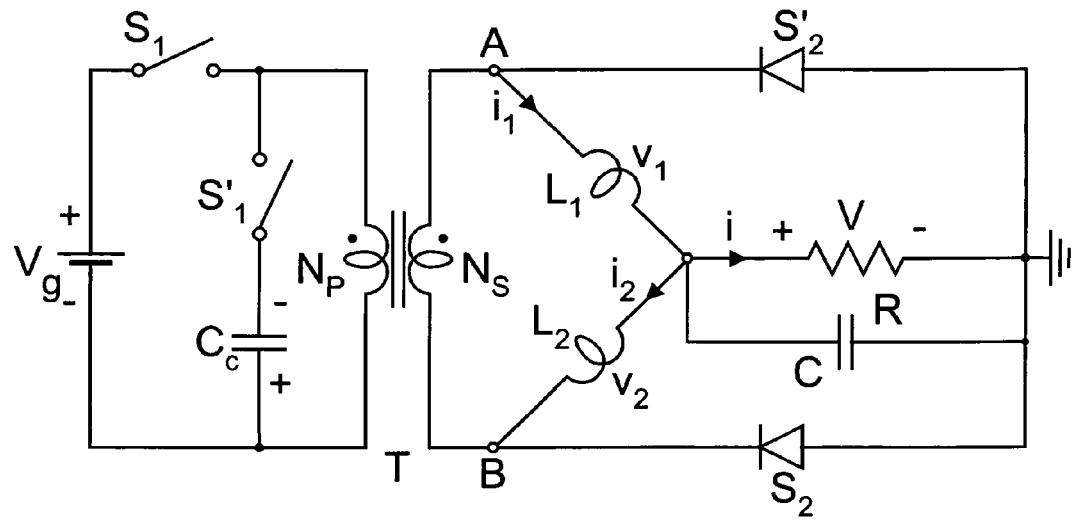
FIG. 8a illustrates the positive output voltage polarity version of converter in FIG. 7.
Figure 8B:
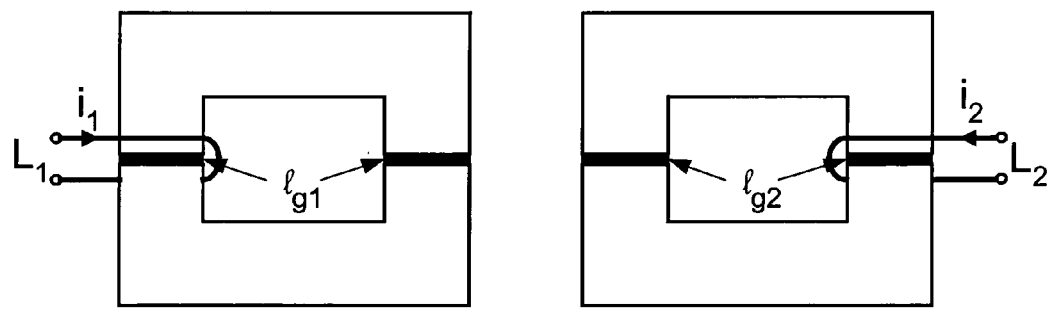

The converter of FIG. 7 has negative output voltage polarity if the common rectifier connection (cathode connection) is connected to a secondary ground. Shown in FIG. 8a is a positive polarity alternative in which common rectifier connection is the anode connection of two diodes. This is preferred implementation for positive output voltage, as the synchronous rectifier MOSFET transistor replacing rectifier diodes, will be in a preferred grounded source connection relative to output ground. However, unlike other prior-art converters, the converters in FIG. 7 and FIG. 8a have three magnetic components. Worse yet, each of the three magnetic components has a substantial DC energy storage and requires a large air-gap to sustain DC load current bias as illustrated in FIG. 8b for the two output filtering inductors. This results in more complex filter than in forward converter, as there are now two inductors instead of one.

DC Analysis

The following DC analysis of the converter in FIG. 8a applies equally well to the present invention due to their equal DC characteristic.

The converter operates at the fixed switching frequency given by $f_S=1/T_S$ where $T_S$ is the switching period. Two of the four switches are ON for duty ratio D defined as $D=t_{ON}/T_S$, and two other switches are ON during remaining time of the switching period $T_S$, defined as $D'=1-D$.

By use of the state-space averaging method (S. Cuk, "Modelling, Analysis, and Design of Switching Converters, Ph.D. thesis, California Institute of Technology, November 1976; R. D. Middlebrook and S. Cuk, "Advances in Switched-Mode Power Conversion", Vol. I, II, and III, TESLAco), and assuming 1:1 transformer turns ratio, the output DC voltage is obtained as $$V=DV_g \qquad (1)$$

As is well known to those skilled in the art, the turns ratio of the transformer can then be used to obtain additional step-down of the input voltage. Hence, this converter belongs to the class of the fixed switching frequency Pulse Width Modulated (PWM) switching converters with the buck-type step-down DC conversion ratio characteristic.

First we analyze how is the DC load current I divided between the two inductors, $L_1$ with DC current $I_1$ and $L_2$ with DC load current $I_2$. From the DC currents summation at the node A we have $$I=I_1+I_2 \qquad (2)$$

where the split of DC load current I into two components depends on the second order parasitic effects that is the respective DC resistances $R_1$ of the inductor $L_1$ and $R_2$ of inductor $L_2$. In case $R_1=R_2$ the DC load current is equally divided between two inductors $$I_1=I_2=I/2 \qquad (3)$$

Let us now analyze the load current I in general case of arbitrary split, that is for $I_1$ and $I_2$ given by (2). In that case the following relationship must be satisfied:

$$R_1I_1=R_2I_2 \qquad (4)$$

When switch $S_2$ is open, and $S'_2$ closed, the current at node A splits into two parts so that during $D'T_S$ interval DC current $I_1$ flows through inductor $L_1$, while DC current $I_2$ flows through and into dotted terminal of secondary winding of the transformer.

When switch $S'_2$ is open, and $S_2$ closed, the current at node B splits into two parts so that during $DT_S$ interval DC current $I_2$ flows through inductor $L_2$, while DC current $I_1$ flows through and out of the dotted terminal of single turn secondary winding of the transformer.

The above analysis of DC load current distribution applies equally well to all Integrated Magnetics variants of the present invention as the magnetics integration does not alter DC gain properties of the converter.

Output Ripple Current Characteristic

With the designation of the positive ripple current directions and respective AC voltages on two inductors $v_1$ and $v_2$ as in FIG. 8a ripple currents $\Delta i_1$ and $\Delta i_2$ in two inductors and $\Delta i$ in the output can be evaluated as $$\Delta i_1=T_S v_1/L_1 \qquad (5)$$

$$\Delta i_2=T_S v_2/L_2 \qquad (6)$$

$$\Delta i=\Delta i_1-\Delta i_2=T_S(v_1/L_1-v_2/L_2) \qquad (7)$$

since the output ripple current is the difference of the two inductor ripple currents.

As seen from general AC analyses in later section for a special case of 50% duty ratio, $v_1=v_2=0.5$ v. Therefore, the output ripple current from (7) becomes zero. As graphically displayed in FIG. 8c the two inductor current ripples, however, are still very large and may be even 50% or more of the DC load current. Therefore, zero ripple current (at 50% duty ratio) and a proportionally increasing output ripple current away from 50% duty ratio are obtained as a difference of two large AC ripple currents.

This zero ripple feature at one nominal point is a distinct advantage over the Current-doubler converter. However, the disadvantage is that two separate large magnetic cores are needed for inductances as seen in FIG. 8b.

DETAILED DESCRIPTION OF THE INVENTION

Figure 10A:
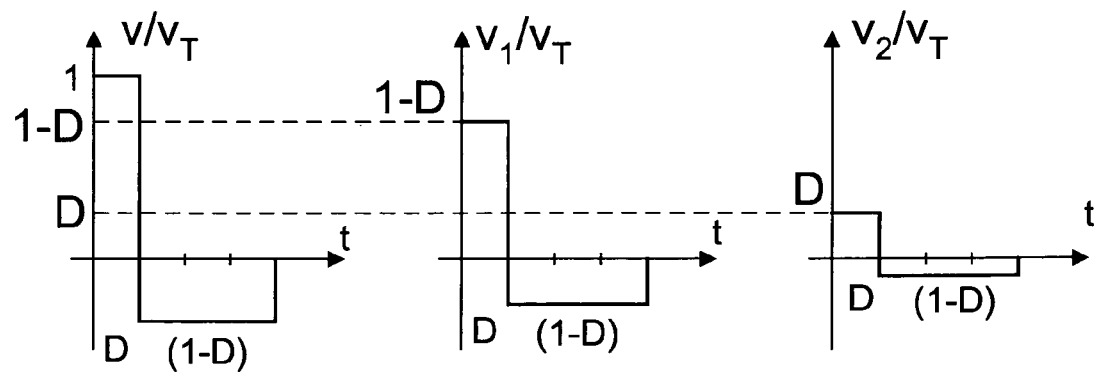
FIG. 10a illustrates relationship of AC voltages of the transformer and two inductors of the converter in FIG. 9a, FIG. 10b illustrates the new magnetic coupling symbol of the Integrated Magnetics circuit of the present invention in FIG. 9a, and FIG. 10c illustrates one possible Integrated Magnetics implementation with two separate magnetics loops.

The key to the simultaneous reduction of the magnetics size, increase of efficiency and appropriate simplification and cost reduction is in the integration of the three separate magnetic components of the converter in FIG. 8a (the isolation transformer and two inductors) into a single Integrated Magnetics structure using appropriate and very specific magnetic core configurations. Clearly a brute force integration of all three magnetic components onto a single common magnetic core would not work. By use of the state-space averaging method, the analytical expression can be obtained for the three AC voltage waveforms. As seen in FIG. 10a the three AC voltage waveforms are all rectangular and effectively in phase as there are only two distinct switching subintervals, D and D'. However, their magnitudes are functions of the duty ratio D. For their magnetic coupling on the common core to work, the three AC voltages would have to satisfy Faradeys' law. For example, for duty ratio D=0.5 the two inductors AC voltages are equal to half the transformer AC voltage. Hence, a transformer with twice as many turns as each of the two inductors would result in the same volts/turn excitation of each inductor winding and therefore a same common AC flux in the core. However, even a slight change of duty ratio away from 50% would result in a mismatch and an effective conflict between the AC driving voltages of the three windings. This effectively rules out use of a single loop magnetics structure as, for example, used in U.S. Pat. No. 4,257,087. Nevertheless, a number of two magnetic loops Integrated Magnetics structures are shown to be suitable for implementation with novel performance features such as elimination of the circulating ripple currents of the prior-art Integrated Magnetics structures.

The present invention therefore demonstrates that there are a number of magnetic core configurations which do, in fact, satisfy the Faradays Law for AC magnetic coupling and which can be utilized to simultaneously improve efficiency, reduce size and ripple currents, such as, for example:
  a) two separate loops magnetic core structure, such as using two UU or UI core types and their flat magnetics versions.
  b) a single magnetic core of the EE or EI type and its flat magnetics version.

Thus, even though a single loop magnetic core implementation is not possible as it was in the Integrated Magnetics Cuk converter, for example, integration using other magnetic core types is indeed possible and very beneficial as described below. Even integration on a single magnetic core of EE type as described above is possible and carries the same practical benefits of only one magnetic core piece matching its simplicity and low cost, but also bringing additional advantages described later.

The key to a large variety of the Integrated Magnetics implementations presented here and their success lies in the observation of the unique relationship among the three AC voltages of the three magnetic components. Note that in the converter of FIG. 8a the three magnetic components are connected in a loop. Therefore, their respective AC voltages are also connected in the single closed loop. As per Kirchof's Law all AC voltages in a single loop must add to a zero, making only two out of three AC voltages independent and third one dependent. Thus, the three separate magnetics can be combined into a magnetic circuit with multiple windings, which takes into account the above relationship among AC voltages and makes appropriate magnetic circuit realizations as described next.

Integrated Magnetics Switching Converter in Hard Switching Operation

Figure 9A:
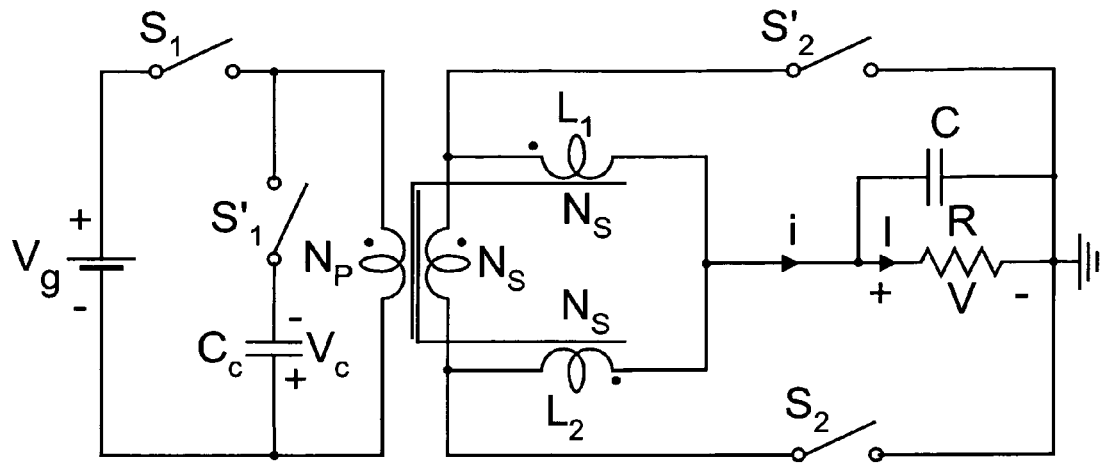
FIG. 9a illustrates the simplified circuit diagram of the present invention using single Integrated Magnetic circuit with two inductors magnetically coupled to the isolation transformer.

The basic embodiment of the current invention illustrated with ideal switches is shown schematically in FIG. 9a. For easy of understanding, first the operation in a simpler hard switching mode will be presented in which no dead time provision is made between switches, and their ideal operation is assumed. After this basic introduction a lossless switching operation will be described in separate section in more details.

The converter consists of the two primary side switches, $S_1$ and $S'_1$ switching alternately (out of phase), two secondary side switches, $S_2$ and $S'_2$ switching alternately, an isolation transformer and two inductors connected to the secondary side of the transformer, and the primary side capacitor $C_c$ providing volt-sec balance and reset of the isolation transformer. This, in turn, leads to the Integrated Magnetics switching converter of FIG. 9a, with transformer and two inductors coupled together into an Integrated Magnetics structure subject to the above unique relationship of the three AC voltages.

The key feature of the switching converter is that all three separated magnetic components, transformer and two inductors are coupled together into an Integrated Magnetics structure which is subject to the unique relationship of the three AC voltages. The isolation transformer and two inductors $L_1$ and $L_2$, are coupled together into a single Integrated Magnetics circuit which is on FIG. 9a illustrated by a special, magnetic coupling symbol. The special magnetic symbol is needed to indicate clearly on the schematic diagram of the new Integrated Magnetics circuit of FIG. 10b that $L_1$ and $L_2$ inductors are coupled to isolation transformer, but equally important to designate that $L_1$ and $L_2$ are NOT coupled directly between themselves. Coupling of $L_1$ inductor to transformer only is indicated by one magnetic coupling line, which extends from the inductor $L_1$ into the transformer. Similarly, coupling of $L_2$ inductor to the transformer only is indicated by another magnetic coupling line extending from the inductor $L_2$ to the transformer. Clearly, the absence of the magnetic coupling line extending directly from inductor $L_1$ into inductor $L_2$ indicates the desired objective that $L_1$ and $L_2$ inductors are not coupled.

Integrated Magnetics Structure of Three Magnetic Components

Note that in order to combine three otherwise separate magnetic components into a single one, some key relationship must exist among their AC voltage waveforms in order to allow such integration. In particular, since all properties (DC as well as AC) of the converter are dependent and, in fact, function of the operating duty ratio D, such magnetic coupling must be valid and appropriate regardless of the operating duty ratio D. This clearly imposes a severe restriction to the kind of AC magnetic coupling allowed and type of the magnetic circuit, which can be used to implement that. Thus, let us first uncover the basic relationship among the AC voltage waveforms of the three magnetic components.

The AC voltages of the converter in FIG. 9a have been shown in FIG. 10a. Note the following important relationship between the magnitudes of the three AC voltage waveforms, $v_T$ of the transformer, $v_1$ of inductor $L_1$ and $v_2$ of inductor $L_2$ $$v_1 = (1-D)v_T \qquad (8)$$

$$v_2 = Dv_T \qquad (9)$$

which show that the scaling factor is the operating duty ratio D. By adding equations (8) and (9) the following relationship among the three AC voltages is obtained:

$$v_1 + v_2 = v_T \qquad (10)$$

$$\text{or } v_d = v_T - v_1 - v_2 = 0 \qquad (11)$$

The relationships (10) and (11) are independent of the operating duty ratio D, hence valid for any D. This should also have been expected since from FIG. 9a the three AC voltages form a loop. The sum of AC voltages in the loop must be zero according to basic Kirchof circuit law. The significance of relationship (11) is that this differential AC voltage $v_d$ is exactly zero and therefore eliminates the possibility of large circulating AC ripple currents which plagues many other integrated magnetics implementations due to presence of second order effects on AC waveforms (slight AC voltage mismatch results in large circulating currents due to presence of only a small leakage inductance in the loop containing these voltage sources).

Figure 10B:
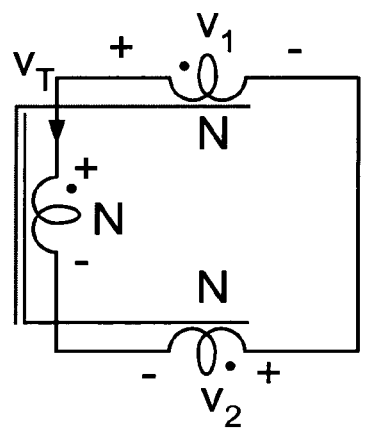
Figure 10C:
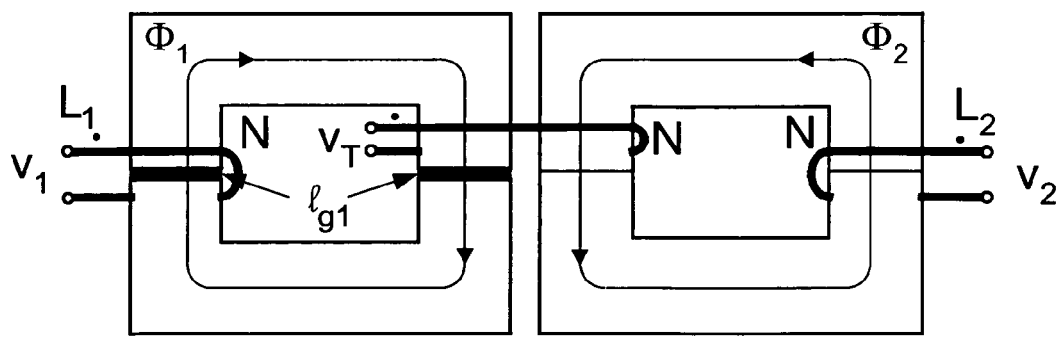

The Integrated Magnetics coupling schematic designation illustrated in FIG. 10b is used to make one obvious practical realization using two separate magnetic cores as illustrated in FIG. 10c. For simplification of the analysis all further Integrated Magnetic circuits will be shown only with the secondary side winding, as this is only needed for modeling and proper understanding. Nevertheless all practical implementation will, in fact, have the primary winding as well, as in FIG. 9a, which is necessary in this converter to separate primary and secondary grounds. The Integrated Magnetics of FIG. 10c has already been disclosed and covered in the previous provisional U.S. Patent Application No. 60/937,906 filed on Jun. 30, 2007.

However, before that can be implemented in FIG. 10*c*, additional requirements must be imposed on a number of turns for inductors $L_1$ and $L_2$ and transformer secondary number of turns. This is needed to make sure that the Faraday's Law of electromagnetic induction is satisfied. Thus, the sum of AC voltages of (10) must translate into a corresponding sum of the respective AC fluxes of the three magnetic windings.

In general case, for equal number of turns, say $N_S=N$ as illustrated in FIG. 10*b*, each of the AC voltages will generate an AC flux proportional to volts/turn so that the relationship (10) among the AC voltages leads also to analogous relationship among the AC fluxes of the three magnetic components, $\Phi_1$, $\Phi_2$ and $\Phi$ given by:

$$v_1/N + v_2/N = v_T/N \qquad (12)$$

$$\Phi_1 + \Phi_2 = \Phi_T \qquad (13)$$

Based on the above relationship, we can introduce first the magnetic circuit of FIG. 10*c*, which consists of the two magnetic loops separated by nonmagnetic material (core separation). This is to insure that the two inductors are NOT coupled directly between themselves but only indirectly through their coupling to the transformer. Transformer is placed in the center around both magnetic loops. This then satisfies the flux relationship given by (13) for any operating duty ratio D.

After separate two loop Integrated Magnetics implementations are described in details, this coupling requirement will be removed and the converter of FIG. 21*a* introduced later in which direct coupling between the inductor windings is allowed provided appropriate magnetics core configuration along with its needed air-gap distribution is used as described in later section.

The two loop magnetic circuit of FIG. 10*c* clearly prevents direct magnetic coupling of inductor $L_1$ and $L_2$ owing to two separate magnetic loops as indicated by magnetic coupling symbol of FIG. 10*b*. From FIG. 10*a* it is clear that for any duty ratio D different than D=0.5, the two voltages $v_1$ and $v_2$ will be different in their magnitude so they indeed could not be directly coupled into a single magnetic loop together with transformer windings.

DC-Bias Calculation for Magnetic Loops

For calculation of-DC bias of the transformer we have adopted for both primary and secondary currents as the reference positive direction the current flowing into dot connection. Thus, the magnetizing current by the definition is the algebraic sum of the primary and secondary currents. In a classical AC transformer, secondary current is actually negative (flowing out of the dotted terminal), difference between primary and secondary current is magnetizing current of transformer.

Figure 11A:
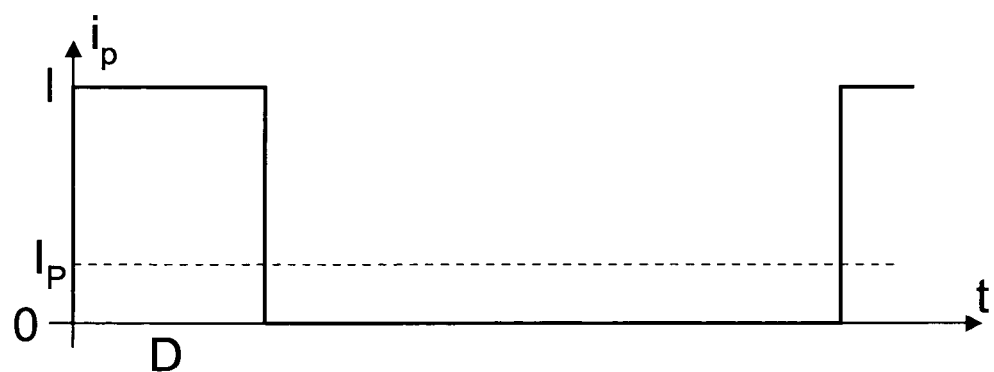
FIG. 11a illustrates idealized transformer primary current waveform.
Figure 11B:
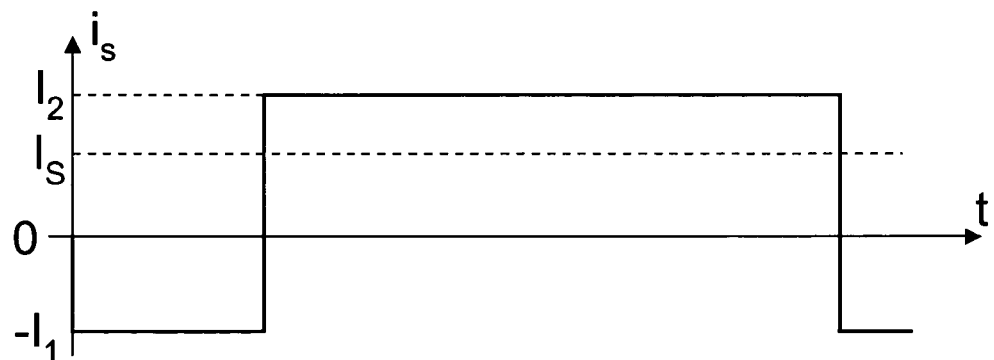
FIG. 11b illustrates idealized transformer secondary current waveform.

By the above convention, the DC current flowing into dot terminal will result in positive ampere turns and DC current flowing out of dotted terminal will be negative and result in negative DC ampere turns. DC-bias of the transformer is then found by finding separately DC-bias coming from primary and secondary of the transformer and then adding them up. By finding average (DC) currents $I_P$ of the AC waveforms $i_P$ for the primary winding (FIG. 11*a*), and DC current $I_S$ of $i_S$ for secondary winding (FIG. 11*b*), total DC-bias $I_T=I_P+I_S$ is calculated as follows:

$$I_P = DI; \ I_S = D'I_2 - DI_1 \qquad (14)$$

$$I_M = D(I_1+I_2) + D'I_2 - DI_1 = I_2 \qquad (15)$$

Thus, the following significant results are obtained for transformer magnetizing current $I_M$:

a) Transformer magnetizing current does have DC component $I_M$. However, this DC magnetizing current is constant and independent of duty ratio D.
b) DC magnetizing current is equal in magnitude to the DC current $I_2$ of the inductor $L_2$.
c) Transformer DC magnetizing current results in POSITIVE DC ampere turns (DC current flows INTO DOT connection of the transformer), while the DC current $I_2$ of inductor $L_2$ flows OUT of DOT connection, resulting in NEGATIVE DC ampere turns. Thus if placed on a common magnetic circuit their DC biases would subtract and result in net zero DC-bias.

The DC-bias current of the inductor $L_1$ flows into dot terminal and results also in positive Ampere turns just as in the transformer. Therefore, the DC biases of the two magnetic loops in FIG. 10*c* are:

$$I_{DC}(\text{loop } 1) = I_1 + I_2 = I \qquad (16)$$

$$I_{DC}(\text{loop } 2) = I_2 - I_2 = 0 \qquad (17)$$

Thus, one magnetic loop could be made without any airgap since there is no DC bias in that loop as seen in FIG. 10*c* for the magnetic loop with inductor $L_2$ (on the right side). The other magnetic loop (on the left side) must have an air-gap $l_g$ to support DC load current I (for one-turn secondary). While inductance of the un-gapped core is very large and its ripple contribution is very small, the gapped side results in small inductance and its ripple current by far dominates the output ripple current. Therefore, this Integrated Magnetics implementation would result in elimination of separate cores for inductors, but no improvement in ripple current reduction over forward converter. Such ripple current improvement is analyzed in next section.

Output Ripple Current Evaluation

Figure 11C:
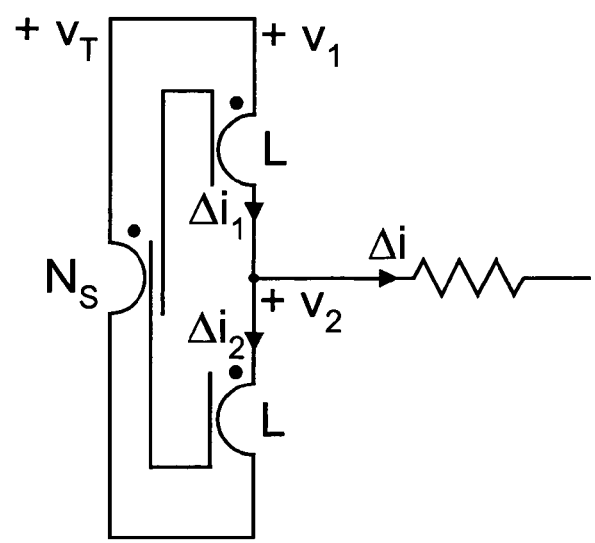
FIG. 11c illustrates the circuit model used for output ripple current evaluation.
Figure 12A:
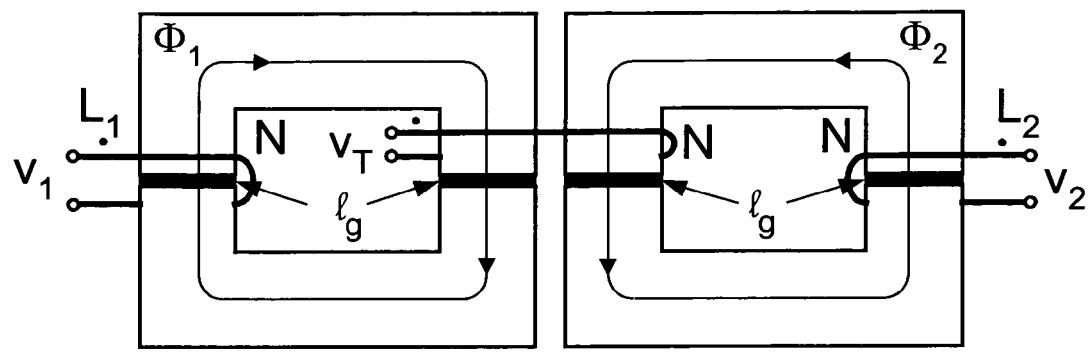
FIG. 12a illustrates a present invention Integrated Magnetics implementation for zero ripple current at 50% duty ratio and with no direct coupling between two inductors.

The output ripple current is, even in the case of the coupled windings as in FIG. 11*c* given as before in uncoupled case, as the difference between two inductor ripple currents by equations (5), (6), and (7). Note that the inductances here are defined as loop inductances $L_1$ and $L_2$ of the two magnetic loops as seen in FIG. 12*a* for a special case in which the total air-gap in the loop is split equally between the center legs and outer magnetic legs. As inductances are dominated by the air-gaps, total air gaps in each loop will determine respective total loop inductances $L_1$ and $L_2$.

From (7), condition for zero ripple current is $$L_2/L_1 = v_2/v_1 \qquad (18)$$

or in terms of the operating duty ratio D as $$L_1 = (1-D)/D \qquad (19)$$

Clearly in a special case $$L_2 = L_1 \ \text{for} \ D = 0.5 \qquad (20)$$

In another special case $$L_2 = 2L_1 \ \text{for} \ D = 1/3 \qquad (21)$$

Figure 12B:
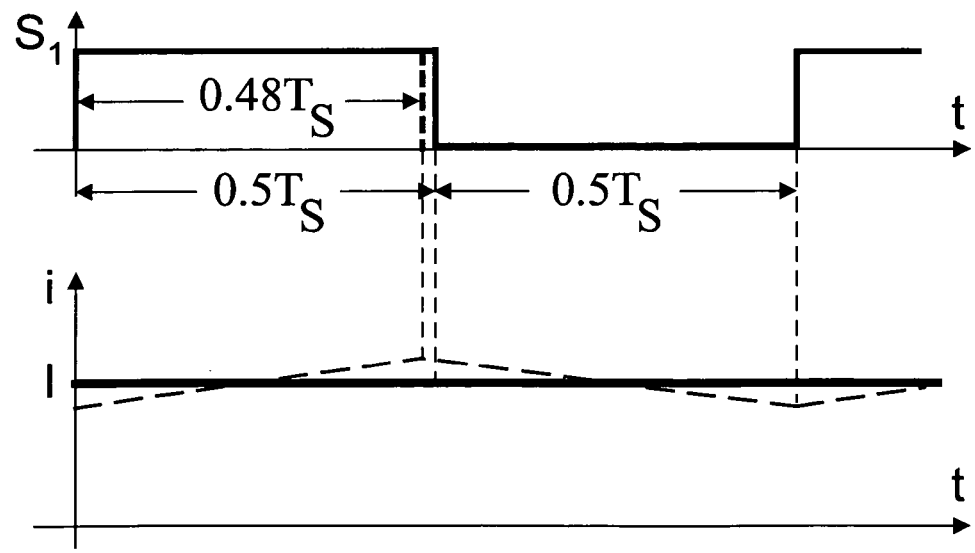

Therefore, to achieve beneficial zero ripple current at 50% duty ratio we intentionally introduce the air-gap in the right magnetic loop in FIG. 10*c* in order to satisfy equation (20) as illustrated in FIG. 12*a* to obtain zero ripple current at D=0.5 as shown in FIG. 12*b*. Hence, zero-ripple current is obtained at D=0.5 and reduced ripple current given by (7) is obtained away from D=0.5. Note that since each inductor carries 50% of DC current (D=0.5), and since the inductance L is typically small, the resulting individual inductor ripple currents $\Delta i_1 = \Delta i_2$ at D=0.5 are not zero and are given by:

$$\Delta i_{1(at D=0.5)} = 0.5 V T_S / L \qquad (22)$$

Clearly, output ripple will be higher when duty ratio is smaller and bigger than 50%. The change of output ripple current with duty ratio is then given by $$\Delta i = VT_S(1-2D)/L \quad (23)$$

In fact from (19) a zero ripple current on the output can be now obtained at any arbitrary duty ratio D and is not limited to 50% duty ratio (20) but also zero ripple can be obtained for example for D=1/3 as given by (21). This case will become very advantageous for applications of this DC-to-DC converter in AC-DC power supplies with front-end Power Factor Corrected (PFC) converter as introduced in the last section.

Figure 13A:
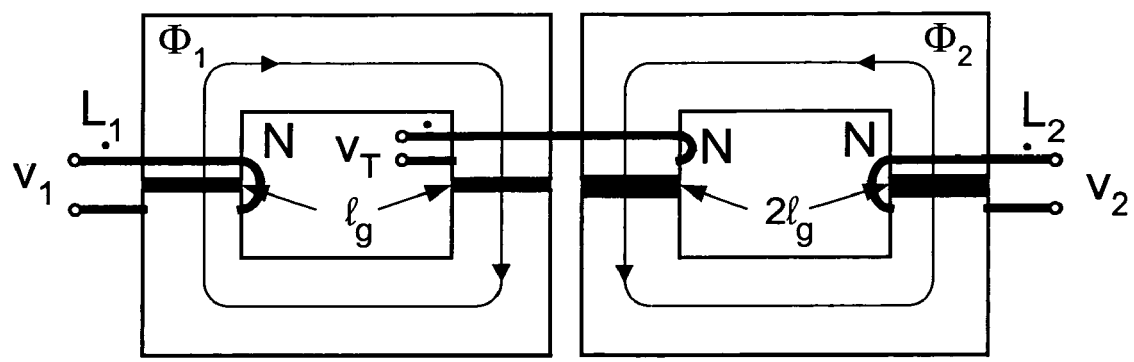
FIG. 13a illustrates a present invention Integrated Magnetics with 2:1 ratio of air-gaps adjusted for zero ripple at duty ratio D=0.33 as shown in FIG. 13b.
Figure 13B:
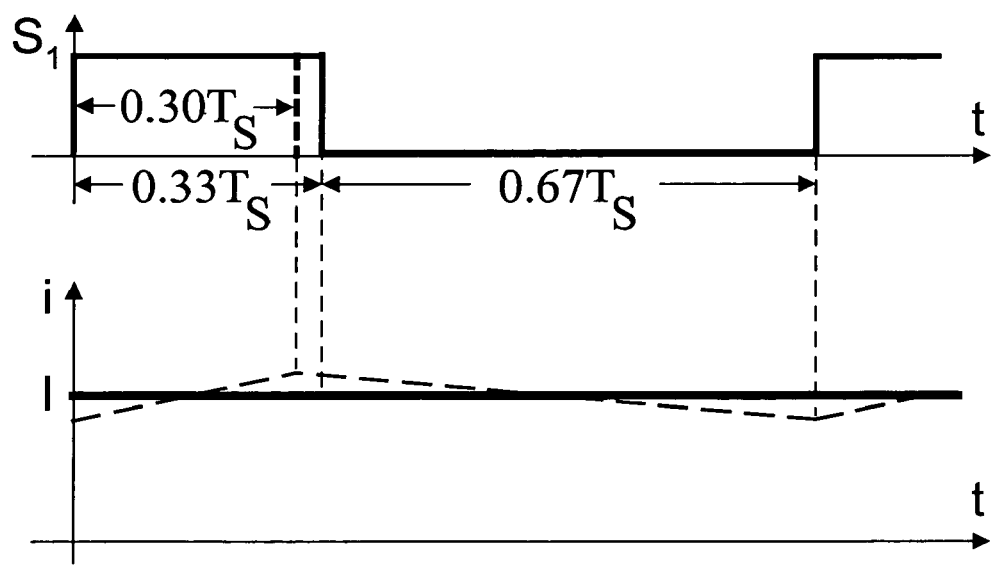

By simple doubling the air-gap in one of the two magnetic loops as in FIG. 13a zero ripple current can be also obtained as in FIG. 13b for duty ratio D=1/3. This is shown to be of special importance for AC-to-DC converter applications described in last section.

Figure 18A:
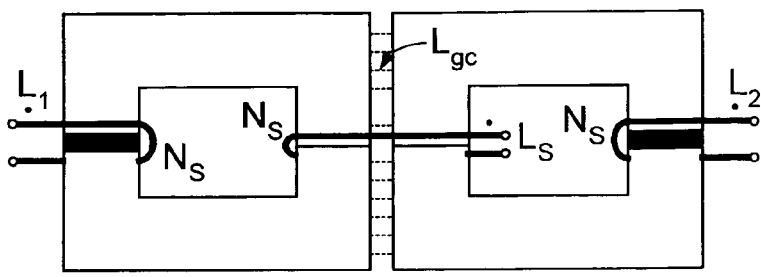
FIG. 18a illustrates UU core Integrated magnetics with air gaps concentrated on outer legs of two UU cores and each surrounded by respective inductor windings
Figure 18B:
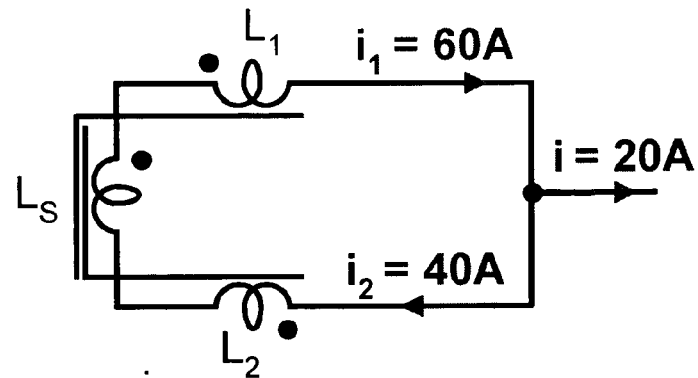
FIG. 18b illustrates the secondary side magnetic circuit with positive direction of the inductor ripple currents indicating that the output ripple current is the difference of the two inductor ripple currents
Figure 18C:
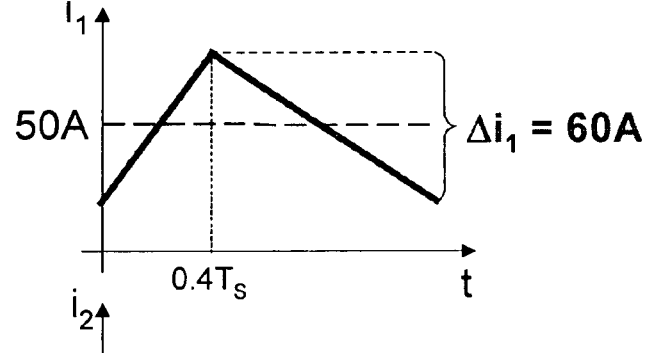
FIG. 18c illustrates large 60 A ripple current of inductor $L_1$ at duty ratio D=0.4
Figure 18D:
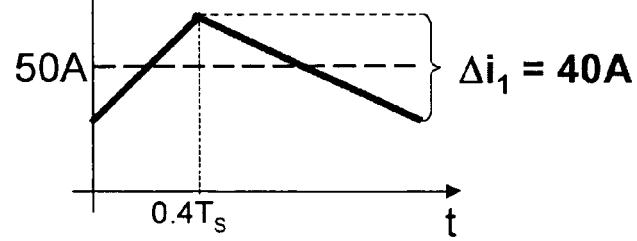
FIG. 18e illustrates 20 A output ripple current at D=0.4.
Figure 18E:
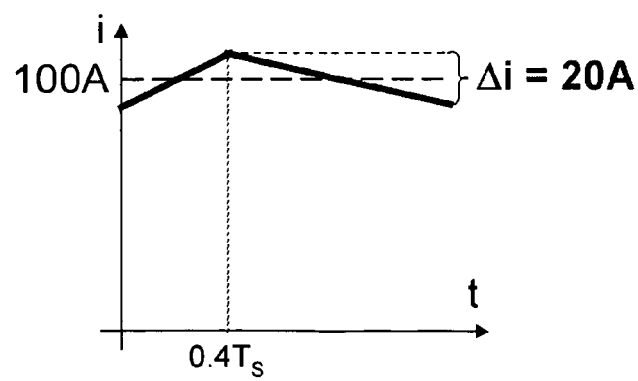

In the AC-to-DC converters discussed in last section, the output of PFC converter, which is the input to this DC-to-DC converter is 365V for nominal operation. When AC power is lost, this input DC voltage is during this default operation dropping to 240V, as the energy to the input is temporarily provided by output capacitors of the PFC converter for typical 20 msec hold-up time. This corresponds to short, transitional operation of the DC-to-DC converter between 0.4 and 0.6 duty ratio to result in approximately 1.5 factor between maximum and minimum input voltage. Thus, worst-case ripple currents can be calculated at two duty ratio extremes as $$\Delta i_1 = 0.4VT_S/L \; \Delta i_2 = 0.6VT_S/L \; \Delta i = 0.2VT_S/L \quad (24)$$

$$\Delta i_1 = 60\text{ A} \; \Delta i_2 = 40\text{ A} \; \Delta i = 20\text{ A} \quad (25)$$

for an example of 20 A worst case output ripple current. These large ripple currents are graphically illustrated in thick lines in graphs of FIG. 18cde. Note that output ripple current is still 3 times lower than in one of two output inductors. For this example, the inductor ripple currents at 50% duty ratio when zero-ripple output current is obtained, are equal and still very large 50 A confirming that the output ripple current is difference of the large inductor ripple currents. Of course, one could make individual ripple currents of each inductor much smaller than 50 A but at the great sacrifice in magnetics size and large increase in conduction losses and corresponding large degradation of efficiency.

Another Integrated Magnetics embodiment is introduced in later section which results in very small inductor ripple currents and without above negative effects of large inductor size and loss of efficiency. To the contrary, same size is achieved and efficiency further improved.

Advantages of the Magnetics Integration

In most applications the conversion from the high input voltage (such as rectified AC line of 300 VDC) to the low voltage of 5V or 3.3V and 2V is needed. In that case it is desirable to use only one turn for transformer secondary and one turn for output inductor in order to minimize winding conduction losses due to high currents. For low output voltages, the resulting low volt-sec requirements (flux) permit also a use of smaller sized magnetic cores. Thus so far the following advantages of integration of the two inductors into a single magnetic circuit of FIG. 10c and two preferred Integrated Magnetics implementations illustrated in FIG. 12a and FIG. 13a are already obtained:

1. Elimination of separate magnetic cores results in large reduction of magnetic and converter size.
2. Elimination of the magnetic core losses associated with two separate large magnetic inductors as the inductor windings are placed on the transformer structure and share the same flux paths with the transformer hence simultaneous increase of efficiency.
3. The converter and magnetics cost is reduced as less magnetic material is needed and magnetics winding are made on one magnetic piece instead of three separate pieces.
4. For low output voltage (12V and below) and high current application, single-turn output inductors are implemented as part of the output terminals structure to eliminate their winding cost.
5. Zero ripple current is made possible not only for a duty ratio of 50%, but for any other duty ratios and is therefore effective for AC-DC converter applications.
6. Reduction of the output ripple currents by a factor of 3 or more compared to a forward converter.

So far integration of magnetics has already resulted in one embodiment, which results in simultaneous reduction of the magnetics size, higher efficiency and smaller switching losses while maintaining low output ripple current features. Several new Integrated Magnetics embodiments are now introduced which provide further additional improvements: large reduction of inductor ripple currents and/or simplification for cost reduction.

Integrated Magnetics Embodiment with Two UU Cores and Air-Gaps Concentrated in the Center Legs with Transformer Windings Integrated Magnetic implementations of FIG. 12a and FIG. 13a are just two of a number of possible Integrated Magnetics implementations with two separate magnetic loops. However, the special implementation of FIG. 14a (same as FIG. 9c) brings an additional performance improvements over and above the one described so far.

Figure 14A:
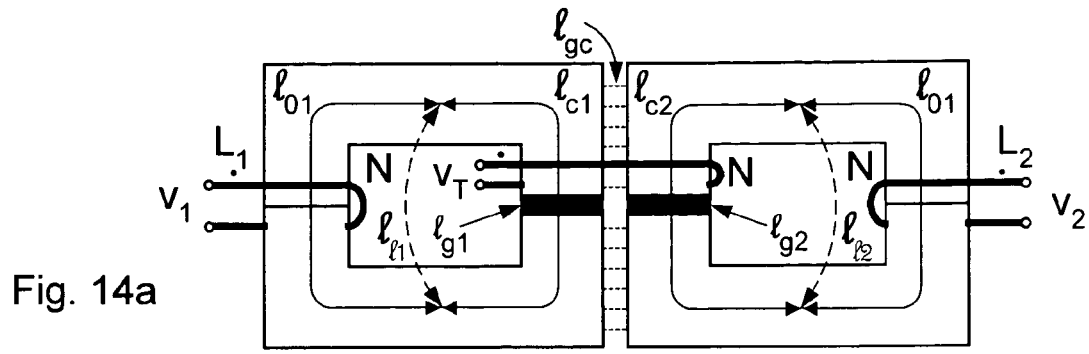
FIG. 14a illustrates a present invention Integrated Magnetics implementation with air-gaps concentrated on the center legs only.

Note that in the Integrated Magnetics of FIG. 14a the same separate two-loop magnetics cores are implemented. However, the two air-gaps are now concentrated on the center leg of the magnetic structure, on which the isolation transformer is wound. Note the absence of the air-gaps on outer magnetic legs where the respective output inductors are wound. This magnetics configuration results in very low ripple current in each of the two inductors windings. As the following analysis reveals, the positioning of the two air-gaps in the two magnetic loops, as in FIG. 14a, together with the fundamental relationship (7) lead to very low inductor ripple currents.

Figure 14B:
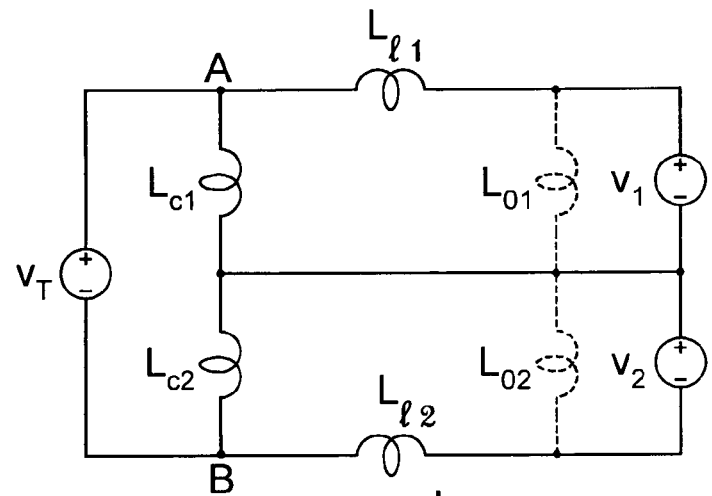
FIG. 14b illustrates a "physical" inductance circuit model for magnetic circuit in FIG. 14a, and FIG. 14c illustrates an equivalent circuit model of the circuit in FIG. 14b.
Figure 14C:
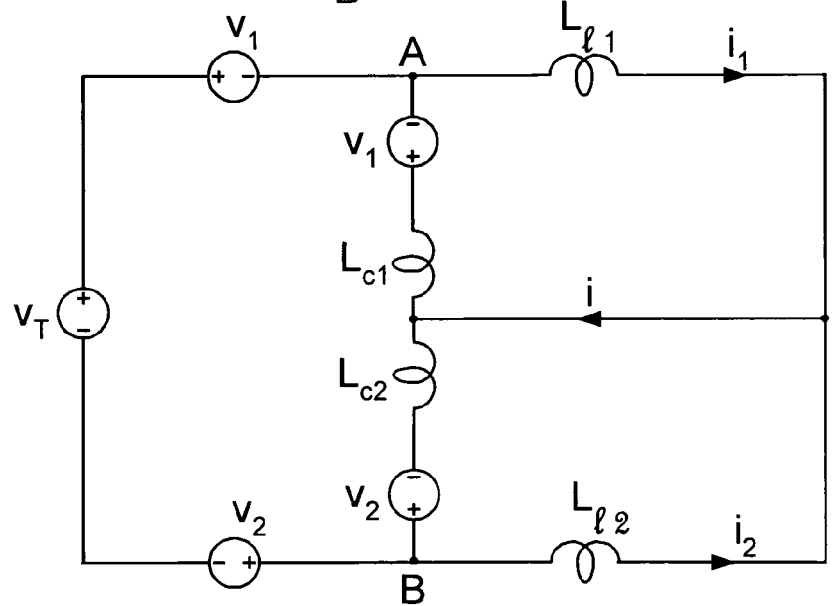
FIG. 14d illustrates an equivalent circuit model of the circuit in FIG. 14c.
FIG. 14e is Thevenin equivalent circuit model of the circuit in FIG. 14d.
FIG. 14f is an equivalent circuit model for zero ripple condition.

The previous simplified loop inductance model is no longer valid and a more accurate "physical" circuit model is needed to account accurately for such positioning of the air-gaps. To arrive at such model, magnetic path in each magnetic loop is now broken into two parts: one containing the air gaps and designated $l_{c1}$ and $l_{c2}$ and the other with no air-gaps and designated $l_{o1}$ and $l_{o2}$, while the leakage flux paths through the air (between top and bottom part of each loop) is designated $l_{l1}$ and $l_{l2}$. In the physical model, each respective flux path can be associated with corresponding inductance in the model of FIG. 14b, thus resulting in inductances $L_{c1}$, $L_{c2}$, $L_{01}$, $L_{02}$, $L_{l1}$ and $L_{l2}$ in the model where each inductance is defined by:

$$L_{01} = N^2 \mu_r \mu_0 S/l_{01} \; L_{02} = N^2 \mu_r \mu_0 S/l_{02} \quad (26)$$

for magnetic path with no air-gap and $$L_{c1} = N^2 \mu_0 S/l_{g1} \; L_{c2} = N^2 \mu_0 S/l_{g2} \quad (27)$$

for the magnetic path containing the air-gaps $l_{g1}$ and $l_{g2}$ as the air-gaps dominate the respective flux paths and result in large reduction of their inductance value. In (26) and (27), N is number of winding turns, S is core cross-section of the core flux path, $\mu_r$ is the relative permeability of the magnetic material which for ferrite material is large and around 2,000 to 3,000. Therefore, the un-gapped inductances $L_{O1}$ and $L_{O2}$ are very large and in the first approximation they can be removed from the model in FIG. 14b as indicated by their dotted line designations. Then AC sources $v_1$ and $v_2$ can be moved through the respective two nodes A and B, to result in equivalent circuit model in FIG. 14c. Note now the significance of the equation (11) which leads to an effective short circuit between the nodes A and B since $v_d=0$ resulting in the equivalent circuit in FIG. 14d.

If this were not the case, even a small non-zero voltage source $v_d$ could generate a large circulating current in the loop containing the very small leakage inductances $L_{l1}$ and $L_{l2}$. This is a special feature of the Integrated Magnetics structures introduced here for the first time, which is not present in the prior-art Integrated Magnetics circuits as described in separate section comparing two Integrated Magnetics methods.

Figure 14D:
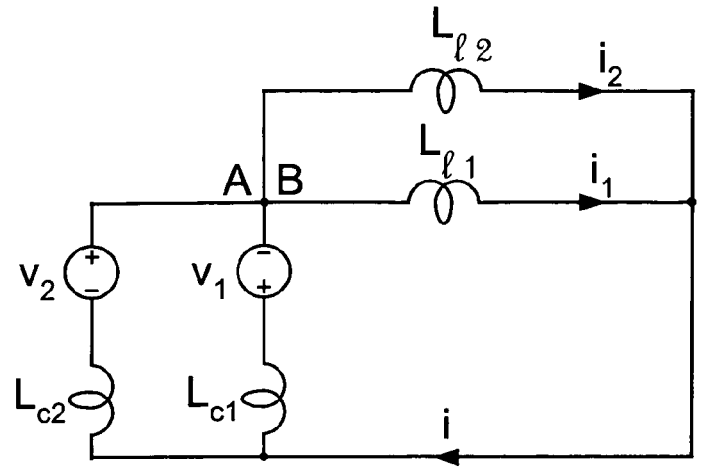
Figure 14E:
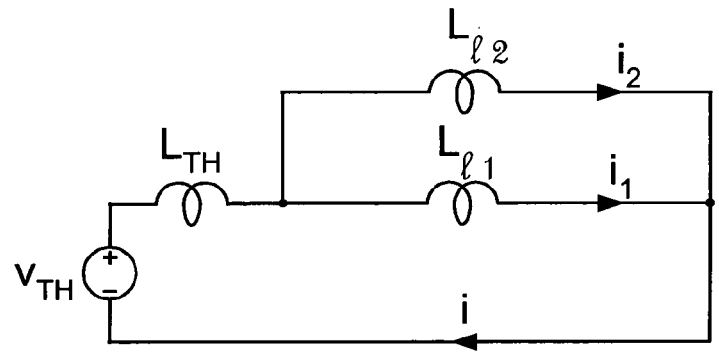
Figure 14F:
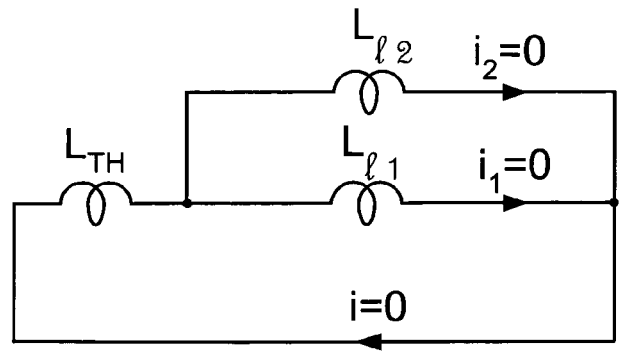
Figure 15A:
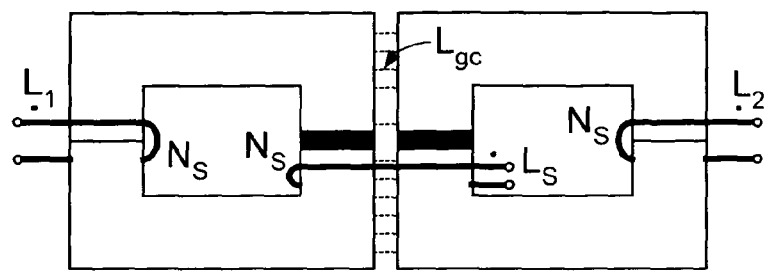
FIG. 15a illustrates UU core Integrated magnetics with air gaps concentrated on the center magnetic legs with transformer winding surrounding the gap.
Figure 15B:
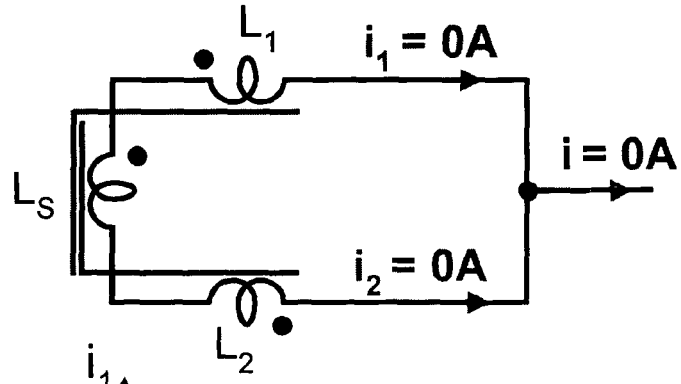
FIG. 15b illustrates the secondary side magnetic circuit with positive direction of the inductor ripple currents.
Figure 15C:
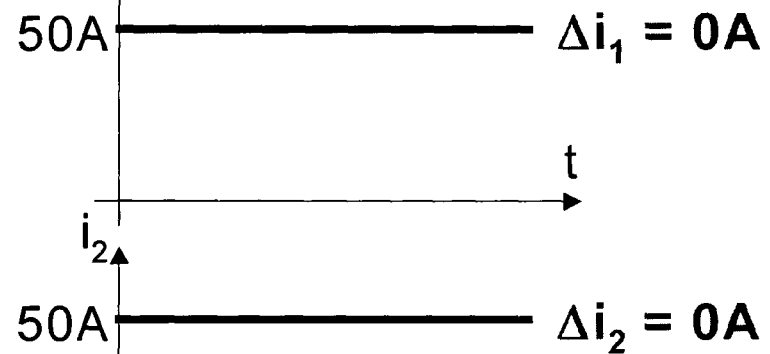
FIG. 15c illustrates zero ripple current of inductor $L_1$ at duty ratio D=0.5.
Figure 15D:
FIG. 15d illustrates zero ripple current of inductor $L_2$ at duty ratio D=0.5
Figure 15E:
FIG. 15e illustrates zero-ripple current feature of the converter output current at duty ratio D=0.5.
Figure 16A:
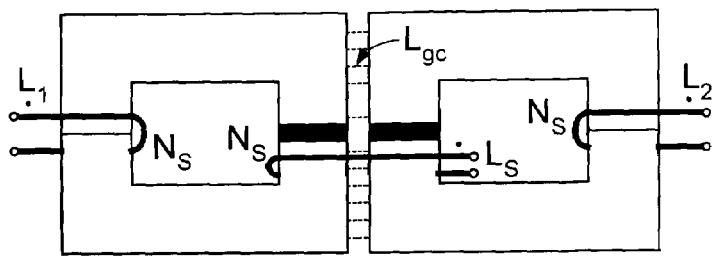
FIG. 16a illustrates UU core Integrated magnetics with air gaps concentrated on the center magnetic legs with transformer winding surrounding the gaps.
Figure 16B:
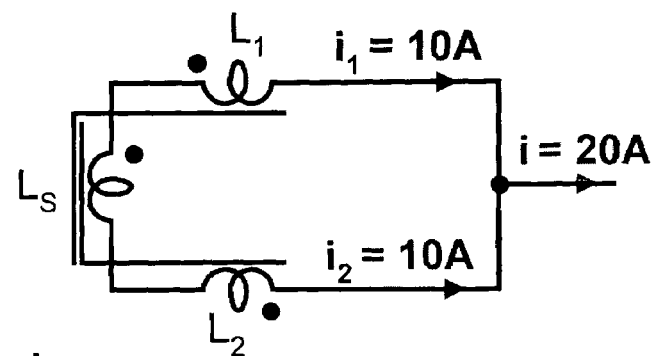
FIG. 16b illustrates the secondary side magnetic circuit with positive direction of the inductor ripple currents indicating that the output ripple current is the sum of the two inductor ripple current.
Figure 16C:
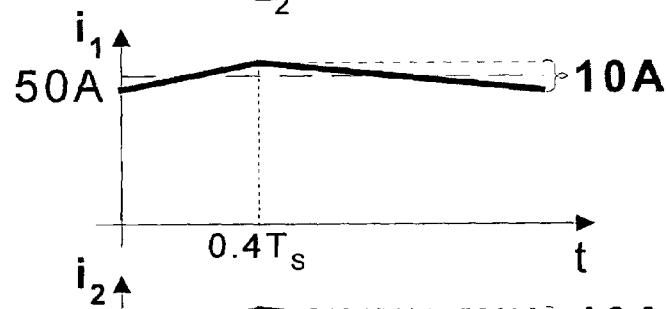
FIG. 16c illustrates reduced 10 A ripple current of inductor $L_1$ at duty ratio D=0.4.
Figure 16D:
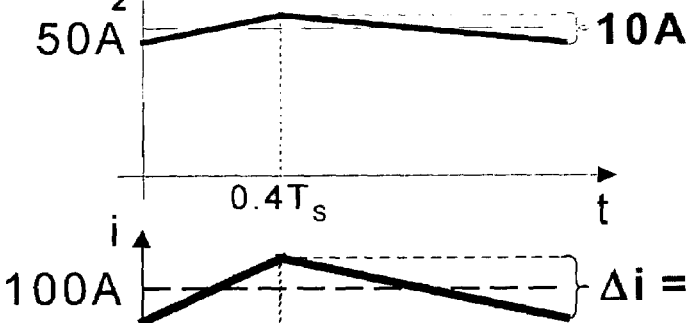
FIG. 16d illustrates reduced 10 A ripple current of inductor $L_2$ at duty ratio D=0.4
Figure 16E:
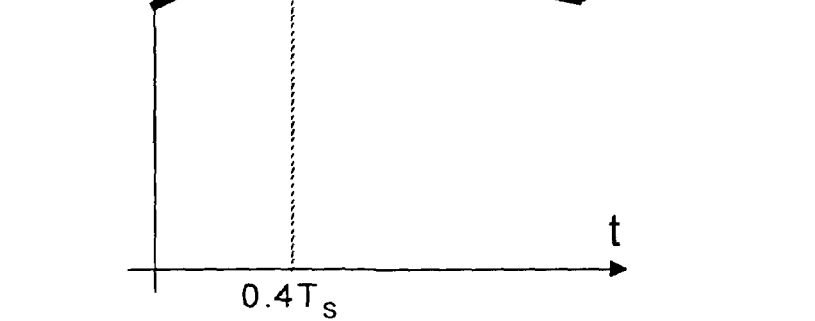
FIG. 16e illustrates 20 A output ripple current at duty ratio D=0.5 indicating that it is the sum of two inductor ripple currents.
Figure 17A:
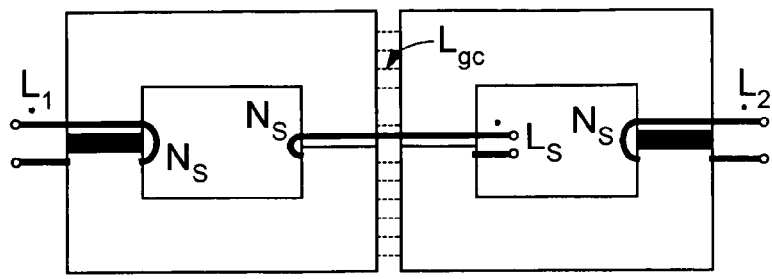
FIG. 17a illustrates UU core Integrated magnetics with air gaps concentrated on outer legs of two UU cores and each surrounded by respective inductor windings.
Figure 17B:
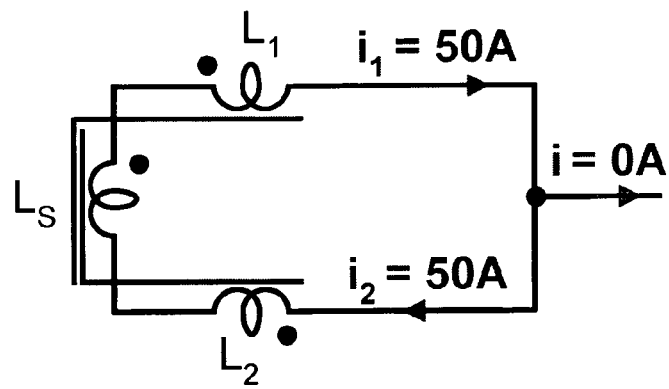
FIG. 17b illustrates the secondary side magnetic circuit with positive direction of the inductor ripple currents indicating that the output ripple current is the difference of the two inductor ripple currents.
Figure 17C:
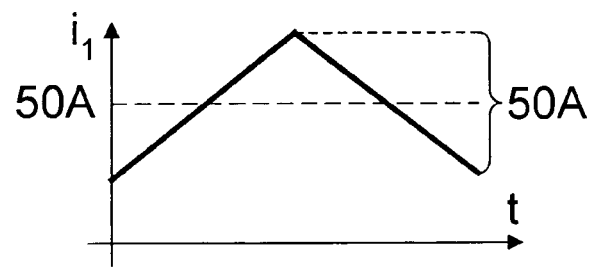
FIG. 17c illustrates large 50 A ripple current of inductor $L_1$ at duty ratio D=0.5.
Figure 17D:
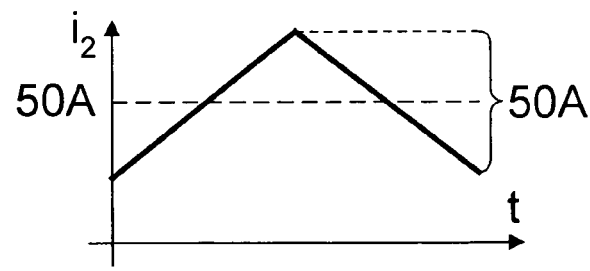
FIG. 17e illustrates zero ripple output current at D=0.5.
Figure 17E:
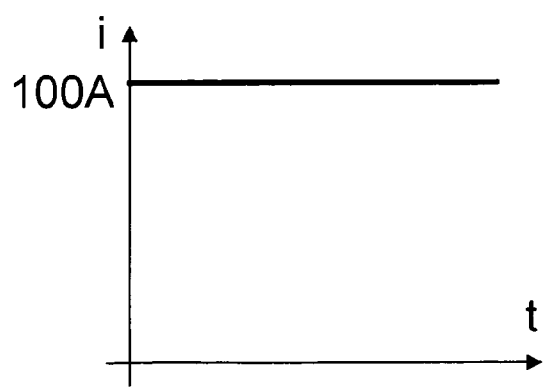

Finally, the circuit to the left of the nodes A and B in FIG. 14d can be modeled by an equivalent Thevenin AC generator $v_{th}$ and an equivalent Thevenin inductance $L_{TH}$ to obtain equivalent circuit model in FIG. 14e in which $$v_{th}=(L_{c1}v_2-L_{c2}v_1)/(L_{c1}+L_{c2}) \tag{28}$$

$$L_{th}=L_{c1}L_{c2}/(L_{c1}+L_{c2}) \tag{29}$$

From the model in FIG. 14e the output ripple current can be evaluated as $$\Delta i=T_S(v_1/L_{c1}-v_2/L_{c2})CF \tag{30}$$

$$CF=1/(1+L_L/L_{th}) \tag{31}$$

where CF is a leakage correction factor due to the effective leakage inductance $L_L$, which from FIG. 14e is parallel connection of two leakage inductances $L_{l1}$ and $L_{l2}$. Typically this correction factor is around 0.8. Output ripple current given by (30) is then smaller than the one given by earlier equation (7) due to this correction factor CF. Note that inductors $L_{c1}$ and $L_{c2}$ in equation (30) are taking the role of inductors $L_1$ and $L_2$ in equation (7) and would result in same numerical result if correction factor was not included.

The model in FIG. 14e results in output ripple currents with striking difference to the original Integrated Magnetics implementation with equally distributed air-gaps in the magnetic loops of FIG. 12a. The output ripple current is now from the models in FIG. 14d and FIG. 14e equal to the sum of the ripple currents in the two leakage inductors $L_{l1}$ and $L_{l2}$. The inductances associated with the un-gapped flux paths $L_{O1}$ and $L_{O2}$ would contribute only a very small correction part in the output inductor ripple currents since they are very large due to no gap. With their removal from the model, the leakage inductor currents represent the dominant part of the output inductor ripple currents and represent approximately the output inductor ripple currents. Thus, in the model of FIG. 14d and FIG. 14e these leakage inductance currents are designated as inductor currents to simplify the remaining analysis. The actual experimental verification included in the last section does show that the individual inductor currents are not quite equal. Slight difference is then attributed to these small currents due to the un-gapped flux paths $L_{O1}$ and $L_{O2}$.

With the above approximation the output ripple current is not the difference of individual inductor currents as before in (7), but their sum such that $$\Delta i=\Delta i_1+\Delta i_2 \tag{32}$$

Thus, due to above summation of ripple currents one might expect higher output ripple currents than before. However, just the opposite is the case. Due to symmetry, the two leakage inductances are in practice equal, resulting from the model in FIG. 14e in equal inductance ripple currents, hence $$\Delta i_1=\Delta i_2 \tag{33}$$

which together with (32) results in $$\Delta i_1=\Delta i_2=0.5\Delta i \tag{34}$$

$$\Delta i_1=(0.5-D)VT_S/L\ \Delta i_2=(0.5-D)VT_S/L\ \Delta i=(1-2D)VT_S/L \tag{35}$$

Zero Ripple Currents Simultaneously in Both Inductors and Converter Output

Therefore, for a special case of duty ratio D=0.5 we get that all three ripple currents are zero:

$$\Delta i_1=0\ \Delta i_2=0\ \Delta i=0 \tag{36}$$

This is graphically illustrated in FIGS. 15a-e. Note that even when the operating point is moved away of D=0.5, such as for example, D=0.4, the inductor ripple currents are still rather small and equal to $$\Delta i_1=10\ A\ \Delta i_2=10\ A\ \Delta i=20\ A \tag{37}$$

This is illustrated in FIGS. 16a-e.

Figure 20A:
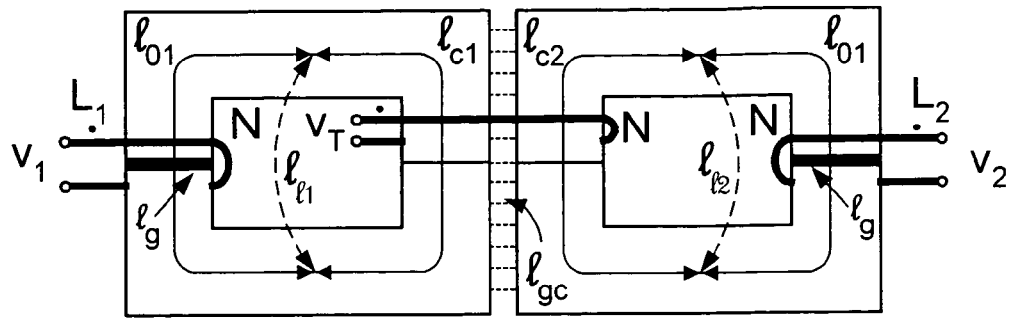
—FIG. 20a illustrates Integrated Magnetics with two loops and air-gaps in outer legs only
Figure 20B:
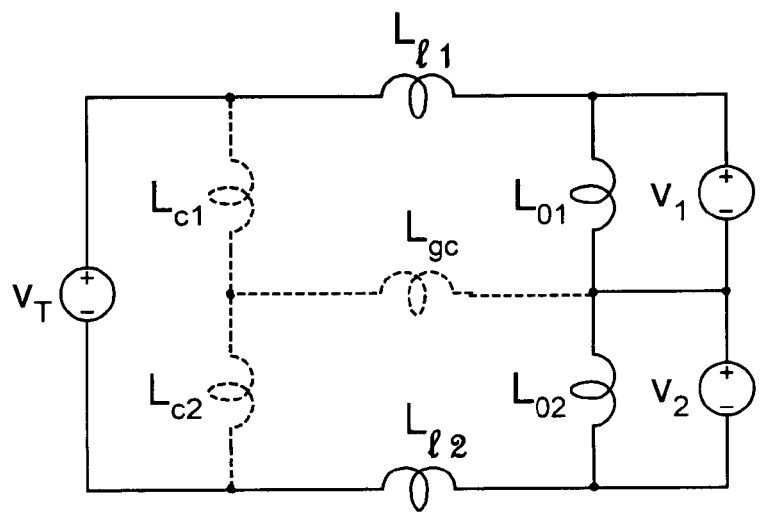
FIG. 20b illustrates the circuit model for the Integrated Magnetics circuits of FIG. 20a and FIG. 20c illustrates Integrated Magnetics with EE core and air-gaps in outer legs only.

Integrated Magnetics Embodiment with Two UU Cores and Air-Gaps Concentrated in Two Outer Legs Each with One Inductor Winding Yet another Integrated Magnetic implementation with two separate magnetics loops (and two UU cores) is possible as illustrated in FIG. 20a in which the air-gaps are concentrated on outer legs. It is now interesting to compare the two inductor ripple currents and output ripple currents under the same operating conditions (that is, D=0.5 and D=0.4) but for the Integrated Magnetics structure in which the two air-gaps are positioned differently: instead of being concentrated on the center magnetic legs of the two UU cores as in FIG. 14a, they are now concentrated on the outer legs of the two UU cores as illustrated in FIG. 20a. The "physical" circuit model based on the actual reluctance paths of various fluxes in the magnetic circuit leads to the model illustrated in FIG. 20b but with the inductance definitions now interchanged from those in (26) and (27) so that:

$$L_{c1}=N^2\mu_r\mu_{d0}S/l_{O1}\ L_{c2}=N^2\mu_r\mu_0S/l_{O2} \tag{38}$$

for magnetic path with no air-gap and $$L_{O1}=N^2\mu_0S/l_{g1}\ L_{O2}=N^2\mu_0S/l_{g2} \tag{39}$$

for the magnetic path with air-gaps, as the outer legs now contain air-gaps. This time inductances $L_{c1}$ and $L_{c2}$ are very large (no air-gaps) and are therefore marked with dotted lines in model of FIG. 20b denoting that these inductances could be left out of the model with little effect on accuracy of the ripple current calculations in output inductors. This time also the leakage inductances $L_{l1}$ and $L_{l2}$ can also be to the first approximation shorted as they are small and have negligible effect on inductor ripple currents. In fact, the remaining inductors $L_{O1}$ and $L_{O2}$ are approximately equal to the loop inductances $L_1$ and $L_2$ of each of the two UU core loops as introduced with respect to FIG. 10c and FIG. 12a. Thus, the ripple currents can be calculated from the same equations (5-7) as introduced earlier for current-doubler converter of FIG. 8a. By introducing the dependence on operating duty ratio D we get:

$$\Delta i_1=(1-D)T_SV/L\ \Delta i_2=DT_SV/L_2\ \Delta i=\Delta i_1-\Delta i_2=VT_S(1-2D)/L \tag{40}$$

Now we can calculate the ripple currents at D=0.5 as $$\Delta i_1=50\ A\ \Delta i_2=50\ A\ \Delta i=0\ A \tag{41}$$

which are also illustrated by waveforms in FIGS. 17*a-e*. Note the presence of a very large 50 A ripple currents in each of the two inductors even when the output ripple current is zero at that operating point.

Calculating ripple-currents at D=0.4 results in $$\Delta i_1 = 60\text{ A } \Delta i_2 = 40\text{ A } \Delta i = 20\text{ A} \quad (42)$$

which is also illustrated by waveforms in FIGS. 18*a-e*. Once again, note that one inductor ripple current is now 60 A (50 A larger than 10 A in previous case) while the other ripple current is 40 A. Note that 40 A can be represented as a difference of 50 A and 10 A. Thus, one detects that in fact there is an additional circulating current of 50 A present in the converter with this Integrated Magnetics implementation of FIG. 20*a* in comparison with one in FIG. 9*c* and FIG. 14*a*.

Advantages of IMZERO Integrated Magnetics Structure

Figure 9B:
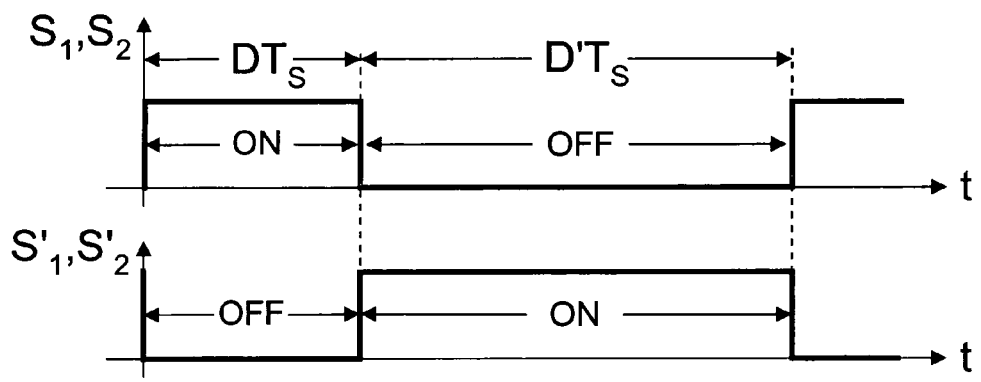
FIG. 9b illustrates the hard switching drive control for converter in FIG. 9a, and FIG. 9c illustrates one preferred Integrated Magnetics implementation.
Figure 9C:
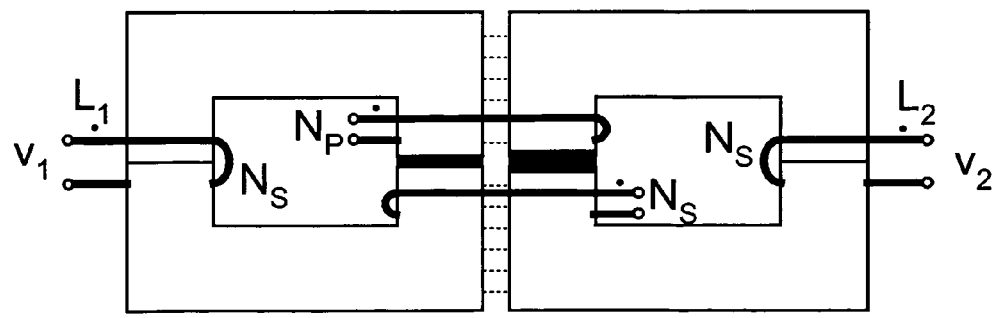

Because of its special performance advantages, the Integrated Magnetics structure of FIG. 9*c* is dubbed IMZERO magnetics structure in which just positioning of the air-gaps in a center magnetic legs eliminates a huge circulating current from the converter output. Clearly this results in performance improvements in many areas: elimination of large secondary side ripple currents eliminates also the respective copper losses associated with it, reduces magnetics temperature rise and increases overall efficiency as well as reduces the conducted and radiated noise and output ripple voltages. In this configuration the output inductor ripple current is not the difference of the large inductor currents, but instead, it is the sum of the two small inductor currents. As a result in this Integrated Magnetics implementation the large circulating current present in the secondary side loop consisting of the transformer secondary, and two inductors, is effectively eliminated.

Figure 8C:
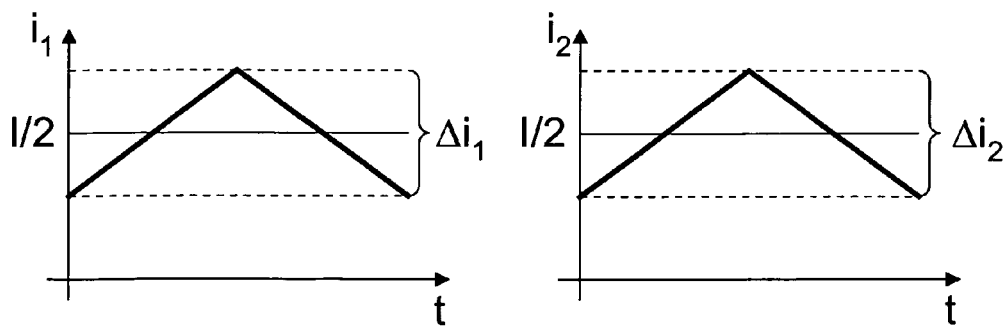

It is now very instructive to compare the ripple current performance of the Integrated Magnetics Switching converter of FIG. 9*a* and its Integrated Magnetics implementation of FIG. 9*c* with the Current Doubler converter of FIG. 8*a* with two separate inductors. In order to obtain such zero ripple current performance, the converter of FIG. 8*a* would need inductors with huge, and, in fact, infinite inductances in order to reduce its peak-to peak ripple currents of 50 A or more as seen in FIG. 8*c*. This is clearly impossible since the very same inductors carry the large DC currents (50 A each or more) so they must have large air-gaps. Thus, use of large number of turns (certainly a lot higher than 1 turn for inductors in converter of FIG. 9*a*) would enormously increase the size of the magnetics and its copper losses and yet still could not provide zero ripple currents in two inductors as the converter in FIG. 9*a* does. The experimental verification of this zero ripple current phenomenon in which all three ripple currents (output and two inductor ripple currents) are simultaneously ripple free is included in the last Experimental Verification section.

Comparison with (37) and (42) shows a reduction of inductor ripple currents by a factor of 6 and 4 respectively. Practical results are even better than that. Due to positioning of the air-gaps on the center legs, there is a cross coupling between the two magnetic loops as shown by "stray coupling" flux path $l_C$ in the circuit of FIG. 14*a*. The two separate magnetic loops must, in fact, be separated by sufficient non-magnetic spacer of a few mm in thickness. If the two magnetic loops were not separated at all, both outer legs would saturate due to the presence of substantial DC flux in outer magnetic loops consisting of two inductors and no air-gap in these loops to prevent the saturation.

Figure 19A:
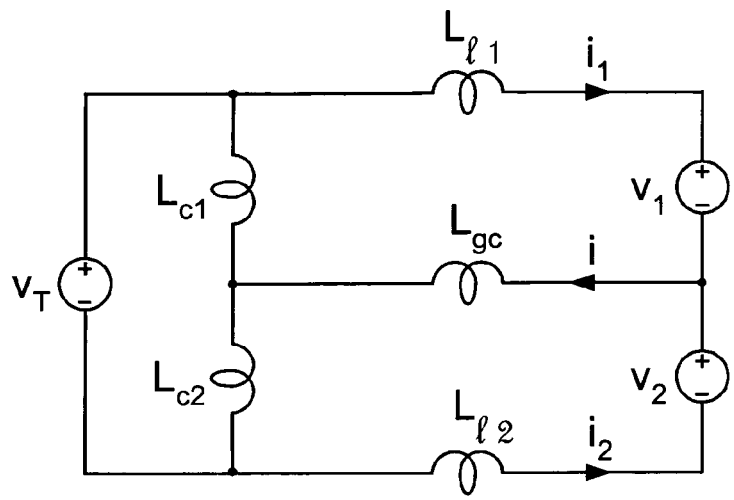
FIG. 19a shows a magnetic circuit model with added "gap coupling" inductance $L_{gc}$ between two magnetics loops.
Figure 19B:
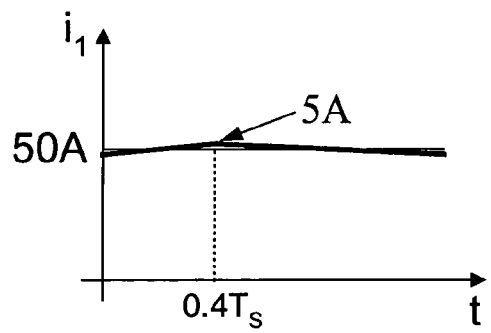
FIG. 19b illustrates 5 A ripple current of inductor $L_1$.
Figure 19C:
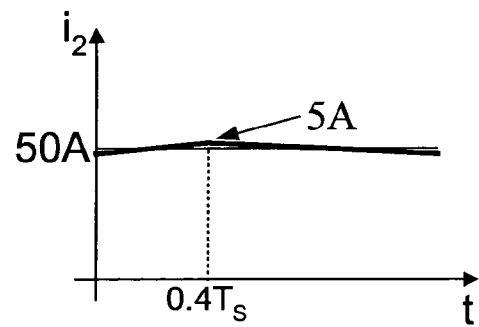
FIG. 19c illustrates 5 A ripple current of inductor $L_2$.

The addition of the spacer gap results in the insertion of an inductance Lgc due to the coupling of the two loops because of the spacer gap between them as seen in the model of FIG. 19*a*. In most practical cases inductance $L_{gc}$ is comparable in value with the center gap inductances $L_{c1}$ and $L_{c2}$ resulting in an effective additional reduction of all three ripple currents by a factor of two as is illustrated graphically in the ripple comparison of FIG. 19*b* and FIG. 19*c*. Hence, the original inductor ripple currents of 60 A and 40 A are effectively reduced to 5 A each for a reduction ratio of 12 and 8 respectively. Furthermore, the output ripple current is reduced in half, from 20 A to 10 A. Further reduction of output ripple current and of both inductors can be realized very efficiently by adding external separate inductor $L_{EXT}$ in series output inductor as illustrated in FIG. 9*a*. In that case, the external inductance $L_{EXT}$ is acting like an additional inductance added in series with $L_C$ inductance in the model of FIG. 19*a* resulting in further reduction of the output ripple current.

Figure 19D:
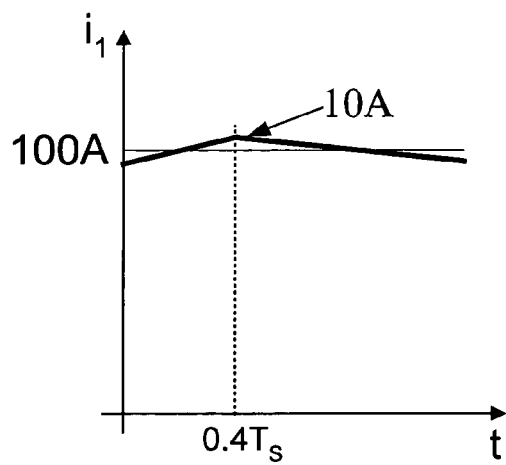
FIG. 19d illustrates 10 A output ripple current and FIG. 19e illustrates the transformer secondary current with small 5 A triangular ripple current added to large square
Figure 19E:
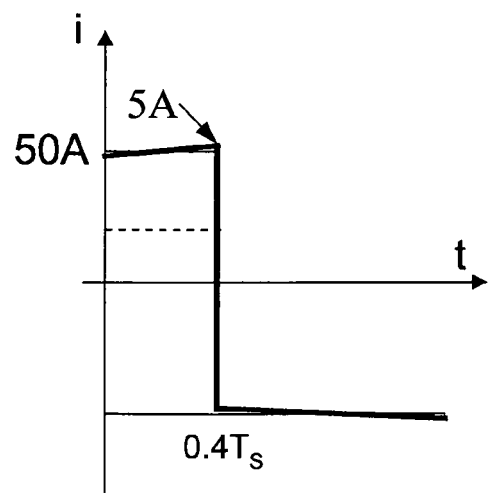

In conclusion, just a special positioning of the air-gaps has resulted in an effective reduction of inductor ripple currents of 12 and 8 times compared to the equally distributed gaps. This improved Integrated Magnetics implementation has effectively removed a large circulating current of 50 A flowing in the circuit loop containing two inductors and transformer secondary winding. Therefore transformer secondary current is also a square-wave like without huge superimposed peak ripple currents of 50 A. This is so due to the fact that transformer secondary alternatively conducts either one or the other inductor current and as such takes with it their respective low ripple currents shown in solid lines in FIG. 19*d*. The dotted lines in FIG. 19*d* illustrate transformer current of previous Integrated Magnetics implementation of FIG. 12*a*. Elimination of the large 50 A circulating current results in much improved operation of the output switching devices since these large additional 60 A and 40 A peak ripple currents are no longer present in switching devices. Therefore, the device turn-OFF peak currents are much reduced and more efficient and reliable operation of switches is obtained.

The remaining question is: where did the high ripple currents on the transformer secondary and two output inductors go? The answer is that they were shifted to the transformer primary side. The experimental verification included in the last section confirms that the large circulating ripple current on secondary of 50 A is eliminated and only a small ripple current of a few Amperes is present on the high 400V voltage primary low current side and on the primary side switches. In fact this performance feature is obtained for "free". The peak transformer currents on the primary side as well as the peak switch currents on the primary side stay the same regardless of the presence or absence of any circulating ripple current (large or small) on the secondary side.

Efficiency Improvement

The Integrated Magnetics embodiment in FIG. 9*c* clearly results in further efficiency improvements due to elimination of magnetic core losses associated with the large circulating current ripple as the experimental data also confirmed. The prototype of a 450 W, 400V to 5V converter based on Integrated Magnetics of FIG. 9*c* resulted in efficiency of 97% for 75 A load currents and 96.8% for full load efficiency. Obviously, the efficiency improvement at no load is by far the most significant, since at no load the damaging effect of circulating current is most pronounced. This is confirmed on experimental prototype in which 30% to 40% of loss reduction is observed at no load. This feature is especially very useful for the green power applications where no load losses must be reduced to minimum.

Radiated Noise Improvement and Ripple Voltage Reduction

Besides efficiency improvement another important feature of this Integrated Magnetics embodiment in FIG. 9*c* is the reduction of the radiated noise, since the air-gaps are concentrated on the center leg and are enclosed with the transformer windings carrying AC currents serving as a shield for radiated noise emanating from the air-gap. The reduction of the radiated noise is important to prevent induction of the AC ripple currents into the converter output DC terminals and lead to ultra low output ripple voltage performance as demonstrated by an experimental prototype. Furthermore, the two output inductors carry now very low 5 A output ripple current, for a converter delivering 100 A output DC load current.

Integrated Magnetics Structures with a Single EE Core

Air-Gaps in Outer Legs Only

Figure 20C:
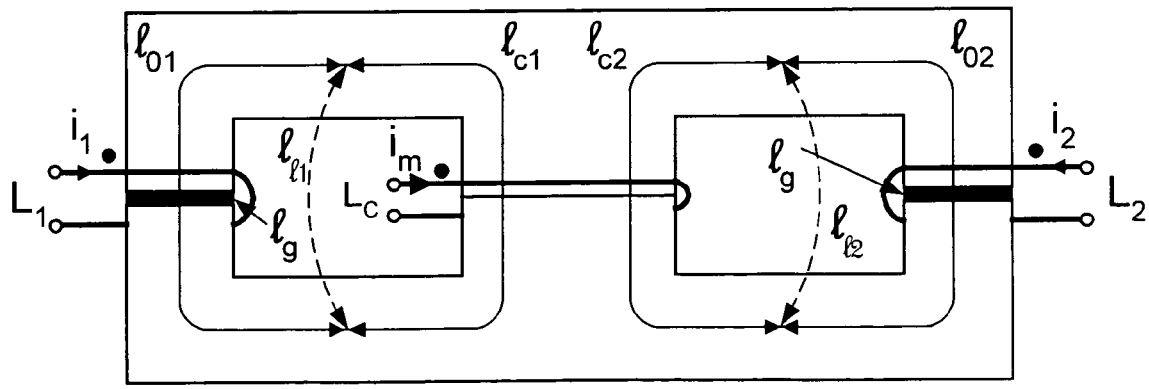

The above examples illustrated two preferred Integrated Magnetics structures which consists of two magnetic loops and hence uses two separate magnetic cores of UU type. Another objective is to find now another Integrated Magnetics implementation, which utilizes only one magnetic core so that cost could be reduced. One such core implementation is using EE core as in FIG. 20c. This may be preferred solution when simplicity and low cost of implementation is the primary objective. Furthermore this core satisfies the original requirement imposed on coupling requirement of Integrated Magnetics of the converter in FIG. 9a. Due to the placement of the air-gaps in the outer magnetic legs and no air-gap on the center leg, the output inductors are NOT coupled directly to each other but instead they are coupled to the transformer winding on the center leg. The corresponding "physical" circuit model was already shown in FIG. 20b which after removal of dotted line inductances due to the un-gapped center legs, reduces to the original loop inductances model with large ripple currents in two inductors given by equations (5), (6) and (7).

Air-Gaps in All Three Legs

All above Integrated Magnetics implementations were based on the main assumption and prerequisite that the direct coupling between the output inductor windings is not allowed as also illustrated by the special coupling symbol in FIG. 10b. We will now effectively remove this requirement and introduce yet another Integrated Magnetics embodiment of the present invention shown in FIG. 21a in which coupling between all three winding is, in fact, allowed as demonstrated by the additional coupling line between two inductor windings shown in bold faced lines in FIG. 21a. Note, however, that this still does not mean that all three windings can be placed on the single loop common core. Once again a special magnetic core with two clearly distinguishable magnetic loops such as EE core of FIG. 21b must be used. The physical model of FIG. 21c can be used to evaluate ripple currents in two inductors. In this model two flux paths, $l_{C1}$ and $l_{C2}$ result in a single inductance $L_C$ in the model of FIG. 21c. In this model, all three inductances are comparable and none can be removed from the model. The output ripple current is, once again, the difference of two inductor ripple currents. Note that one might be tempted to calculate the effective inductances at the two output inductor terminals and use them in lieu of previous loop inductances. The "physical" model now clearly shows that this is wrong. The size of the air-gap in the center leg does not affect at all the outer leg inductances $L_{o1}$ and $L_{o2}$, which control the ripple currents in output inductor windings. Therefore, for zero ripple at 50% duty ratio an equal air-gap in all three legs is possible, thus eliminating the need for grinding the core. For zero ripple at D=1/3, two possibilities exist as seen in FIG. 22a and FIG. 22b: equal smaller gaps in two legs (one outer and center), or equal bigger gaps in two legs. In both cases, the ratio of the air-gaps on outer legs is the only determining factor and not the total air-gap in the center leg. Ideally that ratio is 2:1 for zero ripple at D=1/3 as illustrated in FIG. 22c. In practice, the effect of fringing flux has to be taken into account, which leads to experimental adjustment around theoretically calculated air-gaps.

The remaining possibility with EE cores might appear to be to place all the air-gaps in the center leg and no air-gaps in the outer legs, similar to the two-loop Integrated Magnetics structure of FIG. 14a in which the paper spacer between separate magnetics loops is reduced to zero. This, however, cannot be done as the outer legs of the EE cores would then saturate due to the presence of the DC bias in that loop but no presence of the air-gap in that loop to prevent saturation.

Comparison with Previous Integrated Magnetics Structures

Figure 21A:
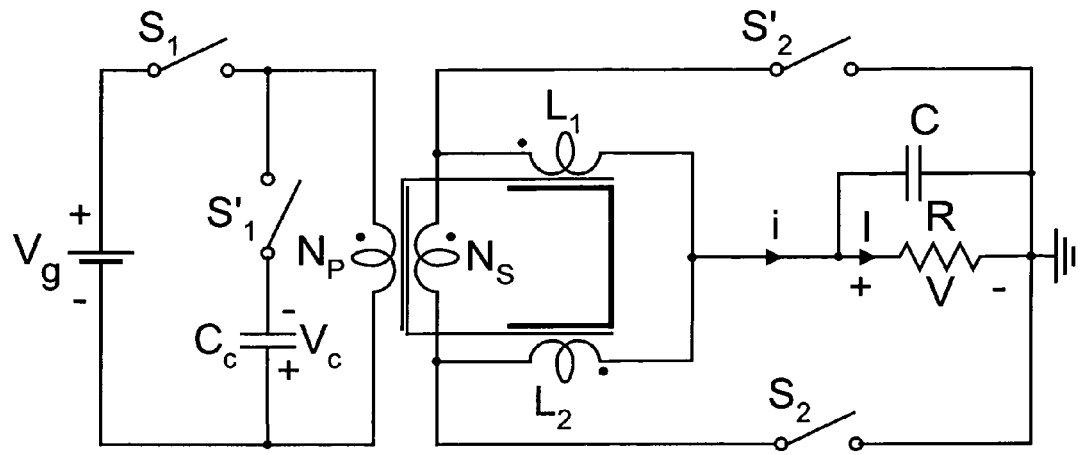
FIG. 21a illustrates a converter in which output inductors are directly coupled as indicated by thick lines.
Figure 21B:
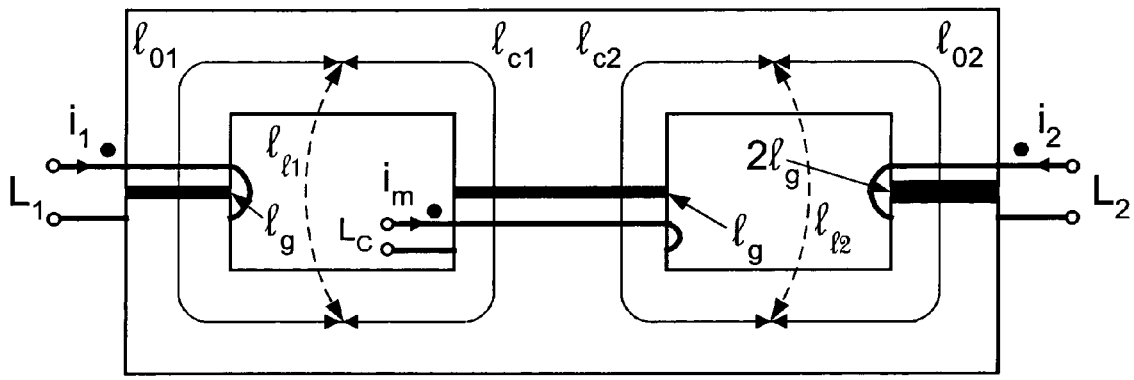
FIG. 21b illustrates EE core implementation of Integrated Magnetics with an air-gap in each of the three legs.
Figure 21C:
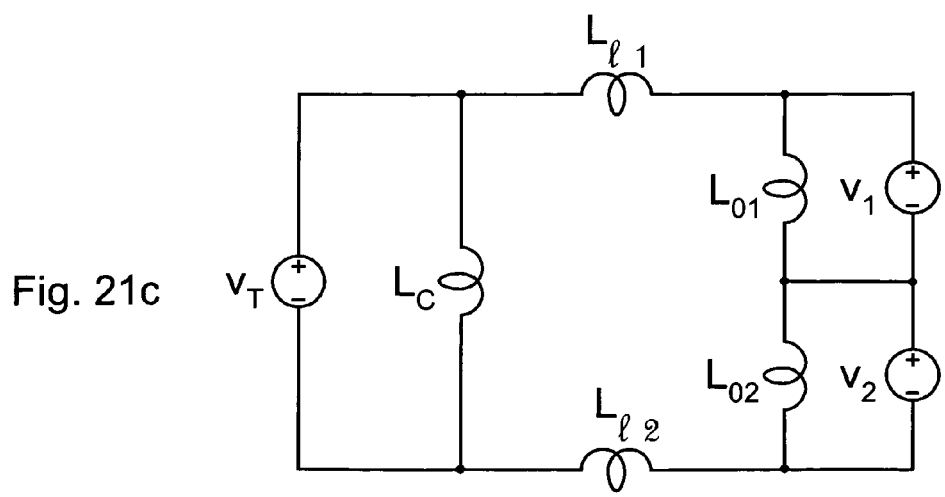
FIG. 21c illustrates circuit model for Integrated Magnetics of FIG. 21b.
Figure 22A:
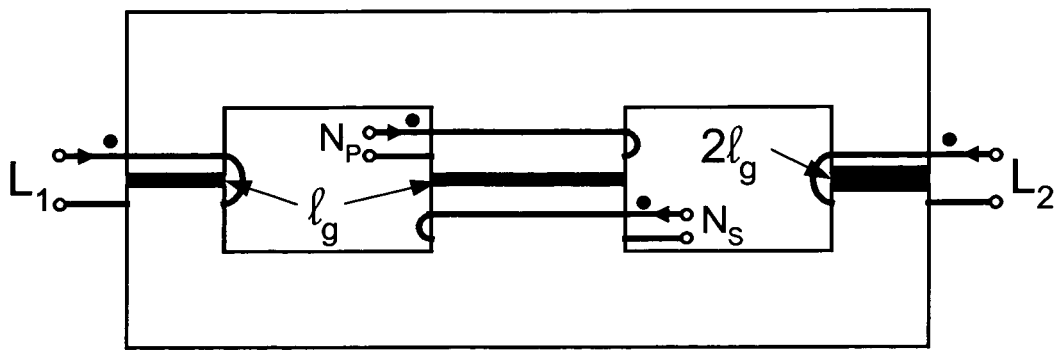
FIG. 22a illustrates the case with two equal smaller air-gaps.
Figure 22B:
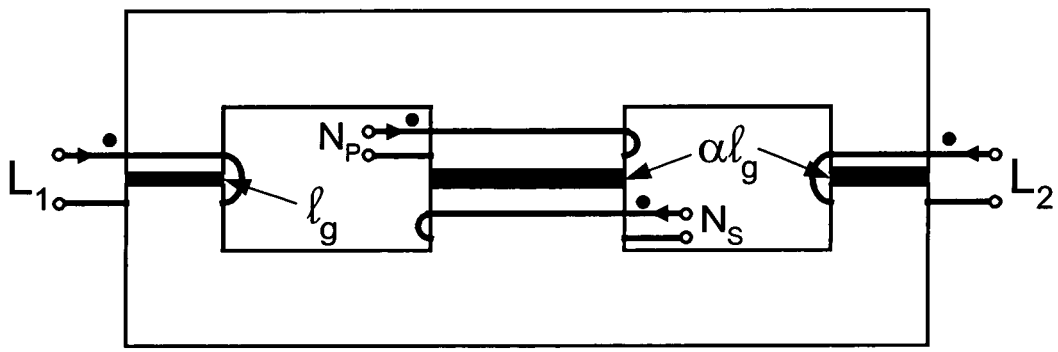
FIG. 22b illustrates the case with two equal larger air-gaps.
Figure 22C:
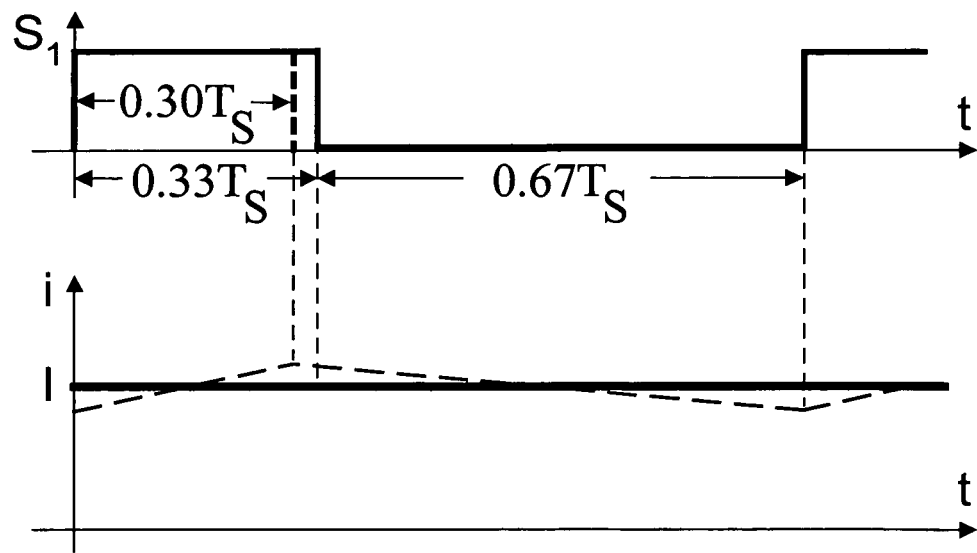
FIG. 22c illustrates the ripple current at D=1/3 obtained for Integrated Magnetics implementations of FIG. 22a and FIG. 22b.

The novel Integrated Magnetics method introduced in the converters of FIG. 9a and FIG. 21a and their numerous Integrated Magnetics implementations have also in common one important feature which clearly distinguishes them from the prior-art Integrated Magnetics structures. In prior-art integration of magnetics components, the separate magnetic components often featured to the first order identical AC voltage waveforms and the magnetics components could then be even combined onto a single magnetic core. However, in that case the presence of the mismatch of the AC voltages due to second order circuit effect (such as AC voltage drooping during either one or both switching intervals would result in first order effect to the ripple current. The reason is that net small AC voltage was applied across small leakage inductance and would therefore result in large leakage current. For that reason the prior-art Integrated Magnetics structures were often not designed on the single loop magnetics core even when the original waveforms are such that all the AC voltages are identical. Instead, EE core configurations were employed so that one of the magnetic loops with no winding would provide a needed large "leakage" inductance required to limit the circulating current.

The converters of FIG. 9a and FIG. 21a have no such problems with the circulating current. Even though the finite value of the primary capacitor $C_c$ used to reset the core would change its voltage during discharge interval and result in "drooping" of the transformer AC voltage $v_T$ this would not result in the circulating current. Because of the fundamental relationship (10) and (11), any voltage drooping present in transformer AC voltage will be also present in the same way in the two inductor AC voltage waveforms as they are bound by circuit connection to be directly across the transformer secondary. Thus, their second order effects would cancel themselves resulting in equation (10) and (11) being valid. The "physical" magnetic circuit model of FIG. 14c confirms the existence of such loop with three AC voltage sources and only two leakages in the loop. Any mismatch of these voltages would therefore result in a big circulating ripple current. This is, however, not the case, as (10) and (11) are valid even in the presence of second order parasitic effects.

Transformer Energy Transfer Characteristics

Figure 23A:
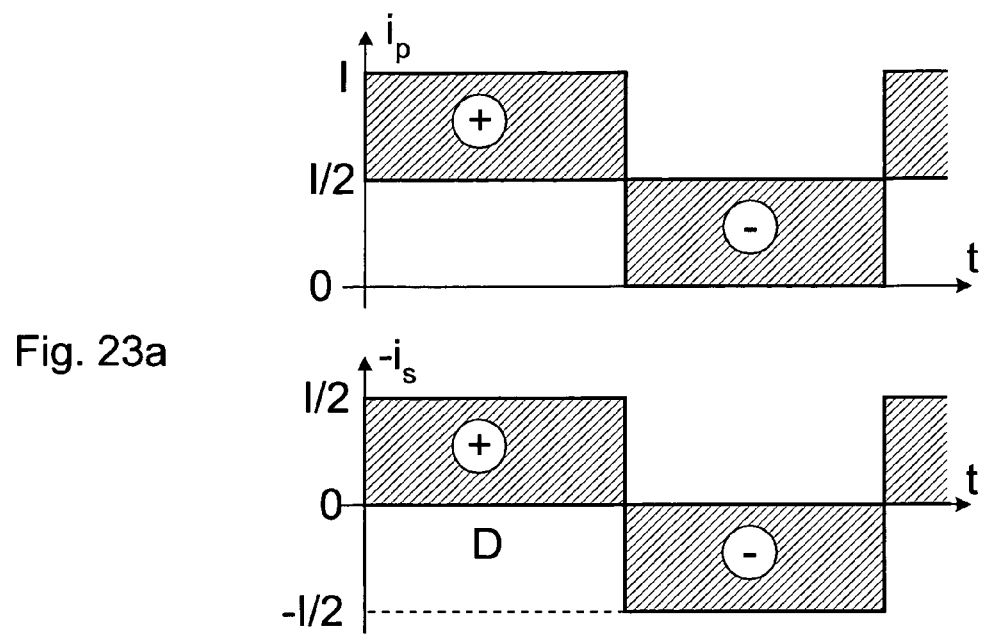
FIG. 23a illustrates transformer primary and secondary currents.

The transformer's primary current is shown in FIG. 23a for D=0.5 to have DC bias I/2, and the shaded areas illustrating primary AC current. The transformer's secondary current is shown in FIG. 26b for D=0.5 to have zero DC bias, hence it is pure AC current with shaded area illustrating secondary side AC current. Note how the primary and secondary AC currents (shaded areas) exactly match each other.

Shaded-areas (the AC current) in FIG. 23a demonstrate that the power transfer takes place between the transformer primary and secondary side at all times. This is clearly an advantage over an isolation transformer in forward converter of FIG. 2a in which energy transfer takes place only during $DT_S$ interval. This results in the less than optimum utilization of the window area for transformer secondary in the forward converter. Furthermore the rms current in the secondary of forward converter changes significantly with operating duty ratio. This is not the case for the converter of FIG. 9a, which maintains the lowest possible rms current for any duty ratio and is given by $$I_{rms} = I/2 \qquad (43)$$

Therefore, the single turn secondary winding will have the reduced secondary side conduction losses for all operating conditions resulting in low temperature rise of the transformer.

Circuit Layout Consideration for Standard Magnetic Cores

Figure 23B:
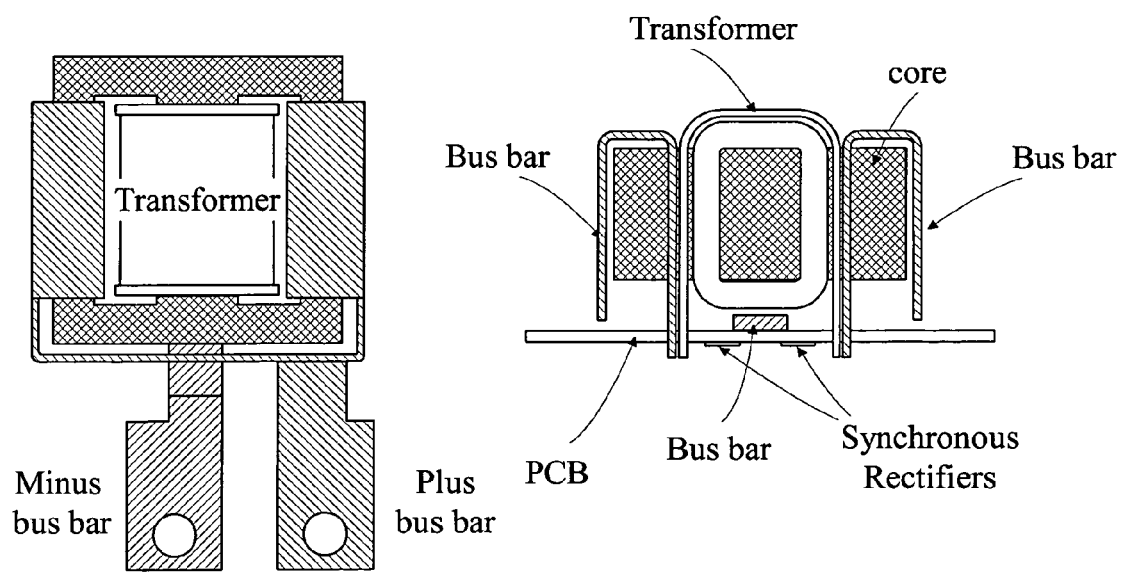
FIG. 23b illustrates the preferred layout of the Integrated Magnetic structure of converter in FIG. 9a, and FIG. 23c illustrates the preferred layout of the Integrated Magnetic structure of several other Integrated Magnetics

The EE core implementation and two loop UU core implementation, both can take advantage of an effective single magnetic structure with output inductors on each of the outer legs. For important low voltage implementations, such as 2.5V, 5V and even 12V, a single turn for output inductor is often preferred design choice to minimize copper losses and boost efficiency. In that case, the single turn inductors can be built as a part of the output bus bar structure, as seen in FIG. 23b. Transformer on the center leg in that case has also only one turn which is wound on the top of the primary winding. This arrangement of the layout in FIG. 23b takes the full advantage of the fact that transformer secondary is connected in a loop with two inductors. Thus as shown in FIG. 23b one end of the inductors are connected directly to the respective ends of the transformer secondary thus reducing to the minimum the interconnection losses. The other ends of the inductors, being connected to the bus bars, can be also made as a part of the bus bars for the special case of one turn secondary used for high current applications.

This layout of FIG. 23b is used for Integrated Magnetics structure of FIG. 9c in the prototype of the 450 W, 400V to 5V converter based on FIG. 9a, and the measurement results are enclosed in experimental section. Because of 90 A full load current, one turn was used for transformer secondary and each of the two inductors resulting in 97% peak efficiency.

Effectiveness of the Filtering of Ripple Currents in Output and Two Inductors

The effectiveness of eliminating the large 60 A circulating current can now be fully appreciated in the practical magnetic circuit shown in FIG. 23b. The two inductors take less than 10% of the window space and result in only 300 mW copper losses or 0.1% loss of efficiency. Yet, they conduct 100 A to the load with zero ripple current at D=1/3 duty ratio and 400V input. Even under the worst case of 250V input the inductor ripple currents will be only around +/−5% of the 100 A DC load and output ripple current of 10 A worst case. Thus, it is no surprise that, because of the extremely low ripple current and radiated noise reduction, the measured output ripple voltage at 380V nominal voltage was only 6.9 mV peak-to-peak including switching ripple and all the spikes as shown in experimental section.

Scalability for Wide Range of Output Voltages

Another advantage of the layout in FIG. 23b is that the design at one power level such as 450 W, for example, can be easily scaled for different output voltages using the usual scaling methods for separate isolation transformer. Once a core size is chosen for one power level, the same magnetic core can be used throughout the product line for wide range of output voltages, from 5V, 12V, 15V, 24V, and 48V by choosing the appropriate number of turns for transformer secondary and output inductors. For example, one turn for 5V output, 2 turns for 12V output, 3 turns for 15V, etc., therefore same core losses for all different output voltages.

Integrated Magnetics with Flat Magnetics Cores

The Integrated Magnetics implementations introduced so far were based on the standard (non-flat) UU and EE core types. However, in some applications where the low profile magnetics structure is needed and/or the automated manufacturing of the winding using the printed circuit board techniques, the flat magnetics core (both of standard size as well as custom) can be used to implement Integrated Magnetics structures for the converter of FIG. 9a and FIG. 21a.

Circuit Layout Consideration for Flat Magnetic Cores

The integration of inductor windings into Integrated Magnetics circuit allows for shorter connection of the inductors to the transformer secondary winding. Thus, one needs to consider the practical issue how to make the simplest possible layout of the two magnetic cores and their respective windings, so that the connection between windings as per circuit diagram of FIG. 9a are easiest to implement practically. Because of high DC currents on the secondary side, the connections between windings should be minimized. This is especially critical for very low DC voltage applications, which often have high DC load current of 100 A or more.

Figure 24A:
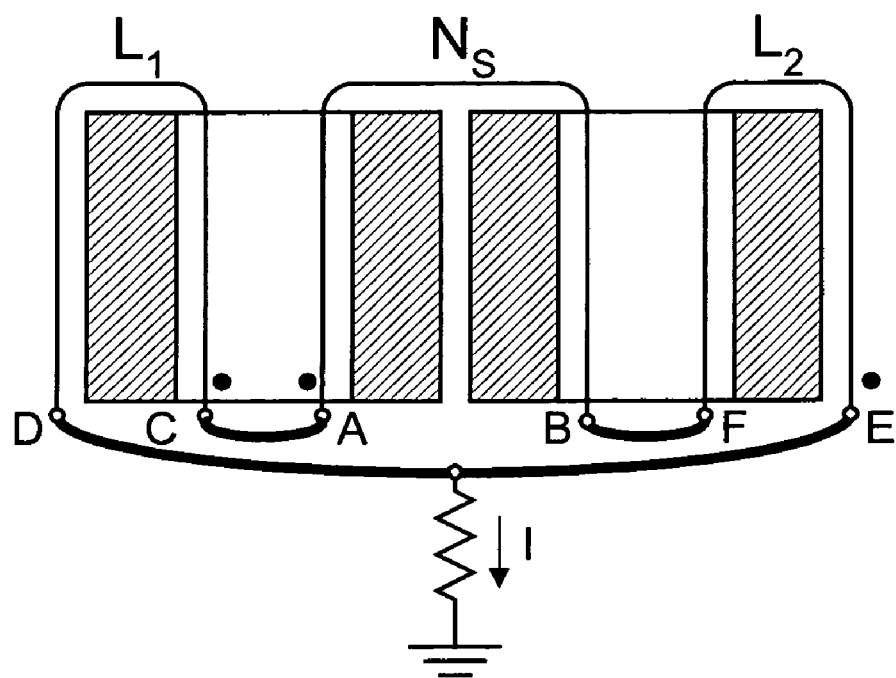
FIG. 24a illustrates a side-by-side layout arrangement of the two flat magnetics UU cores, the winding placements and the optimum interconnection of the winding termination leads indicated in thick lines
Figure 25A:
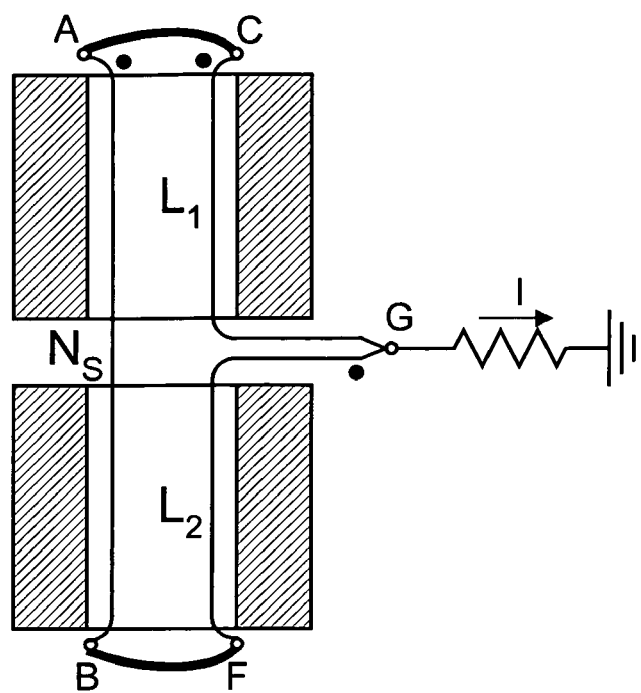
FIG. 25a illustrates in-line layout arrangement of the two flat magnetics UU cores, the winding placements and the optimum interconnection of the winding termination leads indicated in thick lines

The Integrated Magnetics illustrated in FIG. 24a and FIG. 25a use two flat magnetics UU core types.

Figure 24B:
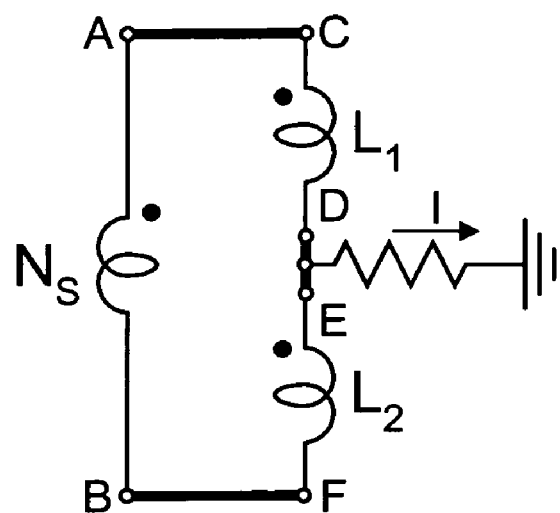
FIG. 24b illustrates the corresponding circuit diagram with the thick lines indicating interconnection of the winding terminations.

The circuit diagram in FIG. 24b has the magnetic winding terminations designated by letters A through F. Shown in the heavy lines on FIG. 24b are the interconnections needed to connect the winding terminations. The same winding terminations are illustrated in the layout of the magnetic circuit of FIG. 24a and the heavy-lines designate again interconnection of the winding terminations. In this magnetic layout configuration the careful layout of windings as in FIG. 24b and the heavy-lines designate again the interconnection of the winding terminations. In this configuration the careful layout of the windings as seen in FIG. 24a eliminates any troublesome-crossing of the interconnection lines.

Figure 25B:
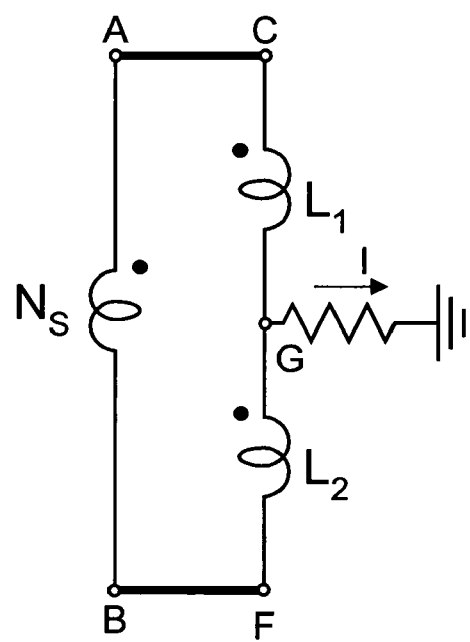
FIG. 25b illustrates the corresponding circuit diagram with the thick lines indicating optimum interconnection of the winding terminations.

The circuit diagram of FIG. 25b shows the designation of winding terminations by letters A, B, C, F and G. Comparison with the terminations shown in FIG. 24b shows that the terminations D and E do not exist in FIG. 25b since inductor windings are directly terminated at G. Thus, one interconnection is eliminated in this layout and only two rather short interconnections, marked AC and BF in heavy lines in FIG. 25b are needed. Their equivalent on the actual magnetic circuit layout is shown in FIG. 25a. The magnetic circuit layout of FIG. 25b uses two UU cores placed in-line. This in-line placement of the two cores has the added advantage that the cross-talk between the two cores is minimized, when compared to side-by-side placement of two cores shown in FIG. 24a. The cross-talk is the AC voltage induced in one inductor winding of Integrated Magnetics structure when the other inductor winding is excited with AC voltage, while the transformer windings are left open and not energized. Usually only a few percent of the driving AC voltage is induced on the other inductor.

Other practical layouts may be used as those skilled in the art might propose to make windings simpler and easier to implement or to use other preferred magnetic core geometries and types.

Further Embodiments of Integrated Magnetics Switching Converters

Figure 23C:
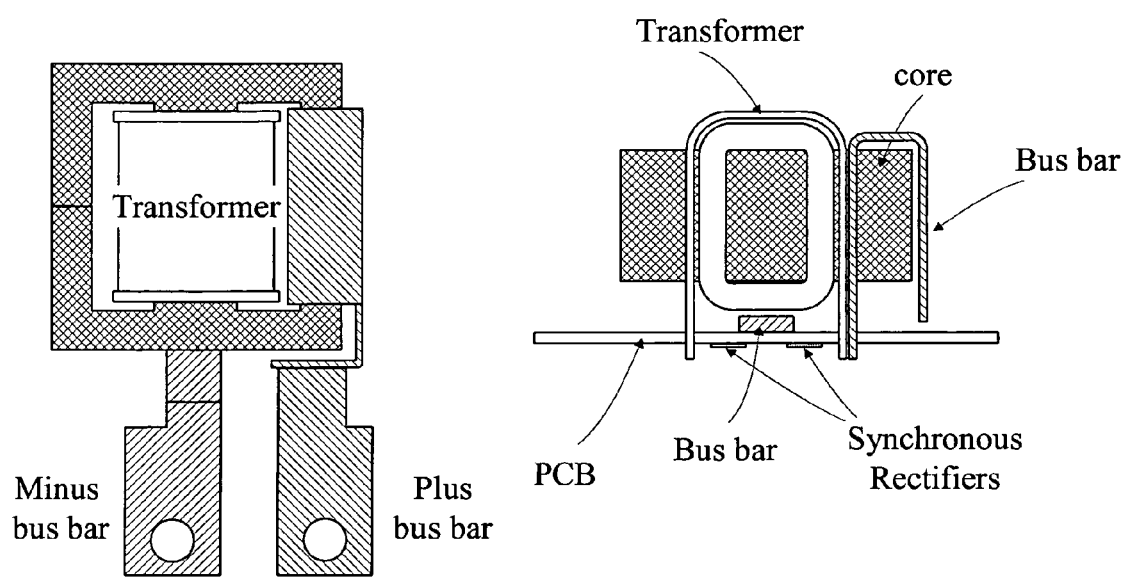
Figure 26A:
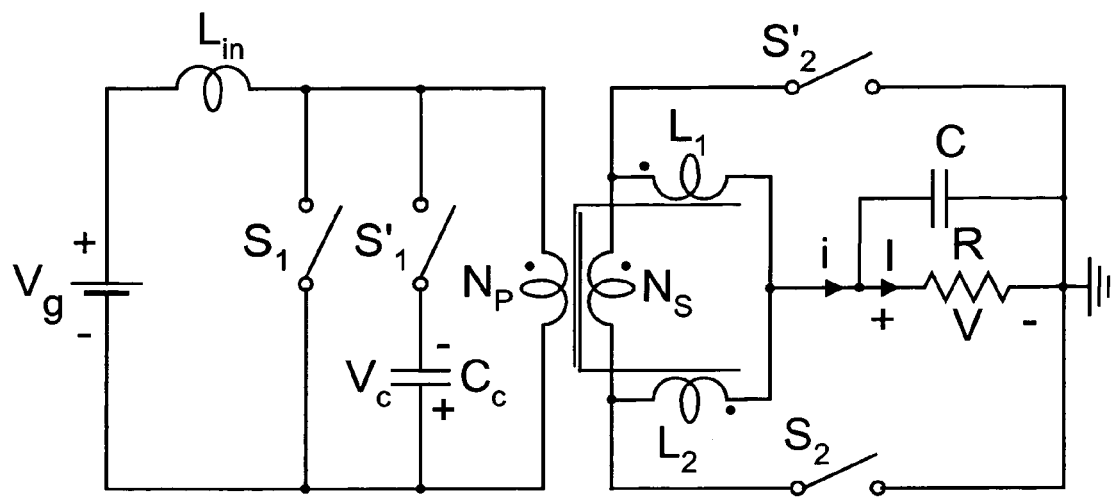
FIG. 26a illustrates the modification of the converter having input inductor and zero-ripple input current.
Figure 26B:
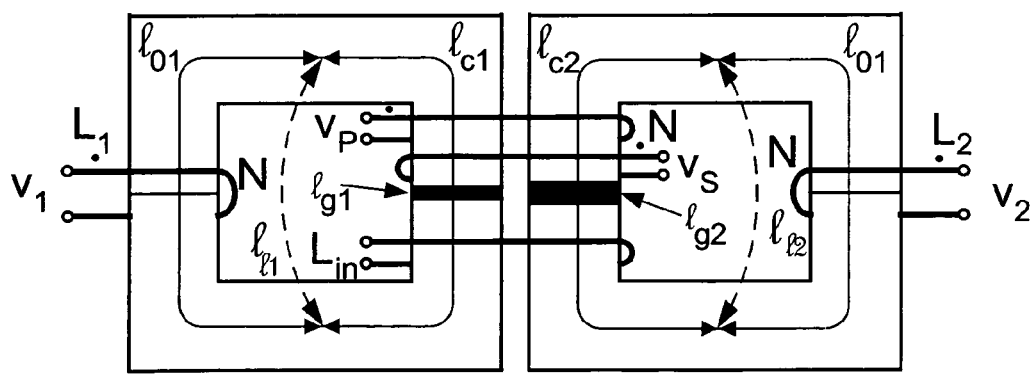
FIG. 26b illustrates the Integrated Magnetics implementation for converter of FIG. 26a, FIG. 26c illustrates Integrated Magnetics forward converter.
Figure 26C:
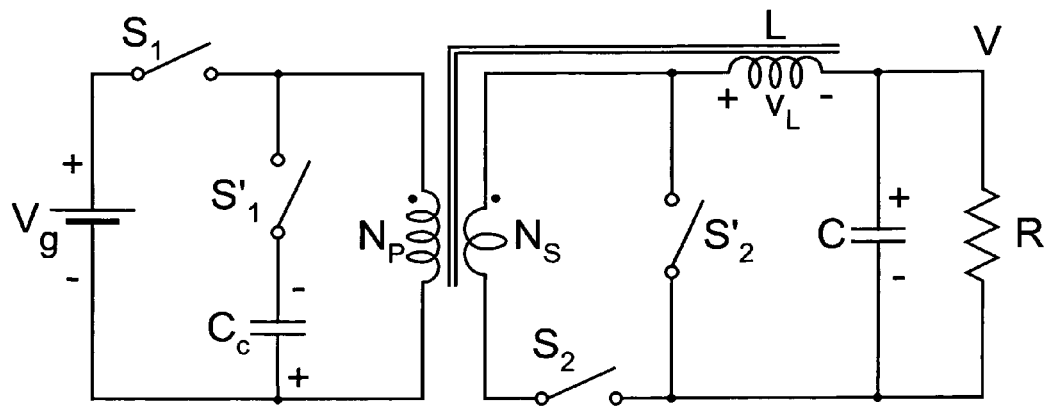
FIG. 26d illustrates Integrated Magnetics complementary forward converter.
FIG. 26e illustrates one Integrated Magnetics implementation for converters in FIG. 26c and FIG. 26d.
Figure 26D:
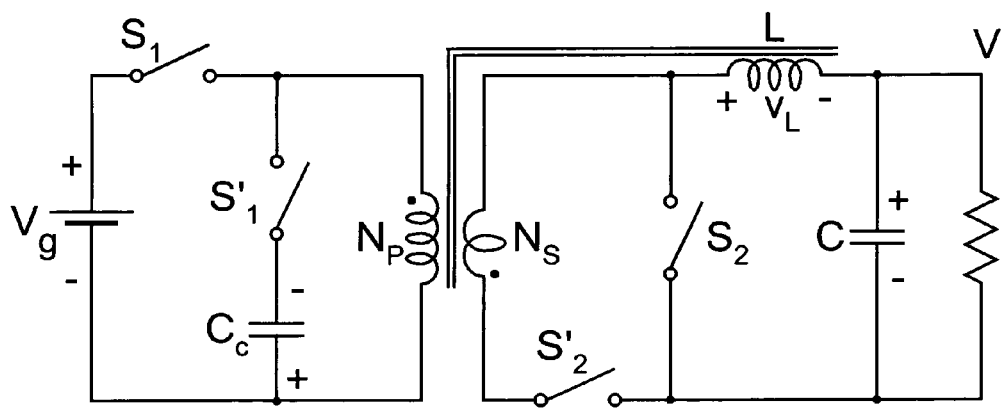

The analogous layout advantages can also be used for the implementation of the Integrated Magnetics switching converters of FIG. 26a, FIG. 26c, and FIG. 26d as illustrated by the layout of FIG. 23c. The only difference in this layout is absence of the winding on one of the two outer legs.

There are a number of converter circuits, which can use the benefits of newly introduced Integrated Magnetics method. One such converter is shown in FIG. 26a and its magnetic circuit realization in FIG. 26b. This converter has an additional inductance $L_{in}$ in series with the input voltage source, which is placed on the center leg of the transformer in magnetic circuit of FIG. 26b. All Integrated Magnetic circuits discussed for converters in FIG. 9a and FIG. 21a apply equally well with the same advantages in the converter of FIG. 26a.

Figure 26E:
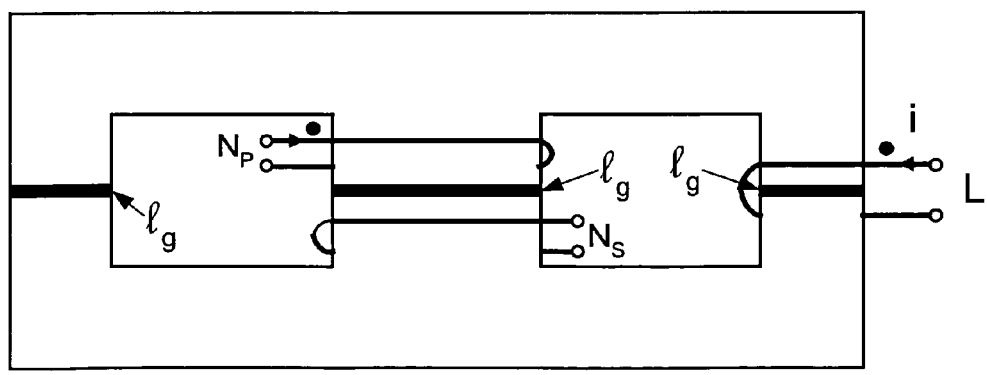

The prior-art forward converter with separate inductor of FIG. 2a can also be integrated using an EE type core into an Integrated Magnetics converter of FIG. 26c. Similarly, the converter FIG. 2b can be integrated using the same EE core into Integrated Magnetics converter of FIG. 21d. Both converters in FIG. 26c and FIG. 26d can use the same Integrated Magnetics implementation sown in FIG. 26e.

The lossless switching introduced in the next section is shown to be equally applicable to all Integrated Magnetics converters introduced here in FIG. 10a, FIG. 21a, FIG. 26a, FIG. 26c and FIG. 26d.

Practical Implementation with Diode and/or MOSFET Switching Devices

The basic switching converter of the present invention is shown in FIG. 9a implemented with the ideal switches. In practice, the ideal switches are replaced by semiconductor switching devices, and in particular by MOSFET transistors, which can be turned ON and OFF in response to their gate drive.

Figure 27A:
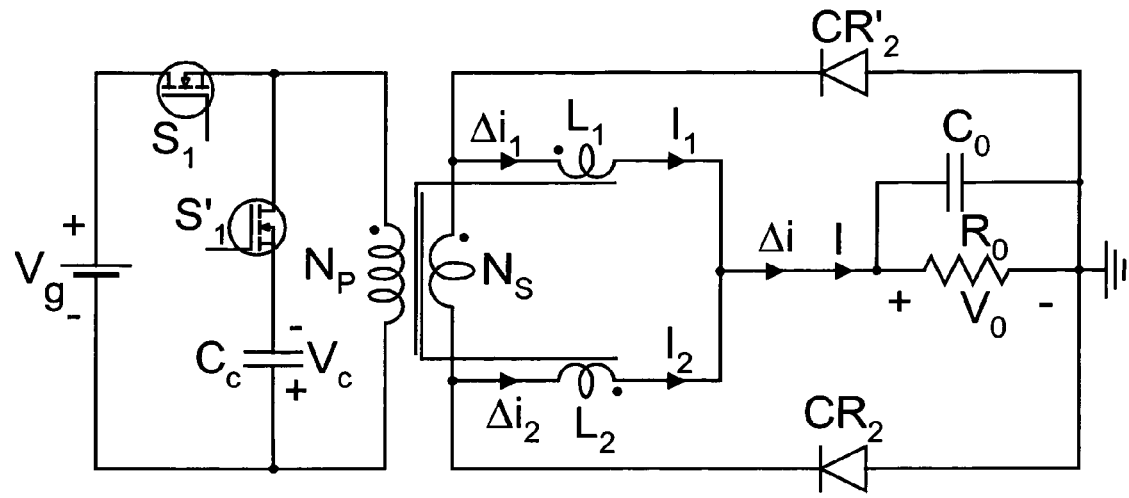
FIG. 27a illustrates implementation with diode rectifiers on the output.
Figure 27B:
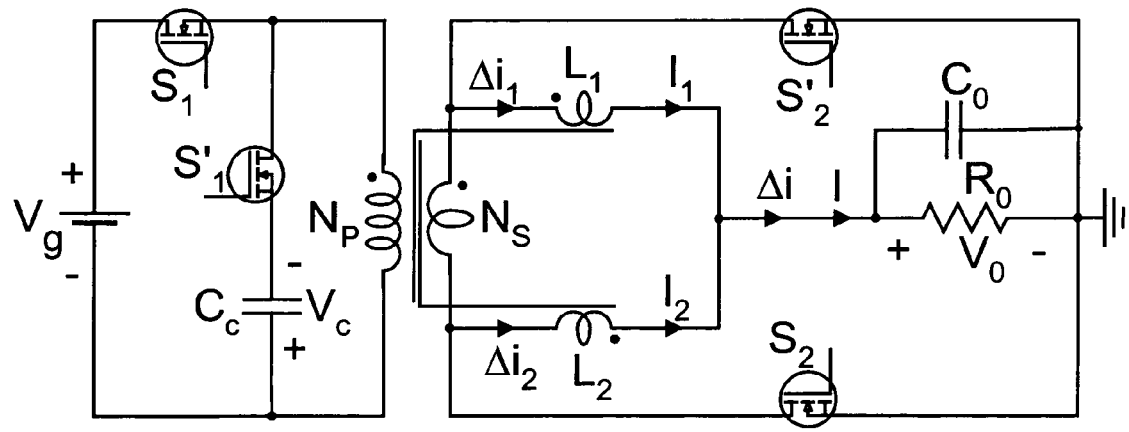
FIG. 27b illustrates all MOSFET switches implementation.

FIG. 27a shows the primary side switches implemented with the current bi-directional switches (CBS), MOSFET transistors. Note that the secondary side switches in its simplest form could be implemented by the current rectifiers $CR_2$ and $CR_2'$, which turn ON and OFF in response to the ON and OFF states of the primary side switches. For many practical applications such as personal computers and other electronic equipment the low output voltage are needed, such as 5V, 3.3V and 2V. The high forward voltage drop of 0.5V to 1V of the current rectifiers (diodes) then contributes to high conduction losses and efficiency degradation. Thus it is customary to replace the diodes in these applications with the current bi-directional switches (CBS) MOSFET devices to reduce these losses and increase the efficiency. Thus, MOSFET transistors can be used for all four ideal switches and fully controlled by turning them ON and OFF when desired.

The secondary side MOSFETs are normally used as a high efficiency replacement for the diodes and they conduct current during the same time interval as the diode they replace would conduct. In practice this is accomplished as follows: each MOSET has an internal anti-parallel body diode generated by the same process of transistor production which could, in fact, be operated just as the diode of FIG. 27a would. However, the internal body diodes also are very inefficient due to their high forward voltage drop, so it is desired to bypass their conduction by the conduction of the current through the transistor itself. Thus, the transistors are turned ON by their gate drive circuit just before internal body diode would conduct, by sensing the approaching low voltage across transistor drain to source terminals. For such use of the transistors just to replace the diode function a term synchronous rectification is adopted. Thus, the ability of the same transistors to be turned ON at times different than the diodes they replace is not utilized. This feature of using MOSFET transistors to independently control exact timing when they are turned ON (as opposed to the timing dictated by the converter circuit conditions which turn the diodes ON and OFF) is demonstrated in next section to result in a very effective lossless switching of the converter in FIG. 9a and other converters introduced here. The very effective elimination of switching losses is therefore achieved by transistor control means instead of using a more conventional technique based on the addition of external resonant inductor.

Figure 28A:
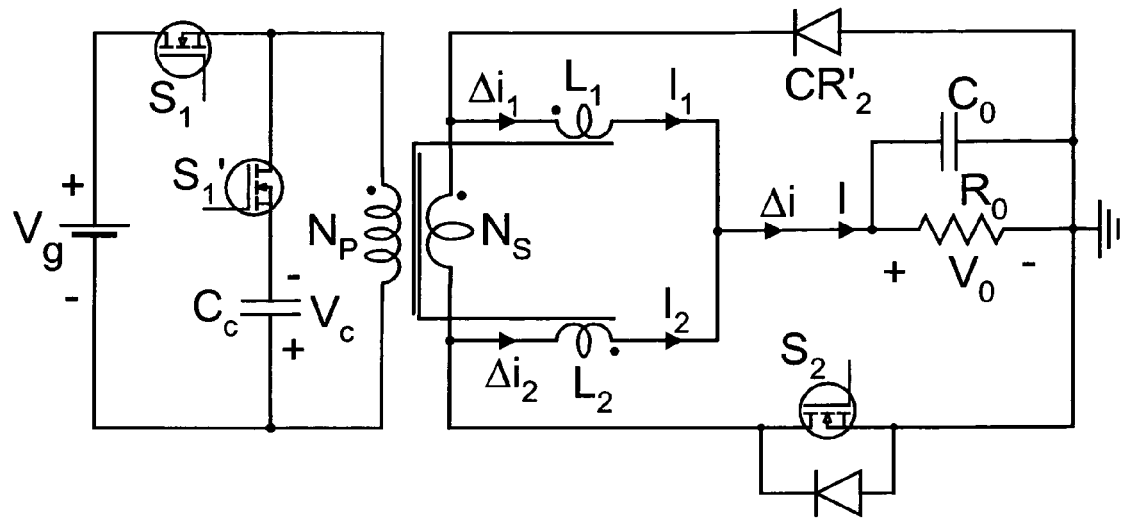
FIG. 28a illustrates lossless switching implementation requiring MOSFET switch implementation for switch $S_2$ and FIG. 28b illustrates the lossless switching timing control diagram.

The primary side switches in converters of FIG. 27a and FIG. 22b operate in hard-switching mode. This leads to high switching losses due to energy stored on the drain to source capacitors of the devices, which is dissipated each time the transistors are turned ON. Thus, a method to either eliminate or reduce these switching losses is needed. It is shown that this converter can be operated with much reduced switching losses providing the appropriate timing and drive control is implemented on the three of the four active controllable MOSFET switches of FIG. 28a. This is described in more details in the next Section on Lossless Switching.

Lossless Switching

Figure 31A:
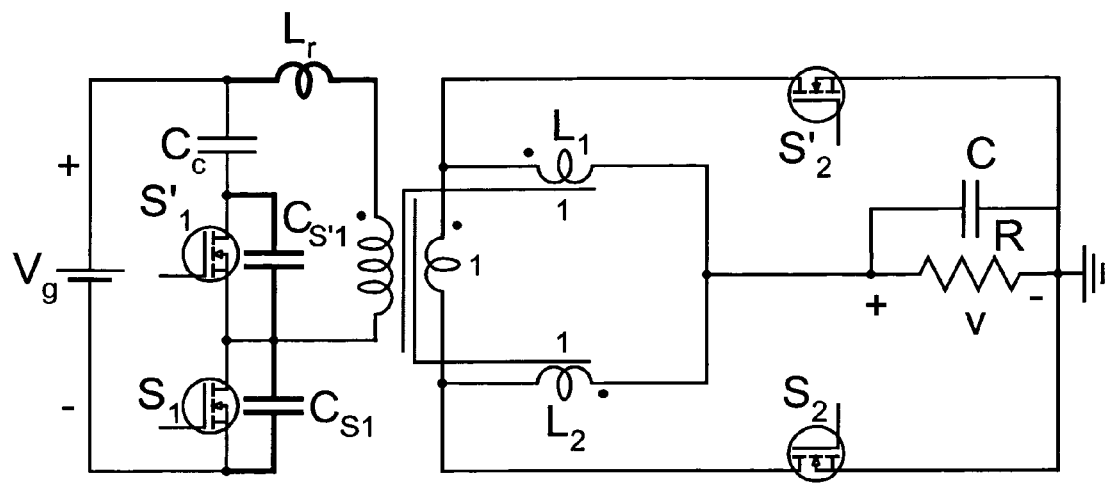
FIG. 31a illustrates the converter with the transformer leakage inductance highlighted as resonant inductor $L_r$ and with designation of parasitic drain-to-source capacitances of the primary side switches.

In the AC-to-DC converter applications, the isolated DC-to-DC switching converter of FIG. 31a is used to provide an additional step-down to convert high input DC voltages (typically around 400V derived from rectified AC line) to low output voltages of 5V, 3.3V needed in many applications. Therefore the parasitic capacitances $C_{S1}$ and $C_{S'1}$ of the respective primary side switches illustrated in FIG. 31a are charged alternately to the high voltage $V_{OFF}=V_G+V_C$ in a typical practical case when the switches are turned OFF. When the respective switches on primary side are turned ON, this stored charge is dissipated and results in sizable switching losses determined by $$P_{loss} = \frac{1}{2} f_S C_{S1} V_{OFF}^2 \qquad (44)$$

For typical high voltage switch with $V_{OFF}$=580V, $f_S$=200 kHz, and $C_S$=190 pF switching losses on primary side switches are 6.5 W or approximately 1.4% of the output power of 450 W. The switches on the secondary low voltage side are typically charged to only 20V (for 5V output). Thus despite the significantly larger drain-to-source parasitic capacitance of these switches, for example, 10 times, their switching losses are negligible in comparison with primary side switches' losses, due to the above dependence on the square of the OFF voltage $V_{OFF}$. In the above example, this gives a factor of 90 times lower switching loss of the low voltage switches. The lossless switching method implemented on the converter of FIG. 28a takes advantage of that fact and uses early turn ON of the secondary side MOSFET switches, the $S_2$ switch (while its body diode is still not conducting) to facilitate the lossless switching of the primary side switches. Thus, just by controlling turn ON of this switch, lossless switching of the primary side switches is realized as described in more details below.

Figure 28B:
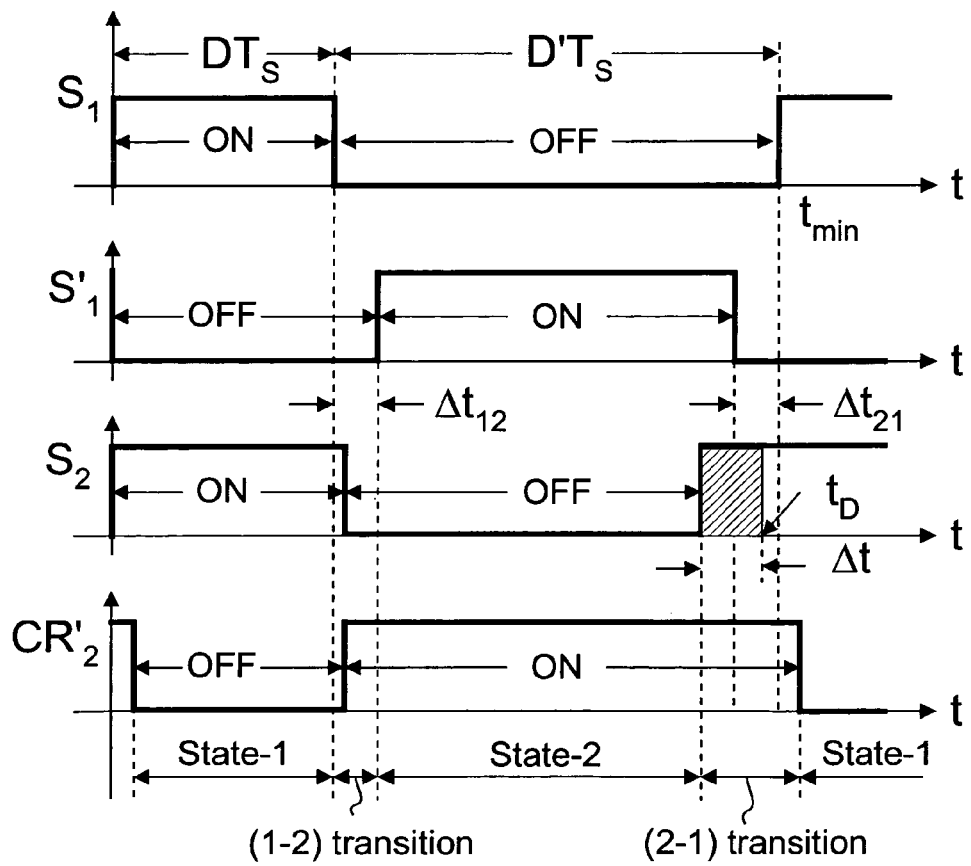

To accomplish the lossless switching the hard switching drives of FIG. 9b are replaced with the lossless switching drives illustrated in FIG. 28b which introduces two transition intervals, the first transition interval $\Delta t_{12}$ and second transition interval $\Delta t_{21}$ during which both primary switches are OFF. Thus, in order to eliminate or substantially reduce switching losses, the lossless exchange of the charges stored on parasitic capacitances of two primary side switches is needed. Such lossless exchange is automatically achieved simply by providing the first transition interval $\Delta t_{12}$ between the two primary side switches during which both switches are OFF as illustrated in FIG. 28b and explained below. However, providing second transition interval $\Delta t_{21}$ when both switches are OFF again but after $S'_1$ turns OFF is not sufficient to eliminate switching losses and additional effort is needed.

Typical method employed is to use some form of resonant switching by adding a separate and rather large resonant inductor in series with the transformer primary to achieve this. Unfortunately the loss savings achieved by such method are typically greatly offset by the extra losses incurred by the resonant inductor due to its own core and copper losses. The method employed here is to eliminate the need for the large external inductor $L_r$ and to rely only on a very small leakage inductance of the isolation transformer. Thus, in further analysis $L_r$ is assumed to be just a leakage inductance of the isolation transformer.

The $S_2$ MOSFET transistor is shown in FIG. 31a with a built in body diode, which would normally turn-ON at instant $t_D$ during (2-1) transition. The method to eliminate switching losses during (2-1) transition employed here is based on turning ON this MOSFET switch $S_2$ before its body diode conducts, that is before the voltage across the output switch reaches zero and thus in the shaded marked area on the timing diagram of FIG. 28b and designated as interval $\Delta t$. The earlier this turn-ON is initiated in shaded area, the more effective is lossless switching.

Figure 29A:
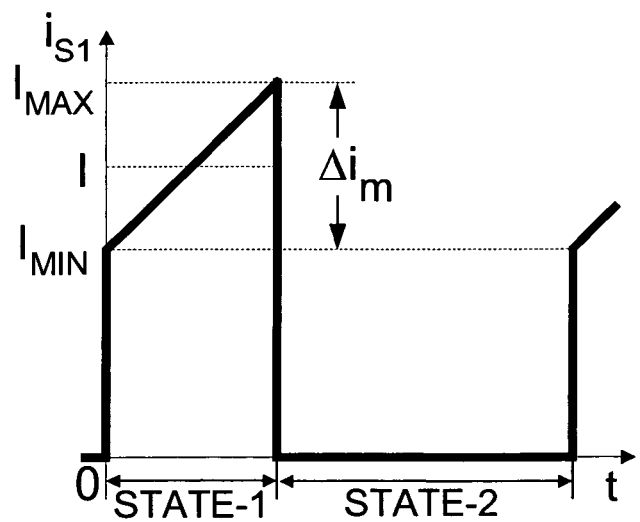
FIG. 29a illustrates the current of switch $S_1$.
Figure 29B:
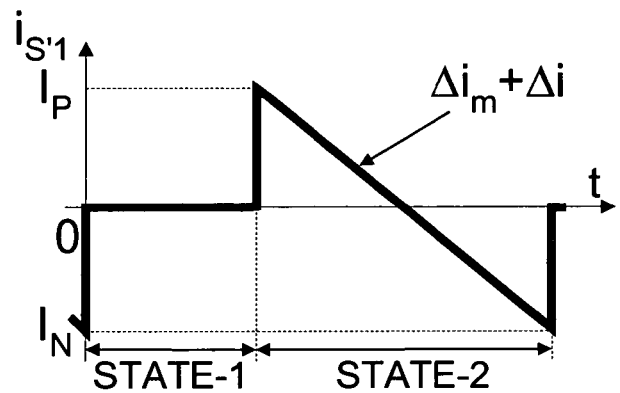
FIG. 29b illustrates the current of switch $S'_1$.
Figure 29C:
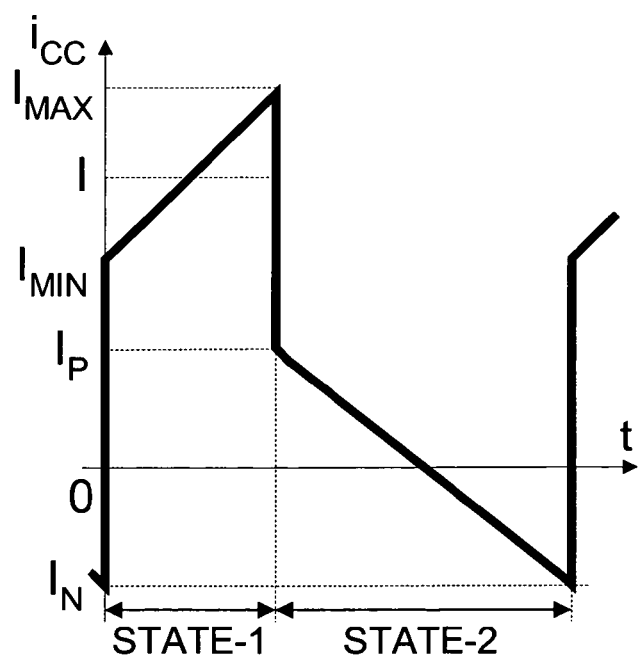
FIG. 29c illustrates the composite current $I_{CC}$.

The two lossless switching transitions are best understood with reference to the composite switch current $i_{CC}$ shown in FIG. 29c, which is by definition the sum of the switch currents on the primary side. These switch currents are shown in FIG. 29a and FIG. 29b. Note that during the first (1-2) transition, the composite switch current $i_{CC}$ has two values, $I_{max}$ and $I_P$, which are both positive. These peak currents then define the two rates for increase of the voltage across switch $S_1$ (see voltage $v_{S1}$, waveform in FIG. 30b and the respective two rates of voltage increase from $t_a$ through $t_b$ until $t_c$) and simultaneous two rates of voltage decrease on the switch $S'_1$. At instant $t_b$ the two output diodes, $CR_2$ and $CR_2'$ automatically switch over their states as seen on FIG. 30b. This automatic switchover does not take place for the (2-1) transition. As seen in FIG. 30b at instant $t_c$, when the charge initially stored on $S'_1$ switch is fully transferred to $S_1$ switch, voltage on $S'_1$ switch is reduced to zero (and voltage on $S_1$ switch increase to maximum), $S'_1$ switch is turned ON at that instant (see $S'_1$ timing of FIG. 30b) with zero switching losses.

Figure 30A:
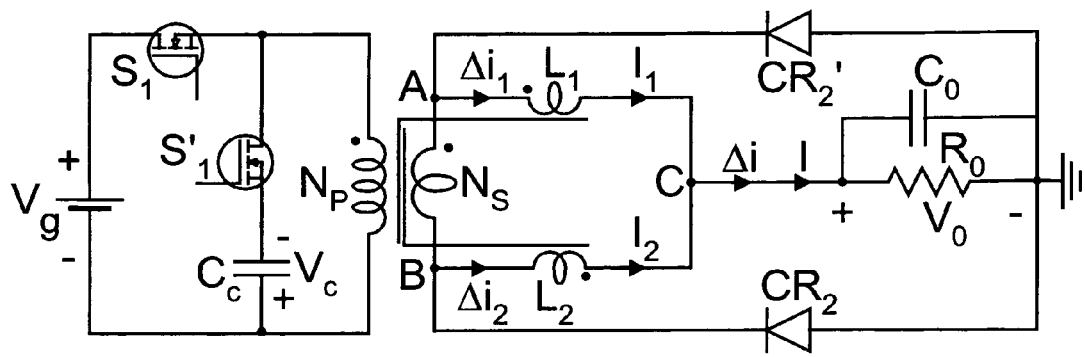
FIG. 30a illustrates an isolated converter of present invention with no resonant inductor and current rectifiers used for both output switch and complementary output switch.
Figure 30B:
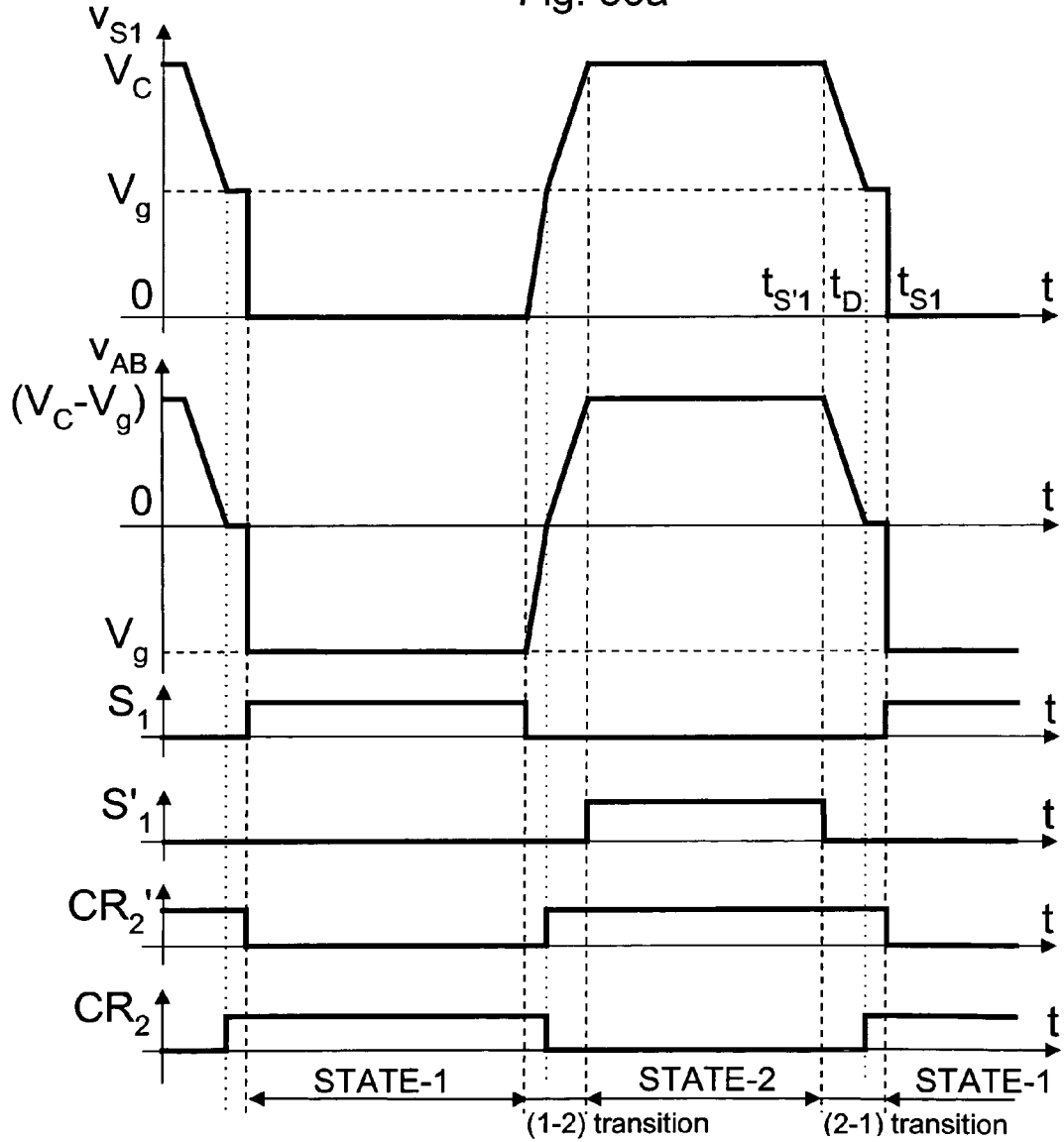

FIG. 30a shows the two secondary switches implemented as diodes on purpose to illustrate the fact that the first transition $\Delta t_{12}$ is automatically lossless even when diodes on secondary sides are used. The diodes are also used to show clearly how the second $\Delta t_{21}$ transition interval results in "stalled" condition and a hard switching turn ON of $S_1$ switch is needed to resolve that stalled condition. This occurs due to the fact that the composite switch current $i_{CC}$ at the beginning of $\Delta t_{21}$ transition interval as seen in FIG. 29c has two values: a negative value $I_N$ and a positive value $I_{MIN}$. Thus, the negative current $I_N$ initiates at instant $t_{S'1}$ the linear discharge and decrease of the voltage $v_{S1}$ of switch $S_1$ (see $v_{S1}$ waveform in FIG. 23b) but only until the input DC voltage level $V_g$ is reached at instant $t_D$. Transformer voltage at that instant $t_D$ has reached a zero voltage level. Since transformer zero voltage is across both current rectifiers (diodes), they are both ON and would indefinitely remain ON until circuit conditions are changed to force one of the two diodes to turn OFF. This is unlike the first transition interval $\Delta t_{12}$ in which their automatic changeover took place at instant $t_b$. By turning switch $S_1$ ON, this puts a reverse bias on current rectifier $CR_2'$ and turns it OFF. While this has removed stalling condition, this resulted in switching losses, since $S_1$ switch is not completely discharged to zero voltage but is in fact turned ON at high voltage equal to input DC voltage $V_g$ (300V to 400V). This is also why sometimes the second transition is often called forced transition as opposed to first transition, which is called natural transition.

The circuit model governing converter operation during the two transition intervals $\Delta t_{12}$ and $\Delta t_{21}$ can be obtained from the complete converter circuit of FIG. 31a, in which the transformer leakage inductance $L_r$ as well as the two drain-to-source parasitic capacitances $C_{S1}$ and $C_{S1'}$ are marked in thick lines. Due to the transition times being short compared to the ON and OFF intervals, the instantaneous inductor currents may be considered constant during the transition period and therefore modeled as constant current sources equal to the peak inductor current values at the beginning of transition intervals. Hence large inductors such as output inductors and transformer magnetizing inductance can be replaced by current sources to result in an equivalent initial resonant inductor current $i_r(0)$. The instantaneous voltages on the capacitors, such as voltage on capacitor $C_C$ are also virtually constant during short transition intervals and can be replaced with constant voltage sources to ultimately result in the initial value of the resonant capacitor voltage $v_r(0)$ on resonant capacitor $C_r$ which is sum of the two parasitic drain-to-source capacitances of the primary side switches. Therefore, the switching converter can be reduced during the transition intervals to a simple series resonant circuit of FIG. 31b. For this series resonant circuit shown in FIG. 31b, the resonant frequency $\omega_r$ and characteristic resonant resistance $R_r$ are given by $$\omega_r = \frac{1}{\sqrt{L_r C_r}} \quad (45)$$

$$R_r = \sqrt{\frac{L_r}{C_r}} \quad (46)$$

where $C_r = C_{S1} + C'_{S1}$ (47)

Soft Switching Using External Resonant Inductor $L_{EXT}$

Figure 32A:
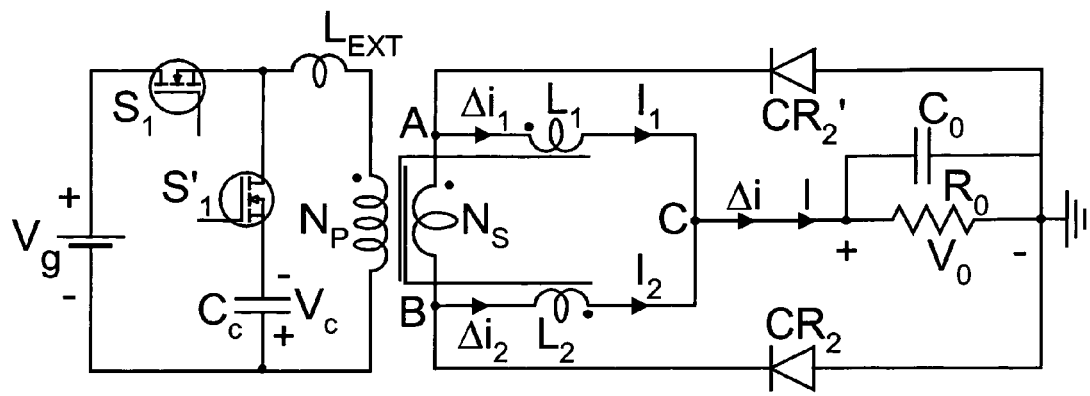
Figure 32B:
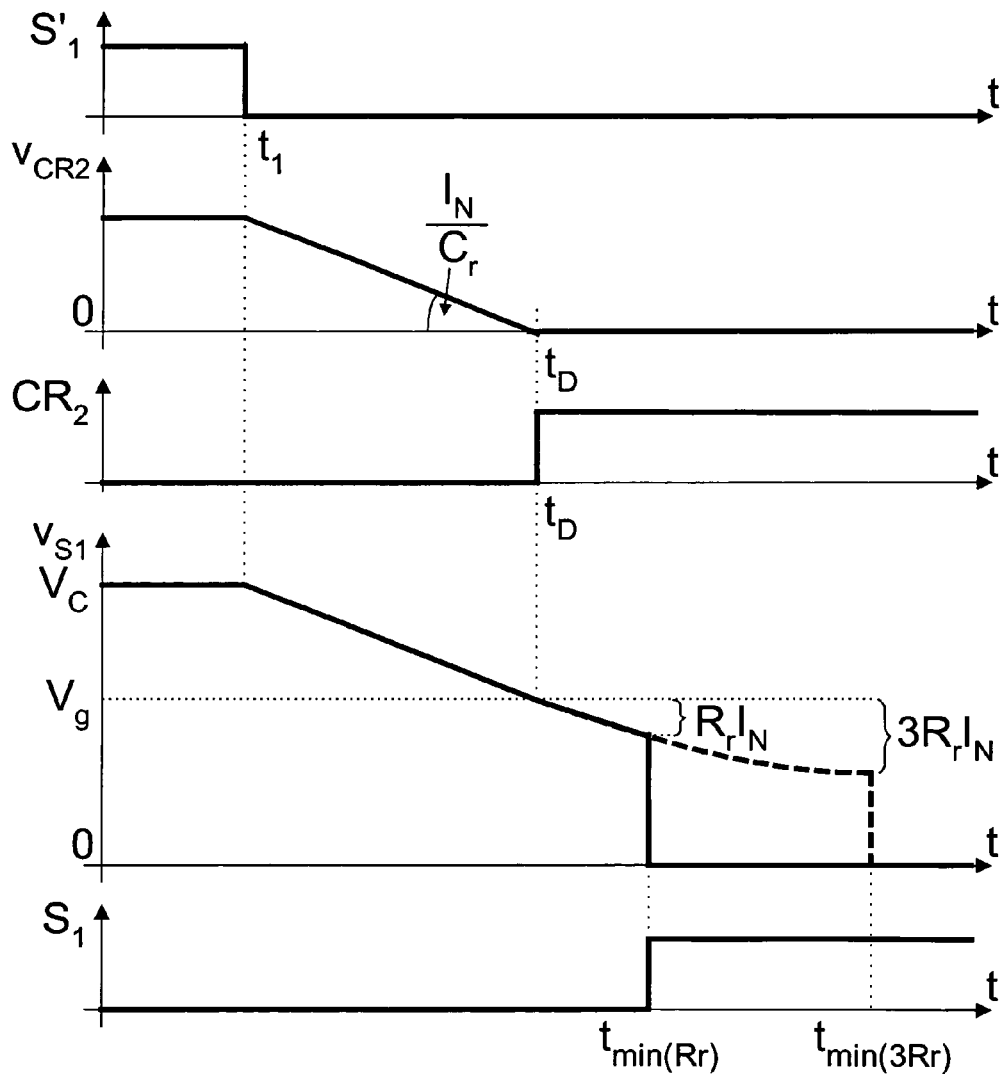

The prior-art soft switching method requires use of an external large inductor $L_{EXT}$ as illustrated in the converter of FIG. 32a and is used together with both output switches being uncontrolled diode rectifiers. Thus, when the stalling condition at instant $t_D$ in the converter of FIG. 30b takes place, the external inductance $L_{EXT}$ causes a further resonant voltage discharge described by:

$$v_{s1} = V_g - R_r I_N \sin(\omega_r t) \quad (48)$$

clearly the magnitude of the additional voltage discharge bellow $V_g$ is dependent on both $I_N$ and characteristic resonant resistance given by (47). Since The initial resonant current $I_N$ is rather small as it is composed of inductor ripple currents only (no DC components). The only other way to increase that reduction is to increase $R_r$ three times as illustrated in dotted lines in FIG. 32b. However, this increases three times the transition interval. Worse yet, to achieve that external inductance must be increased 9 times, which results in heavy penalty not only in size and efficiency of the converter but also in cost as well. The better way is to employ a lossless switching method described in more details bellow, which completely eliminates the need for any external resonant inductor as the much more effective resonant discharge can be achieved and reduction to zero voltage achieved even with the small built-in leakage inductance of the isolation transformer. The key for this method is replacement of the passive diode rectifier for output switch with an active controlled synchronous rectifier current bi-directional MOSFET switch. The fast resonant discharge and reduction of input switch voltage to zero is then accomplished by turning output switch ON before the voltage across output switch reaches zero as described next.

The main reason for ineffectiveness of the soft switching described above is that the resonant circuit has only one resonant current discharge component due to the initial and small resonant current $I_N$. The second resonant current component due to initial value on the resonant capacitor is in this case non-existent as the initial voltage on resonant capacitor is zero at Lossless Switching Resonant Discharge For simplicity of the analytical presentation we will assume that the previously introduced resonant component is very weak (for example in case $I_N$ is very small due to small ripple currents and/or small resonant inductor) leading to negligible discharge according to (47)

Since the mechanism of the onset of the resonant discharge is to establish the short across the transformer secondary to get the resonant circuit operating, it is clear that one does not need to wait until $CR_2$ is turned ON by the converter circuit in order to induce this short circuit. The short circuit can be intentionally made any time prior to that instant $t_D$ by turning MOSFET $S_2$ switch ON. The key difference, however, is that the resonant capacitor has now a non-zero initial voltage. Hence resonant discharge will be now aided by another resonant current component due to the initial voltage on resonant capacitor. The higher this initial voltage the bigger contribution will it make. Clearly this voltage will be the highest when the switch $S_2$ is turning ON at exactly the same instant when $S'_1$ switch is turning OFF to result in waveforms marked 2 in FIG. 33b. The resonant voltage discharge will then be given by:

$$v_{S1}(t) = (V_C - V_g)\cos(\omega_r t) \tag{49}$$

The much faster voltage discharge in this case comes due to the presence of the second resonant discharge component. This second component exist, since the resonant capacitor voltage has at the onset of resonance (turning ON of switch $S_2$) sizeable initial value which in turn generates a second much more effective resonant current component and corresponding resonant voltage discharge of the parasitic capacitor of $S_1$ switch.

Figure 33:
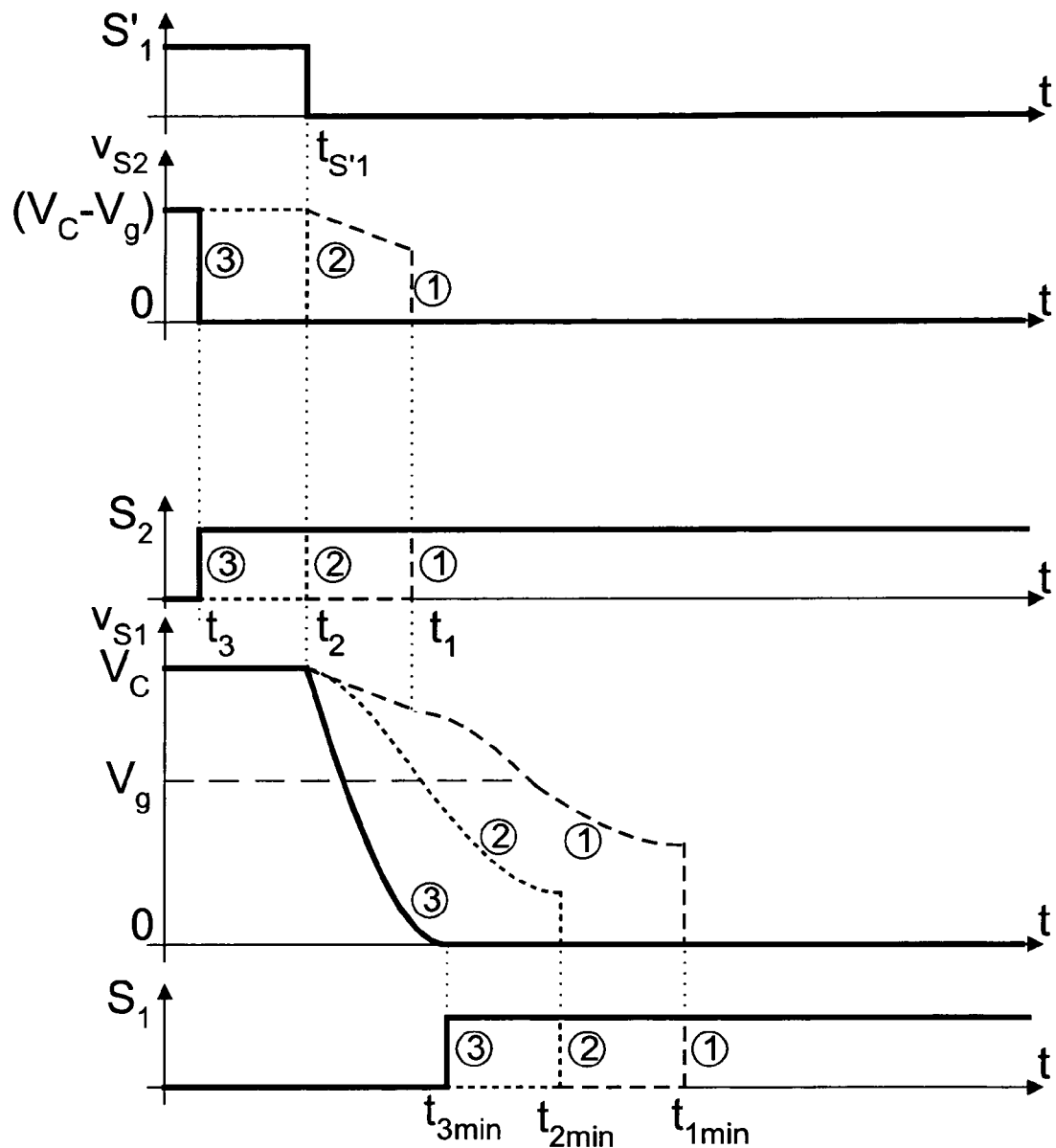
FIG. 33 illustrates characteristic waveforms of the lossless switching operation of the converter in FIG. 31a FIG. 34a illustrates another way of drawing the converter circuit of FIG. 9a but with the leakage inductance $L_1$ of the transformer included as a separate inductor.

The full power of this method is visible in Case 2 on FIG. 33b when $S_2$ switch is fully turned ON at the same time when $S'_1$ switch is turned OFF, thus at the instant when full charge is available on parasitic capacitor $C_{S1}$. For example, at duty ratio D=0.5 the resonant current due to initial voltage on parasitic capacitor is capable of a complete discharge to zero voltage of $S_1$ switch for any value of the resonant inductor, no matter how small since the magnitude of the voltage discharge does not depend at all on resonant inductance $L_r$. The magnitude of the cosinusoidal resonant voltage discharge is equal to $V_g$. In that case resonant inductor $L_r$ only effects the frequency of the resonant discharge but not its magnitude, which is fixed and is equal to $V_g$. Thus, at 50% duty ratio a complete resonant discharge to zero voltage across $S_1$ switch is taking place.

However, for duty ratios less than 0.5 this second component becomes less and less effective the lower the duty ratio is bellow 0.5. However, fortunately, in that case there is even yet another most powerful way to discharge switch $S_1$ voltage to zero in a lossless manner as illustrated by Case 3.

Even when the resonant inductance is small and limited to the built-in leakage inductance of the transformer even faster and larger resonant discharge can be achieved by other means, such as an even earlier turn ON of switch $S_2$ as illustrated by the waveforms marked 3 in FIG. 33b.

In this boost mode illustrated by waveforms marked 3 in FIG. 33b switch $S_2$ is turned on even before switch $S_{1'}$ is turned On. This places a temporary short across the leakage inductor $L_r$ and therefore increases its current very fast according to:

$$I_r = (t_1 - t_0)(V_C - V_g)/L_r \tag{50}$$

The voltage discharge is then given by the same equation as given by (47) except that the small current $I_N$ is replaced with a large desired current $I_r$.

For example, even a short time of only 50 nsec or less boosts the initial resonant inductor current $I_N$ to an arbitrary high initial resonant discharge. The peak magnitude of that initial resonant current is only limited by the length of the time switches $S_2$ and $S'_1$ are overlapping and conducting at the same time. The resonant discharge is then initiated at instant when switch $S_{1'}$ is turned OFF, but this time with much higher resonant discharge component. In that case, illustrated by the waveform marked 3 on FIG. 33b, the switch $S_1$ voltage is reduced very quickly to zero for any operating duty ratio D as seen by thick lines marked 3 in FIG. 33b.

The lossless switching was described here for the converter in FIG. 9a. However, it is equally applicable to all converters described previously. In summary, the lossless switching using proper turn-ON timing of the secondary active switch $S_2$ is effective in eliminating switching losses under any operating condition of the duty ratio and in the presence of only very small intrinsic leakage inductance of the isolation transformer. Thus, the highest efficiency is made possible since there is no point of diminishing returns which is present in classical resonant switching using large external resonant inductor, which not only reduces efficiency but increases the size and cost.

Further Embodiments of Lossless Switching in Other Switching Structures

Figure 31B:
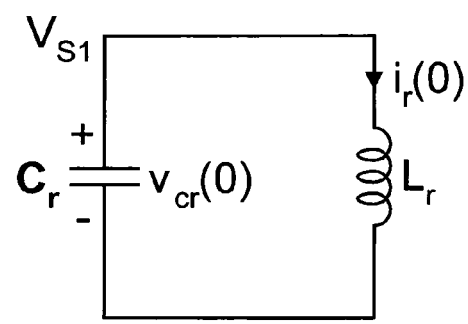
Figure 34A:
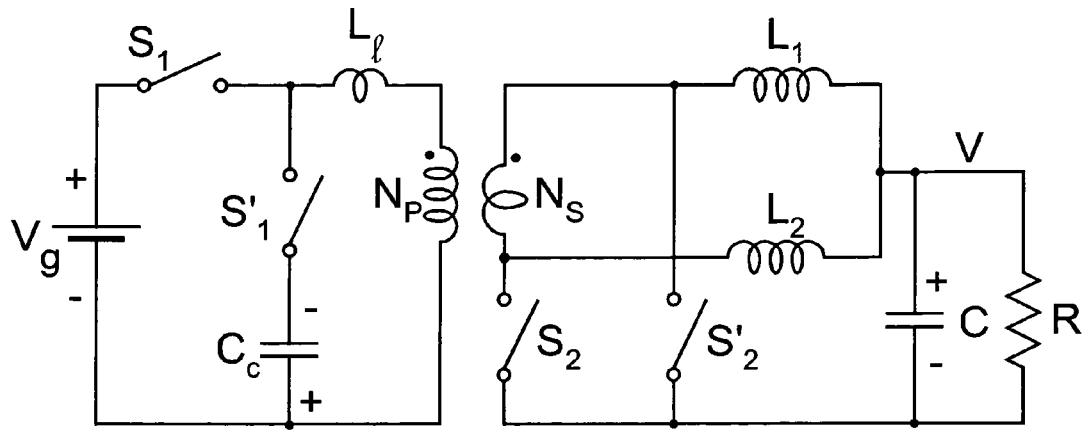
FIG. 34b illustrates the converter circuit obtained by removing inductor $L_2$ from converter in FIG. 34a and resulting in forward converter and FIG. 34c illustrates the converter circuit obtained by removing inductor $L_1$ of FIG. 34a and resulting in converter complementary to forward converter.
Figure 34B:
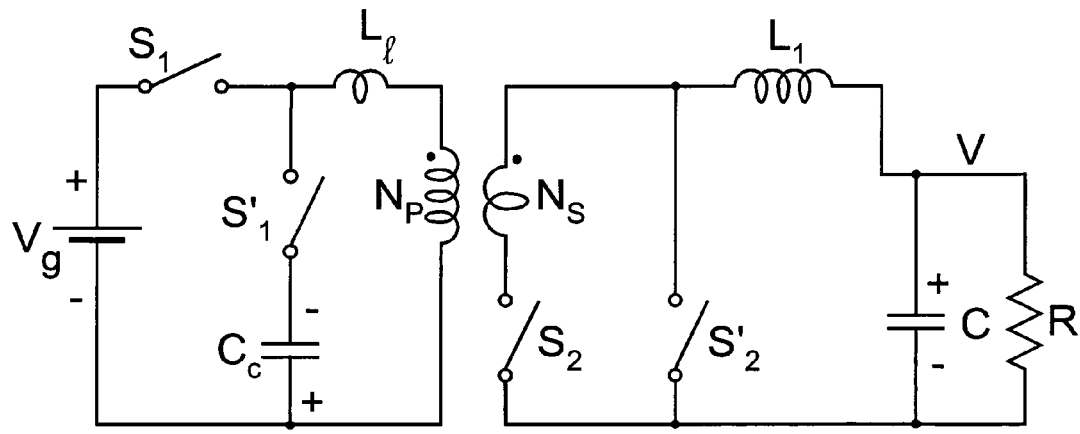

The lossless switching method demonstrated in the previous section was for described I details in U.S. Pat. No. 6,462,962. The previous section demonstrated that this lossless switching method is equally applicable to both Integrated Magnetics Switching Converter of FIG. 9a as well as to its separate magnetics counterpart. Here we demonstrate how the same lossless switching method can be implemented to other conventional converter switching structures such as the forward converter of FIG. 34b and the converter of FIG. 34c whose basic hard switching topology was covered in U.S. Pat. No. 6,462,962. The prior art current-doubler converter of FIG. 8 is redrawn in FIG. 34a. By simply leaving out the inductor $L_2$, one obtains the well-known forward converter as shown in FIG. 34b. On the other hand, by eliminating inductor $L_1$ from FIG. 34a, one obtains anther well known switching converter as in FIG. 34c covered by U.S. Pat. No. 4,959,764. It is now easy to see how the equivalent circuit for two resonant transitions is reduced to the same series resonant circuit of FIG. 31b for all three switching converters shown in FIG. 34a, FIG. 34b and FIG. 34c. Note that the transformer leakage inductance $L_1$ is playing the role of resonant inductor $L_r$ in the resonant circuit model of FIG. 31b while resonant capacitor of FIG. 31b is the sum of the drain-to-source parasitic capacitances of the primary side switches. The only difference is that now the respective initial resonant current in all three cases must be appropriately defined based on the DC and AC ripple currents of the inductors present in respective circuits. For example, in case of the forward converter of FIG. 34b, the transformer ripple current is rather small since transformer has no gap. If the output inductor ripple current is also made small by use of larger inductor, forward converter normally is forced into lossy hard switching operation. However, by implementing the lossless switching timing with premature turning ON of the switch $S'_2$ during second transition interval a very effective lossless switching is made even for the forward converter of FIG. 34b.

Recovery of the Energy Stored in the Transformer Leakage Inductance

Lossless switching has effectively re-circulated energy stored on the "invisible" but always present parasitic capacitances of the switches, especially high voltage primary side switches. Another significant energy is stored on the "invisible" but always present leakage inductance of the isolation transformer, which is modeled as an inductance $L_1$ in series with the primary side of the perfectly coupled isolation transformer as shown in FIG. 34a. Although energy stored per switching cycle may appear to be small, since the number of cycles is large such as $f_s$=200 kHz in 450 W experimental circuit example, the power loss can be significant. For a leakage inductance of $L_1$=10 µH, the power loss $P_1$ is calculated as $P_1 = \frac{1}{2} L_1 I^2 = 27$ W which translates into 5.5% loss of efficiency. Therefore, recovery of the stored leakage inductance energy in a non-dissipative way is essential for a high efficiency operation of the converter.

Figure 34C:
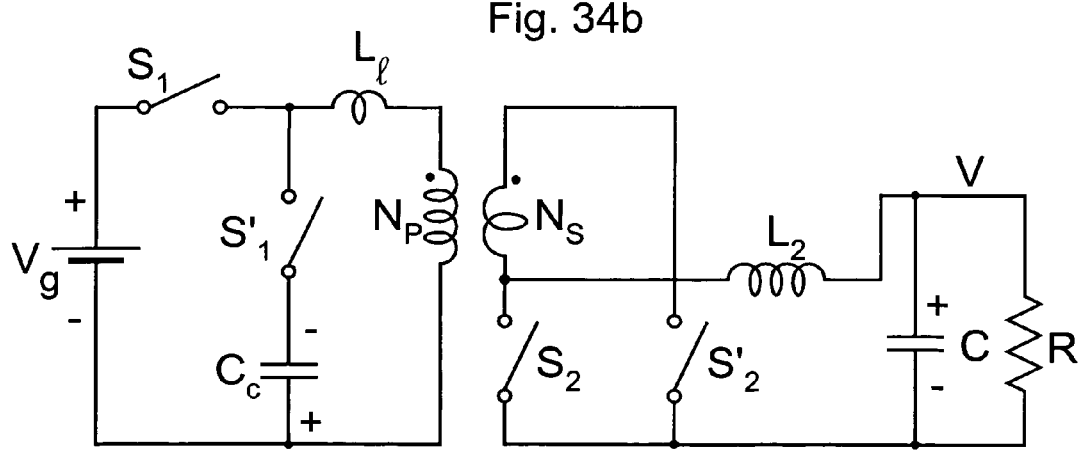
Figure 35A:
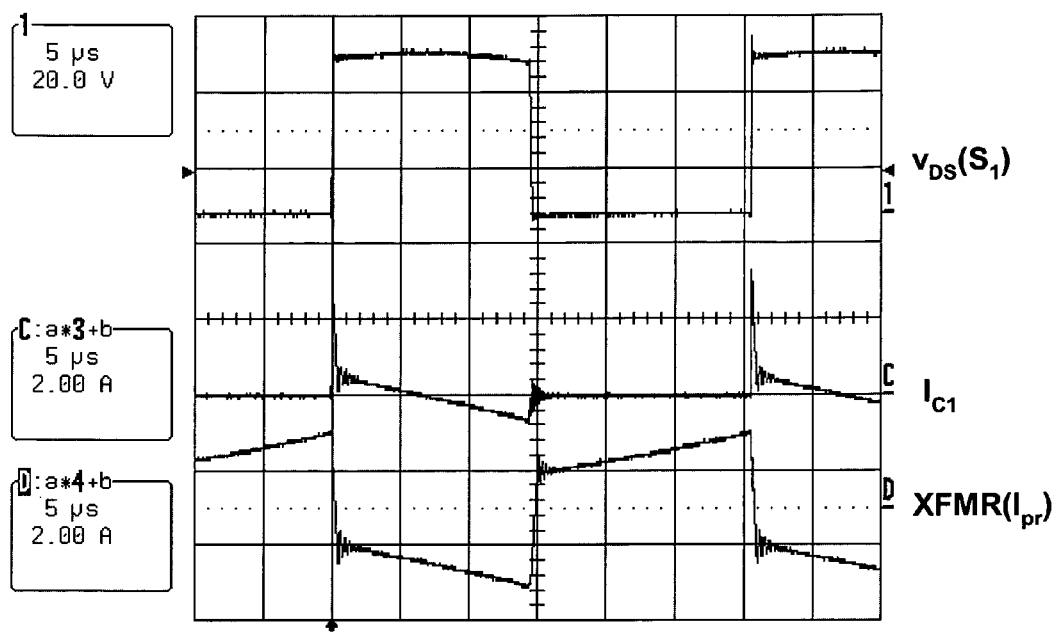
FIG. 35a illustrates the current of the capacitor $C_C$ (second trace) of the converter in FIG. 33b
Figure 35B:
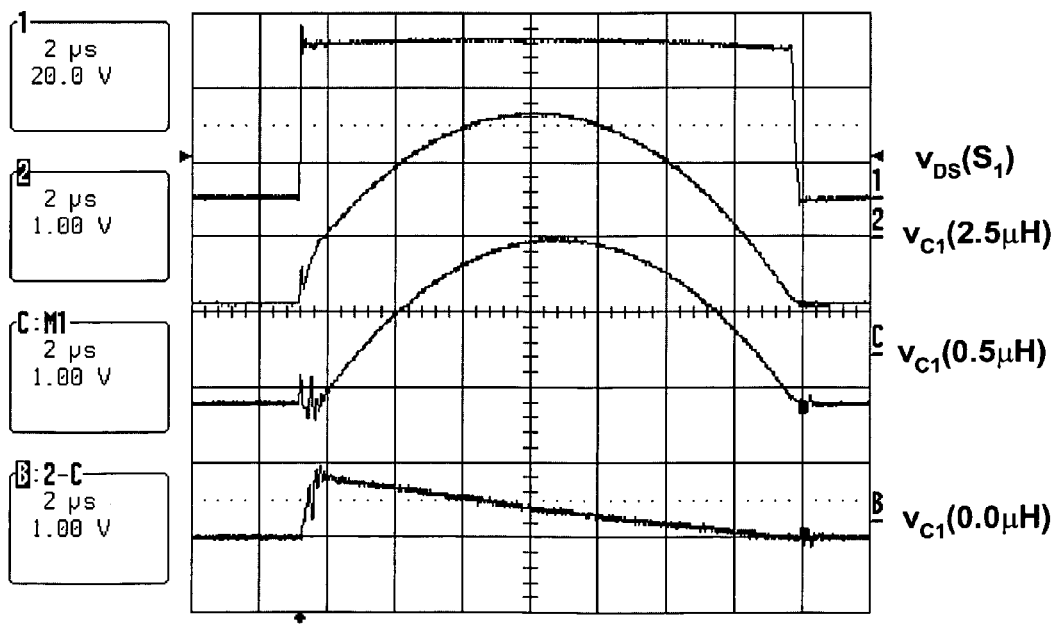
FIG. 35b illustrates the capacitor $C_C$ voltage waveforms measured with transformer leakage included (second trace), with no leakage (third trace) and their difference (bottom trace).

The converters of FIG. 34a, FIG. 34b, and FIG. 34c already have a built in an automatic way to recover the majority of that stored energy in a lossless manner. A side experiment is conducted with this converter topology to verify this converter feature. The current in the clamping capacitor $C_C$ of FIG. 35a has in a case of ideal transformer with no leakage inductance purely triangular shape during ON time of the switch $S'_1$. However, once the leakage inductance is introduced, the same current now has a very visible high spike current at the beginning of that interval as seen in FIG. 35a (second trace). This spike current introduces a jump in the capacitance $C_c$ voltage at the beginning of the same interval (second trace) making it non-symmetrical. The difference of the two voltage waveforms (with and without leakage inductance) is shown as the bottom trace in FIG. 35b. This shows that leakage inductance energy is at the beginning of interval transferred to the capacitor, which then for the rest of the interval returns that energy to the converter reducing its voltage to steady state value at the start of the next switching cycle. Thus, energy stored in transformer leakage inductance is recovered during the D'T$_S$ interval.

Applications to AC-to-DC Converters

Figure 36A:
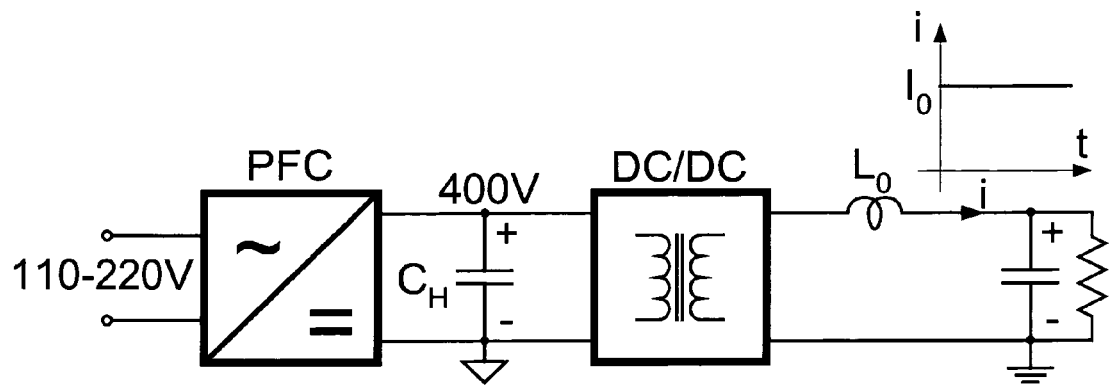
FIG. 36a illustrates AC-DC converter utilizing the present invention with output ripple current adjusted to zero.
Figure 36B:
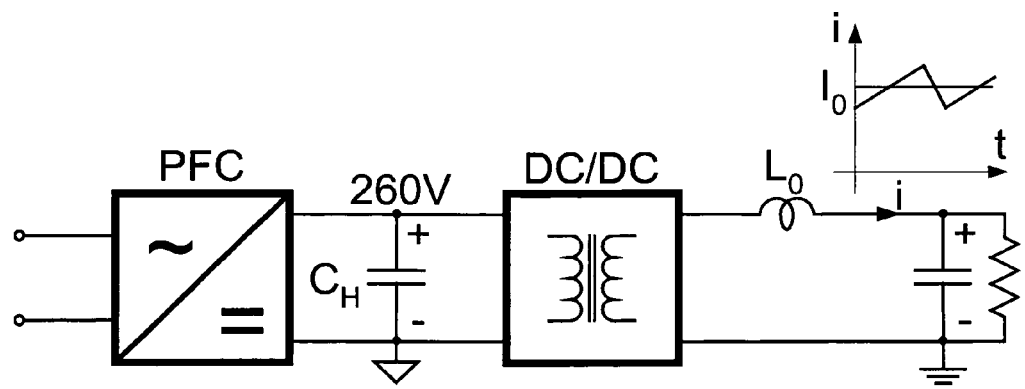
FIG. 36b illustrates operation of AC-DC converter under default conditions.

Power for computers and all electronic equipment is derived from the utility line. In the past, the AC line was rectified using a bridge type rectifier and then an isolated DC-to-DC converter was used to provide a low voltage high current DC needed by such equipment. However, such a simple rectification is no longer acceptable due to generation of the high harmonic currents and distortion introduced to the line and is often subject to stringent regulations. Therefore, in many applications, the front end Power Factor Converter is needed to provide a near unity input power factor and low harmonic currents drawn from the utility line such as illustrated in FIG. 36a and FIG. 36b. As a byproduct of such front-end Power Factor Converter is that the output voltage of the PFC converter is semi-regulated, that is changing over a narrow output voltage range. In typical PFC converters using boost type converter for 110V AC and 220V AC input voltage, the output is in the range of 365 to 385V for operation under normal conditions with maximum DC voltage of 400V (under worst case condition) as illustrated in FIG. 36a. Thus, the downstream DC-to-DC converter will operate with a very narrow input DC voltage range for most of its operating life. Thus, one objective of the present invention is to provide the DC-to-DC, which will take a full advantage of this semi-regulated input voltage condition and provide either zero-ripple or near zero ripple output current as seen in FIG. 36a Thus any of the switching converters introduced up to now can be used in such applications provided zero-ripple current is adjusted for this nominal input voltage. This section describe the method how this can be accomplished as additional conditions must be met as described bellow. The AC-to-DC power supply must also be able to provide a regulated output voltage for a very short period of time when the AC power is lost, which is usually defined as 20 msec corresponding to loss of two cycles of AC line power. This is needed for orderly shut down of the equipment such as computers powered by this AC-DC power supply. This imposes an additional requirement on the DC-to-DC converter that it must be able to operate and regulate the output DC voltage during this 20 msec default condition when the input DC voltage is reduced to 240V as illustrated in FIG. 36b. Same benefits will be obtained with such DC-to-DC converter designs when they are operated from the semi-regulated DC input voltage, which also may have some hold-up requirements.

Figure 37A:
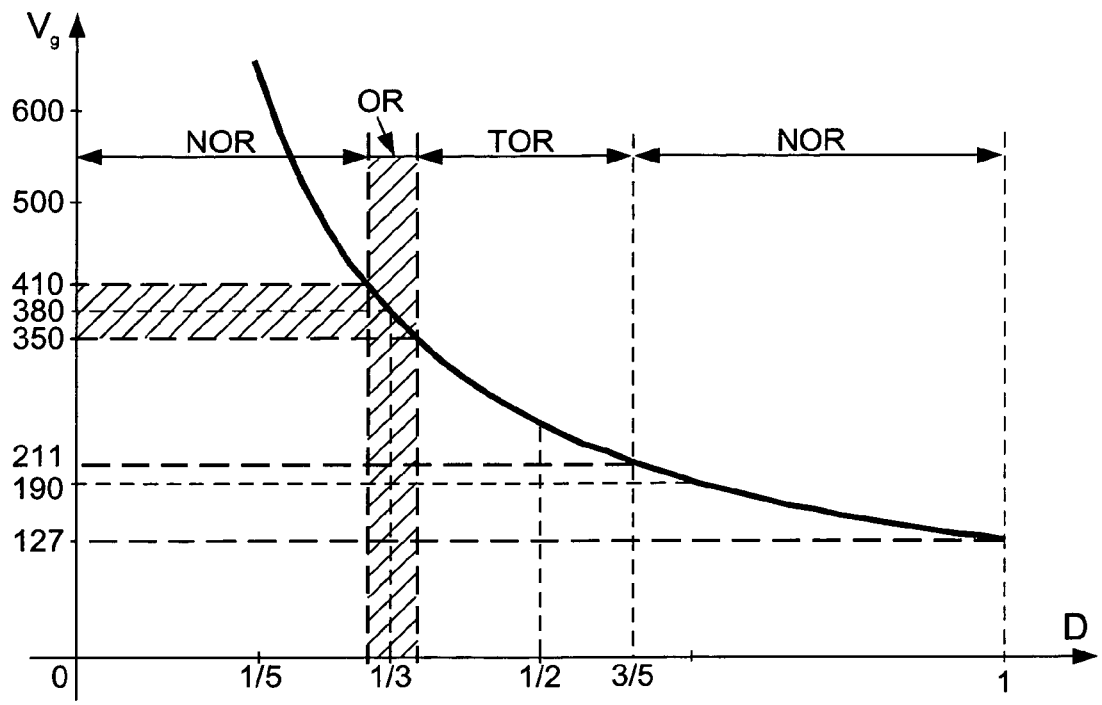
FIG. 37a illustrates the variation of the input DC voltage with duty ratio in the converter of FIG. 9a, and FIG. 37b illustrates zero ripple current operation adjusted at the maximum input voltage and duty ratio of 1/3.
Figure 37B:
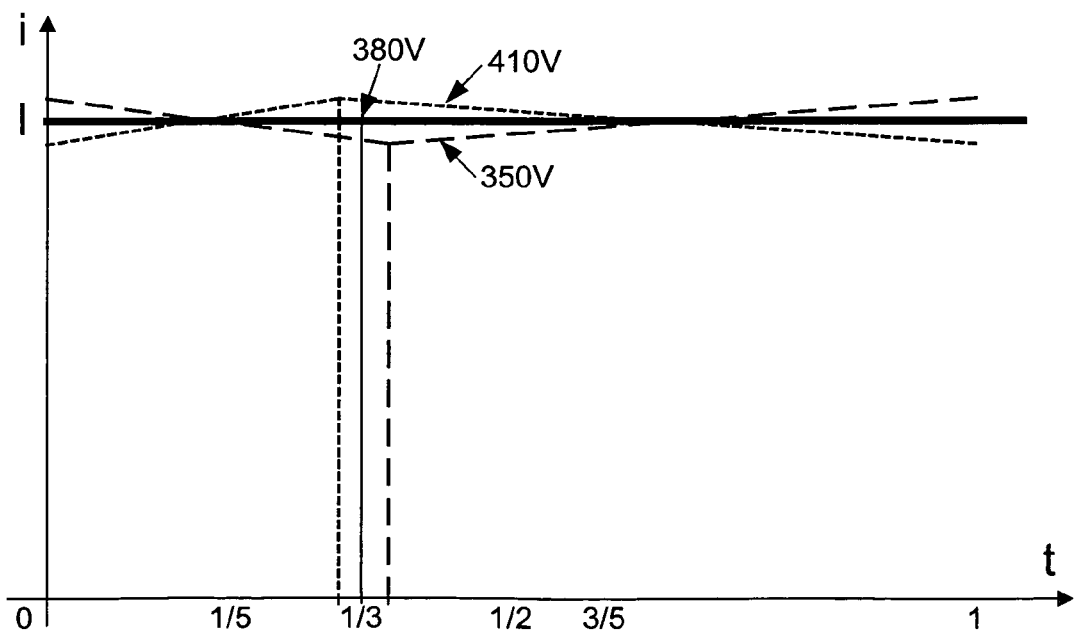

Clearly the above applications would greatly benefit from the switching converters which can provide a zero, or near zero output ripple current during the narrow input voltage range of the nominal operation and also regulate the output voltage during the default conditions when input voltage is reduced from 400V to 240V. One might be first tempted to use any of the switching converters, which can provide output zero-ripple current at 50% duty ratio, since the operating range is often in the duty ratio range from 0.4 to 0.6. However, to take the benefit of zero-ripple at the normal operation including 400V, the converter would need to operate at 400V input voltage for 50% duty ratio. Clearly, this is not acceptable since the voltage stress on the primary side switches would be then in excess of 800V and 1000V MOSFET devices would need to be used. The solution lies, as illustrated in FIG. 37a and FIG. 37b, in operating the converter for the nominal narrow input voltage range (350V to 410) as shown in shaded area in FIG. 37a at duty ratio of D=1/3 and a narrow range around it. From FIG. 37b it is clear that the output ripple current will be either zero or very small provided one of the converters introduced earlier is adjusted for zero ripple current at D=1/3. From the DC gain characteristic of FIG. 37a it is also clear that the converter will be able to regulate the output voltage down to 240V input DC voltage, as the duty ratio would be increased by the control loop to a higher duty ratio needed to compensate for lower input voltage. Note also that by choosing the operating range as this, the voltage stress of the input switches at the minimum input voltage of 240V can also be kept in 600V to 700V range so that an 800V MOSET switch could be used. The above trade-off between the voltage stress of the input switch over its operating range is same with the other converters introduced. Thus, all converters introduced previously could be designed for zero ripple at near D=1/3 following the method described.

Therefore, the high performance AC-DC power supply having a very low ripple current is made possible by use of the introduced DC-to-DC with adjustable zero ripple current and Integrated Magnetics.

Experimental Verification

An experimental prototype was designed to meet component derating requirements for the product as well as other agency standards. Its simplified power stage schematics designating key switching components is shown in FIG. 37c. The added objective of the prototype design was to verify experimentally the following key advantages of the present invention: small size of the converter and its associated magnetic circuit, lossless switching operation of the converter and the resulting improved efficiency.

The experimental prototype of the 450 W, 5V switching converter with 240V to 400V input DC voltage range was designed and built using based on the Integrated Magnetics circuit structure shown in FIG. 14a and using the following components for the key switches:

$S_1$: Infineon CoolMOS SPA17N80C3 (two in parallel)
$V_{DS}$=800V, $R_{ON}$=0.29Ω
$S'_1$: Infineon CoolMOS SPA11N80C3
$V_{DS}$=800V, $R_{ON}$=0.45Ω
$S_2$: International Rectifier DirectFET IRF6635 (six in parallel)
$V_{DS}$=30V, $R_{ON}$=1.8 mΩ
$S'_2$: International Rectifier DirectFET IRF6635 (six in parallel)
$V_{DS}$=30V, $R_{ON}$=1.8 mΩ

Figure 38A:
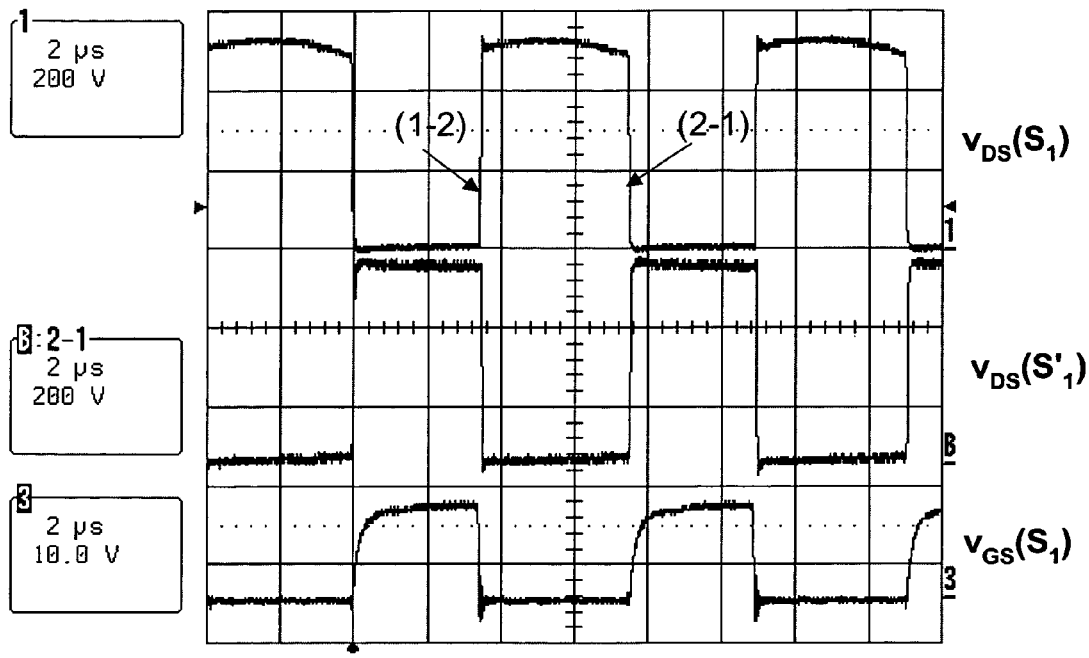
FIG. 38a illustrates the switching voltage waveforms of the primary switches in the experimental prototype.
Figure 38B:
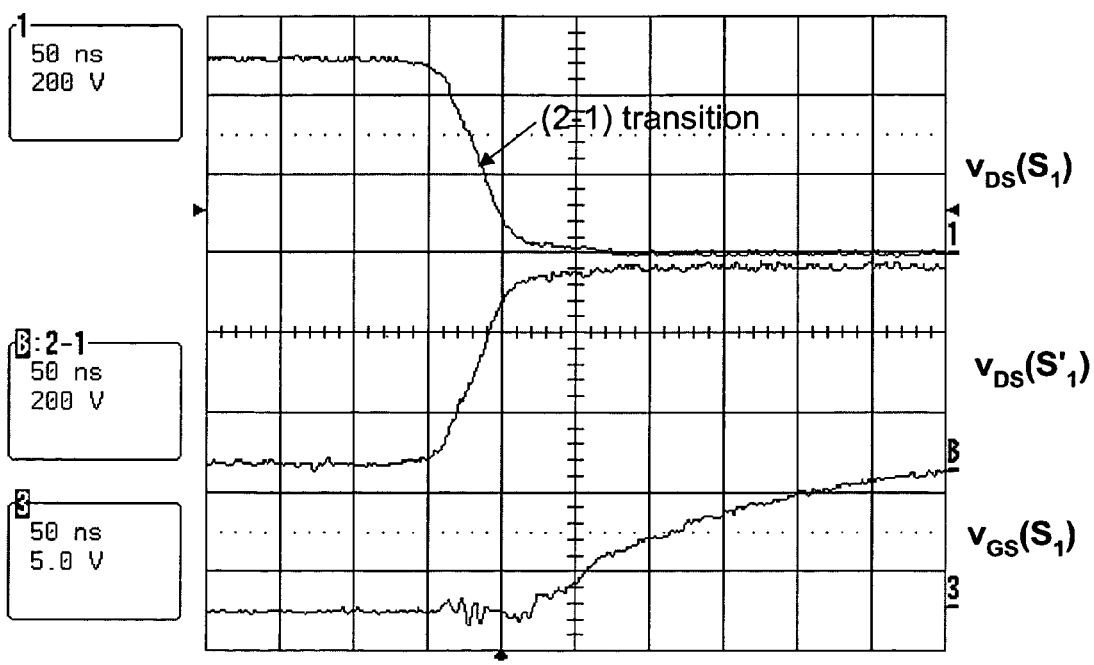
FIG. 38b illustrates enlarged lossless switching (2-1) transition.

The lossless switching performance for both (1-2) transition and (2-1) transition was verified in the key measured switching voltage waveforms on primary side switches as shown in FIG. 38a. The third waveform included is the gate drive of the main switch $S_1$ to highlight the fact that this switch is turned ON only after its voltage is reduced to zero, hence with zero switching losses at both transitions. The lossless switching at the (2-1) transition is highlighted by enlarging that transition period as shown in FIG. 38b. The co-sinusoidal discharge of the voltage across switch $S_1$ is clearly visible on the enlarged transition. While the voltage on switch $S_1$ decreases to zero, the voltage on $S'_1$ switch increases simultaneously illustrating the lossless exchange of the charges stored on their respective parasitic drain-to-source capacitances. The switch $S_1$ drive voltage waveform shown as the bottom third trace on FIG. 38b indicates clearly that the main switch $S_1$ is turned ON only after its voltage was reduced to zero, hence with zero switching losses.

Figure 39A:
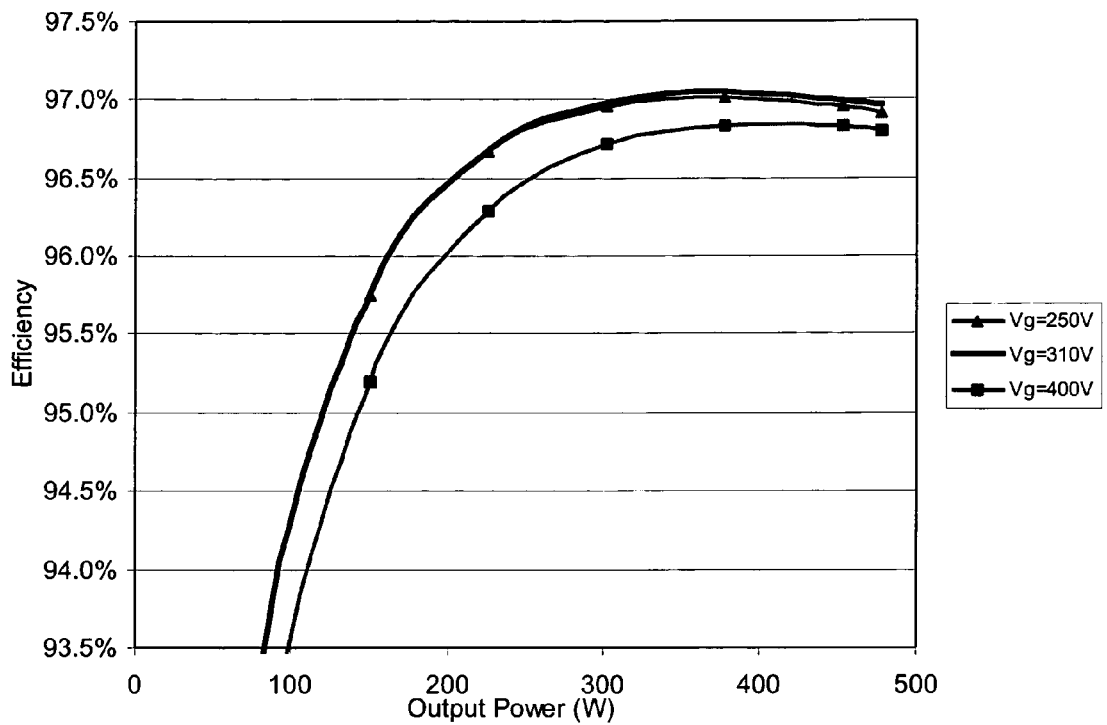
FIG. 39a is a graph of the efficiency of the experimental prototype over the output power range.
Figure 39B:
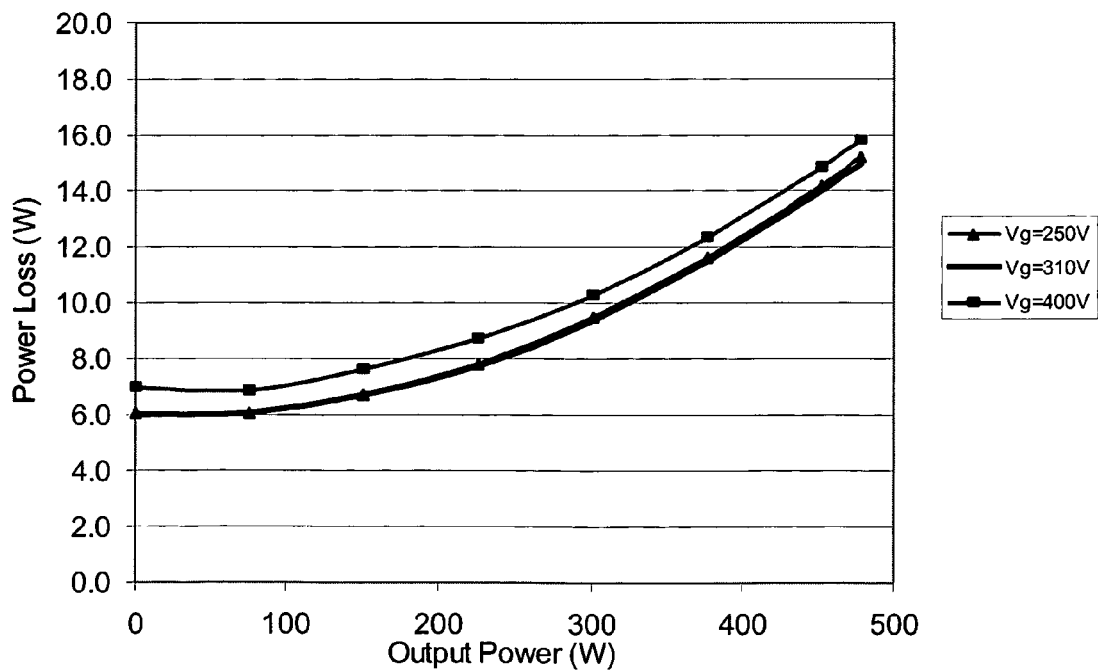
FIG. 39b is a graph of the power losses of the experimental prototype over the output power range.
Figure 40A:
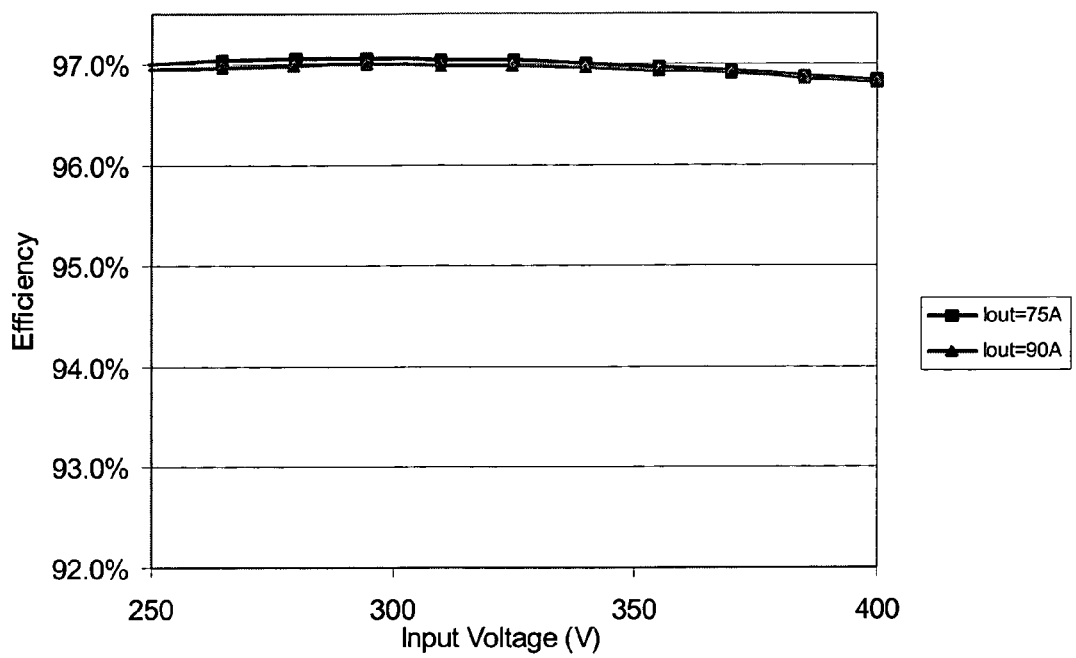
FIG. 40a is a graph of the efficiency of the experimental prototype over input voltage range.
Figure 40B:
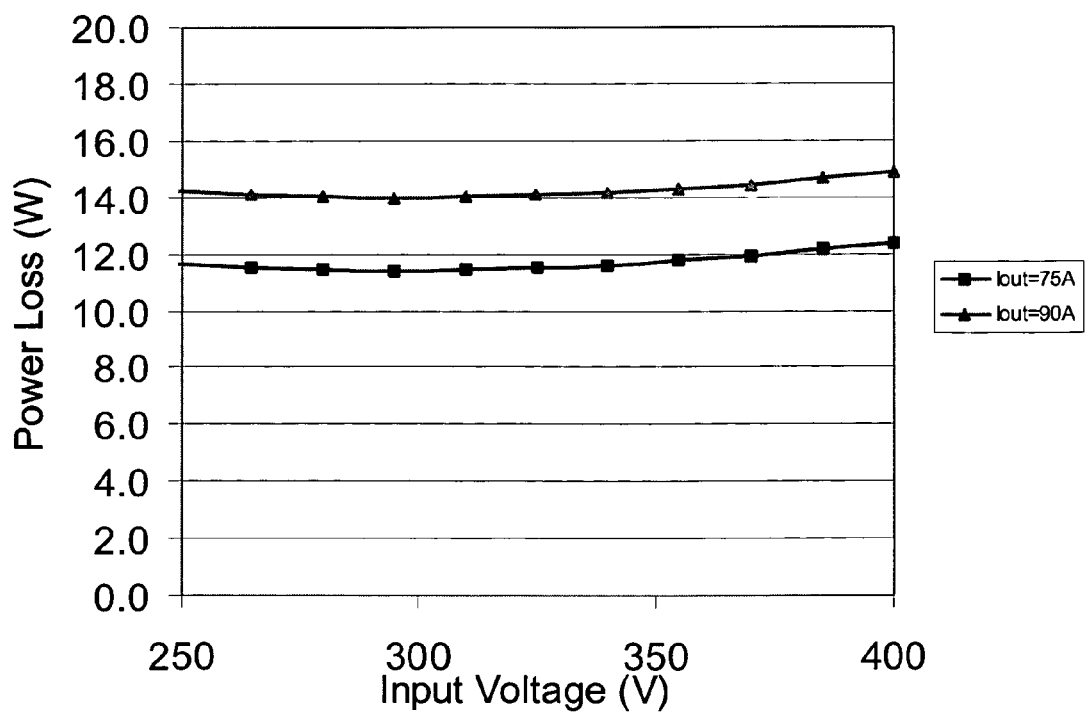
FIG. 40b is a graph of the power losses of the experimental prototype over input voltage range.

Both high efficiency magnetics circuit design as well as lossless switching translates into the overall high efficiency of the experimental prototype. FIG. 39a shows the efficiency measurements over load current range for three input voltages: 250V, 310V and 400V while FIG. 39b shows the total losses for these cases over the full load current range. The maximum efficiency of 97% is obtained for the load current of 75 A (85% of the full load current of 450 W) and a total of less than 12 W losses. Out of these total losses about 2 W is attributed to the gate drive and housekeeping power supply losses leaving only approximately 10 W losses for the power conversion stage. FIG. 40a shows the efficiency over the input voltage range for two load currents (full load of 90 A and 75 A load current). FIG. 40b shows the total losses over the input voltage range for 75 A and 90 A load currents.

Figure 41A:
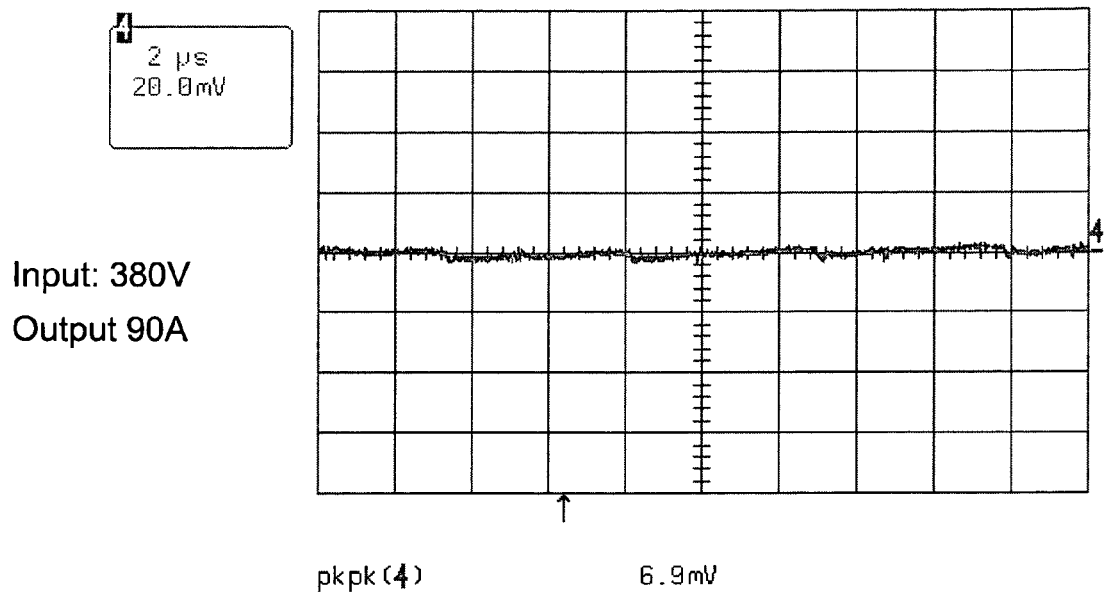
FIG. 41a illustrates output ripple voltage for 380V input and full load current.
Figure 41B:
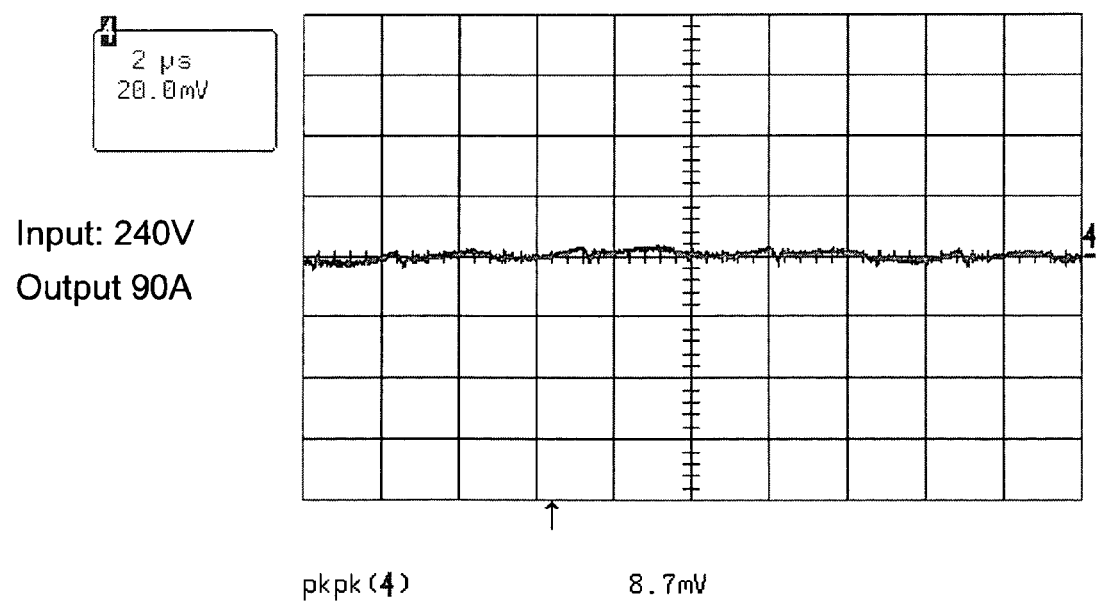
FIG. 41b illustrates output ripple voltage for 240V input and full load current.

The experimental prototype also confirmed that the operation with zero ripple currents is reflected in a very small output switching voltage ripples. FIG. 41a shows 6.9 mV peak to peak ripple for 380V input and 90 A load current. FIG. 41b shows 8.7 mV output ripple voltage measured for 240V input and 90 A load current.

Experimental Verification of Three Zero Ripple Currents

Figure 42A:
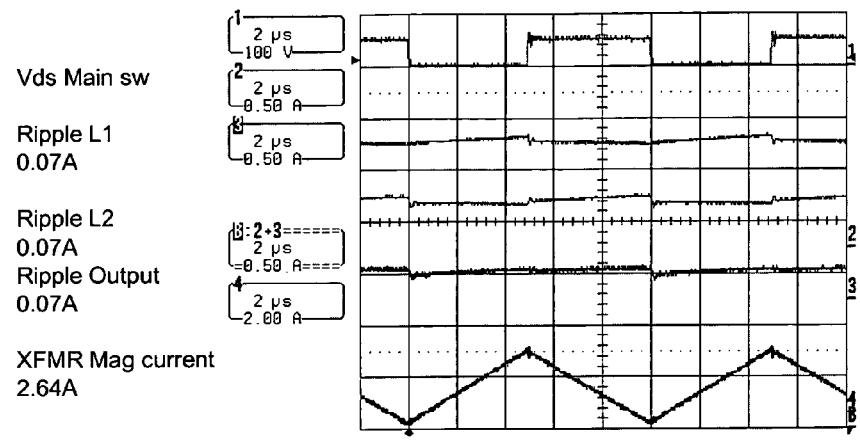
FIG. 42a shows that all three ripple currents (output current and the two inductor currents) are all zero at nominal operating point for converter operating with Integrated Magnetic structure of FIG. 14a, FIG. 42b shows that synchronous rectifier currents on the output are also ripple free.
Figure 42B:
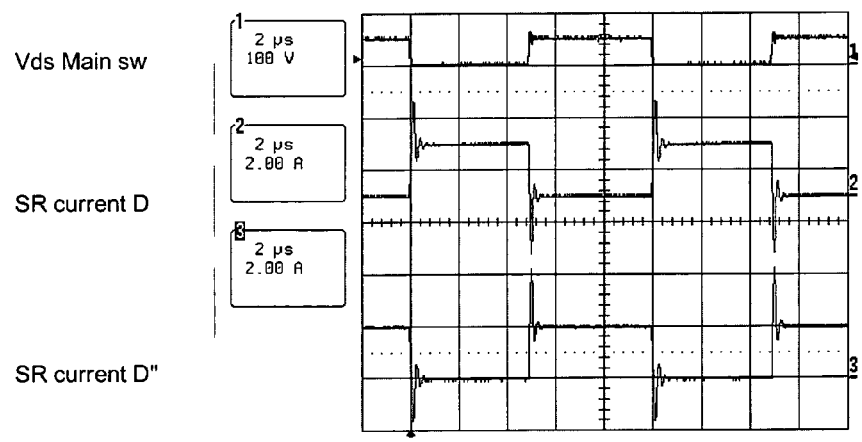
FIG. 42c shows that transformer primary current (second trace) has all ripple current, and that transformer secondary current (the bottom trace) has only small magnetizing ripple current.
Figure 42C:
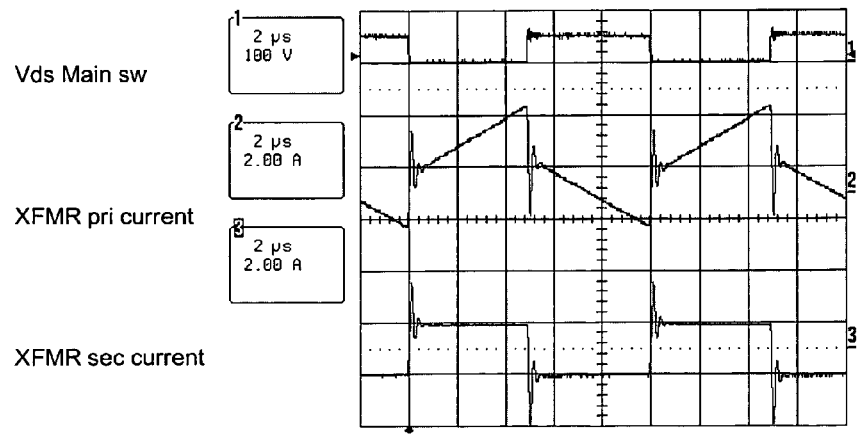

Experimental prototype was made to implement Integrated magnetics Circuit of FIG. 14a in order to confirm that both inductor currents and output current are zero simultaneously at one operating pint duty ratio of 0.5. FIG. 42a illustrates that all three ripple currents are zero and that magnetizing inductance ripple current is high. FIG. 42b illustrates that switch currents are also square-wave like and have no superimposed triangular ripple currents of inductors. FIG. 42c illustrates that isolation transformer secondary current is also square-wave like with no superimposed triangular ripple currents generated normally by two inductors.

Figure 43A:
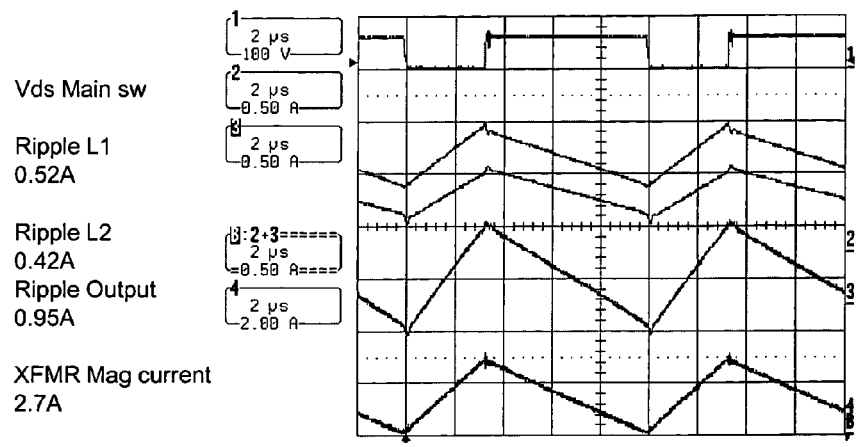
FIG. 43a, illustrates the ripple currents in two inductors and in the output of the converter with Integrated magnetics as in FIG. 14a and away from zero ripple condition
Figure 43B:
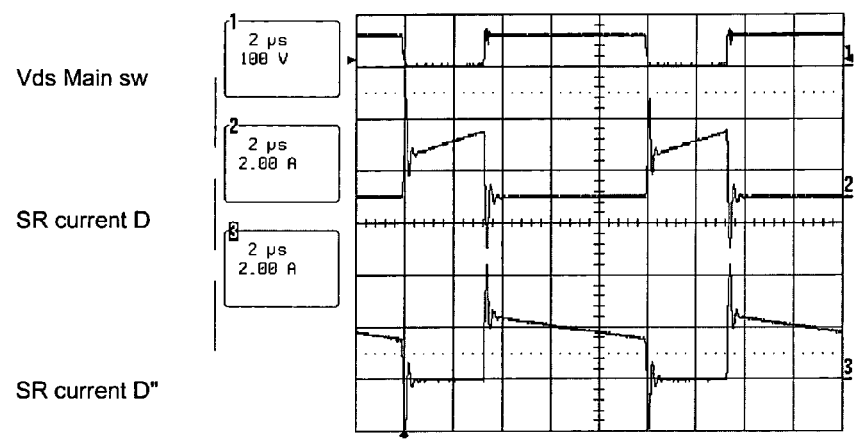
FIG. 43b illustrates synchronous rectifier MOSFET currents and FIG. 43c illustrates that all ripple current is in the transformer primary (second trace) and only small ripple (bottom trace) in the transformer secondary.
Figure 43C:
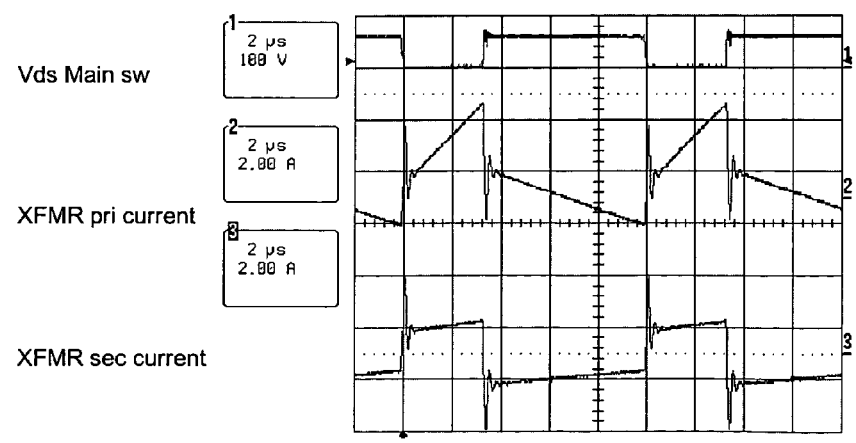

When the operating point is moved to D=1/3, the output ripple current becomes non-zero. However, FIG. 43a proves that the output ripple current (third trace from top) is the sum of two inductor ripple currents (top two traces). FIG. 43b shows that output switch??? current also have much reduced superimposed ripple currents. FIG. 43c shows that transformer secondary current has near square-wave like waveform, while the transformer primary has large superimposed triangular ripple currents.

CONCLUSION

The present invention introduces switching DC-to-DC converter with a New Integrated Magnetics which in one embodiment results in zero ripple currents not only in the output but also simultaneously in both output inductors. When operation is moved away from zero-ripple condition the resulting inductor ripple currents are still much reduced by an order of magnitude compared to conventional converters. In addition to elimination of the circulating current which reduces the losses the implementation of the novel lossless switching results in large reduction of switching losses increasing substantially the efficiency.

The novel Integrated Magnetic Switching Converter with Zero ripple currents, therefore results in very compact and highly efficient Integrated Magnetics structure resembling a simplicity and low cost of the single core fly-back transformer, but with the ultra low ripple currents and output ripple voltage much lower that in best presently known switching converters including the forward converter.

What is claimed is:

1. An isolated lossless switching DC-to-DC converter for providing power from a DC voltage source connected between an input terminal and a common input terminal to a DC load connected between an output terminal and a common output terminal, said converter comprising:

an isolation transformer with primary and secondary windings, and first and second output inductors' windings, placed on a two-loop magnetic cores structure to form an Integrated Magnetics, and each winding having one dot-marked end and another unmarked end whereby any AC voltage applied to said primary winding of said isolation transformer induces AC voltages in said secondary winding of said isolation transformer and said first and second output inductor windings so that all four AC voltages are in phase at dot-marked ends of said first output inductor winding, said second output inductor winding and said primary and secondary windings of said isolation transformer;

said first output inductor winding connected at a dot-marked end thereof to said secondary winding of said isolation transformer at a dot-marked end thereof, and connected at an unmarked end thereof to said output terminal;

said second output inductor winding connected at a dot-marked end thereof to said output terminal, and connected at an unmarked end thereof to said secondary winding of said isolation transformer at an unmarked end thereof;

said primary winding of said isolation transformer connected at an unmarked end thereof to said common input terminal;

an input switch with one end connected to said input terminal and another end connected to said dot-marked end of said primary winding of said isolation transformer;

a branch comprised of a complementary input switch and an auxiliary capacitor connected in series, wherein one end of said branch is connected to said dot-marked end of said primary winding of said isolation transformer and another end of said branch is connected to said unmarked end of said primary winding of said isolation transformer;

an output switch with one end connected to said common output terminal and another end connected to said unmarked end of said secondary winding of said isolation transformer;

a complementary output switch with one end connected to said common output terminal and another end connected to said dot-marked end of said secondary winding of said isolation transformer;

switching means for keeping said input switch ON for a duration of time interval $DT_S$, keeping it OFF for a complementary duty ratio interval $D'T_S$, where D is a duty ratio and D' is a complementary duty ratio within one complete and controlled switch operating cycle $T_S$;

wherein said input switch, said complementary input switch, said output switch, and said complementary output switch are semiconductor current bi-directional switching devices, capable of conducting the current in both directions while in an ON-state, and sustaining voltage in one direction, while in an OFF-state, and said semiconductor current bi-directional switching devices are modeled as comprising parallel connection of an ideal switch, a parasitic body-diode and a parasitic capacitance;

wherein said switching time control means include precise electronically controlling operation of said complementary input switch relative to said input switch, whereby two transition intervals, a first transition interval and a second transition interval are created during which both said input switch and said complementary input switch are turned OFF during each successive said switch operating cycle $T_s$, wherein said first and said second transition intervals are short compared to said switch operating cycle, and said switching time control means provide control signals for respective switches as follows:

said first transition interval is initiated by turning said input switch OFF and when voltage on said complementary input switch is reduced to zero, said complementary input switch is turned ON at zero voltage with zero switching losses;

said second transition interval is initiated by turning said complementary input switch OFF to result in linear discharge of voltage of said input switch until said output switch is turned ON when the voltage across said output switch is zero to initiate further resonant discharge of voltage on said input switch through the series resonant circuit formed by a leakage inductance of said isolation transformer and said parasitic capacitances of said input switch and said complementary input switch, whereby the reduction of voltage of said input switch to zero and zero switching losses are achieved by turning ON said output switch before voltage on said output switch is zero, whereby the high switching losses of said input switch and said complementary input switch with high voltage and high energy stored on respective said parasitic capacitances are eliminated;

wherein a DC-to-DC voltage conversion ratio of said converter depends linearly on said operating duty ratio D;

wherein turns ratio of said secondary winding to said primary winding of said isolation transformer provides additional scaling of DC-to-DC voltage conversion ratio of said converter;

wherein said primary winding and said secondary winding are tightly coupled for reduced leakage;

wherein said first output inductor winding, said second output inductor winding, and said secondary winding of said isolation transformer have same number of turns;

wherein said two-loop magnetics core structure comprises separated a first and a second UU-like magnetic cores;

wherein said first output inductor winding is placed on an outer leg of said first UU-like magnetic core;

wherein said second output inductor winding is placed on an outer leg of said second UU-like magnetic core;

wherein said primary and secondary windings of said isolation transformer are placed around both adjacent inner legs of said first and said second UU-like magnetic cores;

wherein said first output inductor winding is magnetically coupled with said isolation transformer windings through said first UU-like magnetic core;

wherein said second output inductor winding is magnetically coupled with said isolation transformer windings through said second UU-like magnetic core;

wherein said isolation transformer windings generate AC flux in said first and said second UU-like magnetic core;

wherein said adjacent inner legs of said first and said second UU-like magnetic cores each has an air-gap to prevent saturation of said first and said second UU-like magnetic cores under highest DC load currents;

wherein the ratio of said air-gaps in said adjacent inner legs of said first and said second UU-like magnetic cores defines a value of said operating duty ratio D at which zero-ripple currents in said first and said second output inductors windings and zero-ripple output current are obtained simultaneously;

whereby large circulating current in said secondary transformer winding and said first and said second output inductors windings is eliminated within full range of said operating duty ratio D, and whereby ripple currents in said first and said second output inductors windings and rms current in said secondary transformer winding are substantially reduced at any operating duty ratio D.

2. A converter as defined in claim 1, wherein air-gaps are positioned on each of said two inner legs and said two outer legs of said first and said second UU-like magnetic cores;

wherein the ratio between total air-gap of said first UU-like magnetics core and total air-gap of said second UU-like magnetics core determines duty ratio at which zero output ripple current is obtained, and whereby said first output inductor winding and said second output inductor winding have substantial ripple currents.

3. A converter as defined in claim 1, wherein air-gaps are positioned on each of said outer legs of said first and said second UU-like magnetic cores;

wherein the ratio between air-gaps of said first UU-like magnetics core and air-gap of said second UU-like magnetics core determines duty ratio at which zero output ripple current is obtained, and whereby said first output inductor winding and said second output inductor winding have substantial ripple currents.

4. A converter as defined in claim 1, wherein air-gaps are positioned on said inner leg and said outer leg of said first UU-like magnetic core;

wherein said second UU-like magnetic core has no DC flux and no air-gaps, and whereby zero ripple current is obtained in said second output inductor winding.

5. A converter as defined in claim 1, wherein said two-loop magnetics core structure comprises a EE-like magnetic core with a first outer leg, a second outer leg, and a center leg;

wherein said first output inductor winding is placed on said first outer leg of said EE-like magnetic core;

wherein said second output inductor winding is placed on said second outer leg of said EE-like magnetic core;

wherein said primary and said secondary windings of said isolation transformer are placed on said center leg of said EE-like magnetic core;

wherein air-gaps are placed in said first and said second outer legs of said EE-like magnetic core;

wherein the ratio between air-gaps in said first outer leg and air-gaps in said second outer leg of said EE-like magnetic core determines the duty ratio at which zero output ripple current is obtained, and whereby said first output inductor winding and said second output inductor winding have substantial ripple currents.

6. A converter as defined in claim 5, wherein air-gaps are placed in said first outer leg, said second outer leg, and said center leg of said EE-like magnetic core;

wherein the ratio between air-gaps in said first outer leg and air-gaps in said second outer leg of said EE-like magnetic core determines the duty ratio at which zero output ripple current is obtained, and whereby said first output inductor winding and said second output inductor winding have substantial ripple currents.

7. A converter as defined in claim 1, wherein said UU-like magnetic cores comprises flat magnetic cores, and whereby said Integrated Magnetics structure has reduced height.

8. A converter as defined in claim 5, wherein said EE-like magnetic cores comprises flat magnetic cores, and whereby said Integrated Magnetics structure has reduced height.

9. A converter as defined in claim 1, wherein said first output inductor is removed, and whereby said second output inductor winding has substantial ripple current.

10. A converter as defined in claim 1, wherein said second output inductor is removed, and whereby said first output inductor winding has substantial ripple current.

\* \* \* \* \*